(12) United States Patent
Lim et al.

(10) Patent No.: US 10,146,517 B2
(45) Date of Patent: Dec. 4, 2018

(54) ELECTRONIC DEVICE FOR INSTALLING APPLICATION AND METHOD OF CONTROLLING SAME

(71) Applicant: Samsung Electronics Co., Ltd., Gyeonggi-do (KR)

(72) Inventors: Bum-Taek Lim, Gyeonggi-do (KR); Young-Jip Kim, Gyeonggi-do (KR); Jun-Tae Lee, Gyeonggi-do (KR); Tae-Soo Lee, Seoul (KR); Dong-Jin Choi, Gyeonggi-do (KR); Joon-Ho Park, Gyeonggi-do (KR); Young-Su Seo, Gyeonggi-do (KR); Hye-Min Song, Gyeonggi-do (KR); Yu-Jin Jung, Gyeongsangnam-do (KR); Nandeeshwar Kodihalli, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 199 days.

(21) Appl. No.: 15/044,844

(22) Filed: Feb. 16, 2016

(65) Prior Publication Data

US 2016/0239287 A1    Aug. 18, 2016

(30) Foreign Application Priority Data

Feb. 16, 2015  (KR) ......................... 10-2015-0023689

(51) Int. Cl.
*G06F 9/445* (2018.01)
*G06F 3/0484* (2013.01)
(Continued)

(52) U.S. Cl.
CPC ............ *G06F 8/61* (2013.01); *G06F 3/04817* (2013.01); *G06F 3/04842* (2013.01);
(Continued)

(58) Field of Classification Search
CPC . G06F 8/61; G06F 21/44; G06F 21/53; G06F 21/6218; G06F 3/04817; G06F 3/04842
See application file for complete search history.

(56) References Cited

U.S. PATENT DOCUMENTS 8,051,459 B2 * 11/2011 Zhang ................. G06F 21/6218
                                                    713/1
8,818,897 B1 *  8/2014 Slodki .................... G06F 21/121
                                                    705/51
(Continued)

FOREIGN PATENT DOCUMENTS

KR        10-0614433        8/2006
KR      1020120089986       8/2012
(Continued)

OTHER PUBLICATIONS

Security-Enhanced Linux in Android, https://source.android.com/security/selinux/index.html pp. 2.
(Continued)

*Primary Examiner* — Yonas A Bayou
(74) *Attorney, Agent, or Firm* — The Farrell Law Firm, P.C.

(57) ABSTRACT

An electronic device and method of controlling an electronic device are provided. The electronic device includes a communication module; a processor; and a memory that stores instructions to instruct the processor to install a first application operating only in a first environment, install a second application selectively operating in at least one of the first environment and a second environment, grant access to the first application to first data, the first data being generated while the second application operates in the first environment, deny access to the first application to second data, the second data being generated while the second application operates in the second environment, grant access to the second application to third data, the third data being gener- (Continued)

ated while the first application operates in the first environment, and allocate the second application to at least the second environment without a user's input when the second application is installed.

15 Claims, 52 Drawing Sheets

(51) Int. Cl.
| | | |
|---|---|---|
| *G06F 21/62* | (2013.01) | |
| *G06F 3/0481* | (2013.01) | |
| *G06F 21/44* | (2013.01) | |
| *G06F 21/53* | (2013.01) | |
| *G06F 8/61* | (2018.01) | |
| *G06F 21/51* | (2013.01) | |

(52) U.S. Cl.
CPC .............. *G06F 21/44* (2013.01); *G06F 21/51* (2013.01); *G06F 21/53* (2013.01); *G06F 21/6218* (2013.01); *G06F 2221/2113* (2013.01)

(56) References Cited

U.S. PATENT DOCUMENTS

| | | | | |
|---|---|---|---|---|
| 9,584,544 | B2* | 2/2017 | Botzer | H04L 63/20 |
| 9,697,382 | B2* | 7/2017 | Korkishko | G06F 21/53 |
| 9,774,568 | B2* | 9/2017 | Doukhvalov | H04L 63/0209 |
| 2003/0236867 | A1* | 12/2003 | Natsuno | G06F 21/10 |
| | | | | 709/220 |
| 2009/0158385 | A1* | 6/2009 | Kim | G06F 21/604 |
| | | | | 726/1 |
| 2009/0271844 | A1* | 10/2009 | Zhang | G06F 12/1458 |
| | | | | 726/2 |
| 2011/0145833 | A1* | 6/2011 | De Los Reyes | G06F 3/0488 |
| | | | | 718/106 |
| 2012/0154413 | A1* | 6/2012 | Kim | H04M 1/72563 |
| | | | | 345/530 |
| 2013/0198367 | A1* | 8/2013 | Abraham | G06F 9/4856 |
| | | | | 709/224 |
| 2013/0232502 | A1* | 9/2013 | Accapadi | G06F 21/53 |
| | | | | 718/104 |
| 2013/0273879 | A1* | 10/2013 | Eisen | H04W 12/08 |
| | | | | 455/405 |

FOREIGN PATENT DOCUMENTS

| | | | | |
|---|---|---|---|---|
| KR | 1020140117594 | | 10/2014 | |
| KR | 1020140127124 | | 11/2014 | |
| WO | WO 2008/014800 | | 2/2008 | |
| WO | WO 2008/048320 | | 4/2008 | |
| WO | WO 2008048320 A1 * | | 4/2008 | ............ G06F 21/53 |
| WO | WO-2008048320 A1 * | | 4/2008 | ............ G06F 21/53 |

OTHER PUBLICATIONS

Security Enhanced (SE) Android, Stephen Smalley, Trusted Systems Research National Security Agency, pp. 49.
International Search Report dated May 19, 2016 issued in counterpart application No. PCT/KR2016/001554, 10 pages.
European Search Report dated Jun. 24, 2016 issued in counterpart application No. 16155872.1-1870, 7 pages.

* cited by examiner

ELECTRONIC DEVICE FOR INSTALLING APPLICATION AND METHOD OF CONTROLLING SAME

PRIORITY

This application claims priority under 35 U.S.C. § 119(a) to Korean Patent Application Serial No. 10-2015-0023689, which was filed in the Korean Intellectual Property Office on Feb. 16, 2015, the entire content of which is incorporated herein by reference.

BACKGROUND

1. Field of the Disclosure

The present disclosure relates generally to an electronic device for installing an application and a method of controlling the same, and more particularly, to an electronic device for downloading, installing and executing the downloaded application, and a method of controlling the same.

2. Description of the Related Art

Mobile terminals now provide many additional functions beyond a simple phone call. For example, mobile terminals provide additional functions such as an alarm, a Short Messaging Service (SMS), a Multimedia Message Service (MMS), an E-mail, a game, remote control of short-range communication, an image capturing function using an installed digital camera, a multimedia function for providing audio and video content, a scheduling function, and other similar functions.

Further, the mobile terminals may download, install, and execute applications which may provide the aforementioned functions or other functions of the mobile terminal. For example, the applications may include a music reproduction application, a video reproduction application, a photo gallery application, a game application, a social networking application, an Internet browsing application, a file management application, a cloud service application, and other similar applications.

An Operating System (OS) of the mobile terminal, for example, an Android® OS or another OS may classify applications to be a in a group included in a sandbox, and thus, separate the applications within the sandbox, including application data and code execution of each of the applications from the remaining applications of the mobile terminal during execution or runtime. Accordingly, the applications within the sandbox may be shared only with the other applications included in the sandbox.

SUMMARY

A sandbox may be configured by a manager having security rights. More particularly, when the manager having the security rights logs into an OS, the electronic device may include the application in the sandbox based on a command from the manager. That is, the existing sandbox is configured by the manager having the security rights, and there is no disclosure in which the electronic device analyzes data related to the application when the application is installed and determines whether to allocate the application to the sandbox.

An application developer or an application producer cannot be guaranteed an independent space within the electronic device to install and execute the application, for example, the sandbox. It is required to develop a technology in which the electronic device allocates the application to the sandbox not based on user's selection but based on the data related to the application.

The present disclosure has been made to solve the aforementioned problem and other problems and to provide at least the advantages described below.

In accordance with an aspect of the present, disclosure, an electronic device is provided. The electronic device includes a communication module; a processor; and a memory that stores instructions to instruct the processor to: install a first application operating only in a first environment, install a second application selectively operating in at least one of the first environment and a second environment, grant access to the first application to first data, the first data being generated while the second application operates in the first environment, deny access to the first application to second data, the second data being generated while the second application operates in the second environment, grant access to the second application to third data, the third data being generated while the first application operates in the first environment, and allocate the second application to at least the second environment without a user's input when the second application is installed.

In accordance with another aspect of the present disclosure, a control method of an electronic device is provided. The control method includes installing a first application operating only in a first environment; installing a second application selectively operating in the first environment or a second environment; granting access to the first application to first data, the first data being generated while the second application operates in the first environment; denying access to the first application to second data, the second data being generated while the second application operates in the second environment; granting access to the second application to third data, the third data being generated while the first application operates in the first environment; and allocating the second application to at least the second environment without a user's input when the second application is installed.

In accordance with another aspect of the present disclosure, an electronic device is provided. The electronic device includes a communication module; a processor; and a memory that stores instructions to instruct the processor to: provide a first area in which at least one application program can operate and a second area having an operation environment which is at least partially different from the first area, access an application market provided by an external service through the communication module at least partially in response to a first input from a user in the first area, download a selected first application from the application market at least partially in response to a second input from the user in the first area, install the downloaded first application in the electronic device, and allocate the downloaded first application to the second area without any input from the user.

In accordance with another aspect of the present disclosure, a control method of an electronic device is provided. The control method includes, providing a first area in which at least one application program can operate; providing a second area having an operation environment, which is at least partially different from the first area; accessing an application market provided by an external service through the communication module at least partially in response to a first input of a user in the first area; downloading a selected first application from the application market at least partially in response to a second input of the user in the first area; installing the downloaded first application in the electronic device; and allocating the downloaded first application to the second area without any input from the user.

In accordance with another aspect of the present disclosure, an electronic device is provided. The electronic device includes a communication module that receives a first application and a processor that installs the first application and allocates the first application to a domain corresponding to the first application.

In accordance with another aspect of the present disclosure, a control method of an electronic device is provided. The control method includes receiving a first application and installing the first application and allocating the first application to a domain corresponding to the first application.

In accordance with another aspect of the present disclosure, an electronic device provides for allocating an application to a sandbox when the application is downloaded and installed, and a control method thereof. An application developer or an application producer can be guaranteed an independent space to install and execute the application, for example, a sandbox or a domain. Further, as the application includes information indicating that the application should be allocated to and executed in the sandbox or the domain, the electronic device can manage the application in the independent space. Accordingly, the user is not required to directly configure the sandbox according to a particular application, and the corresponding application may be allocated to the sandbox when the application is downloaded.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
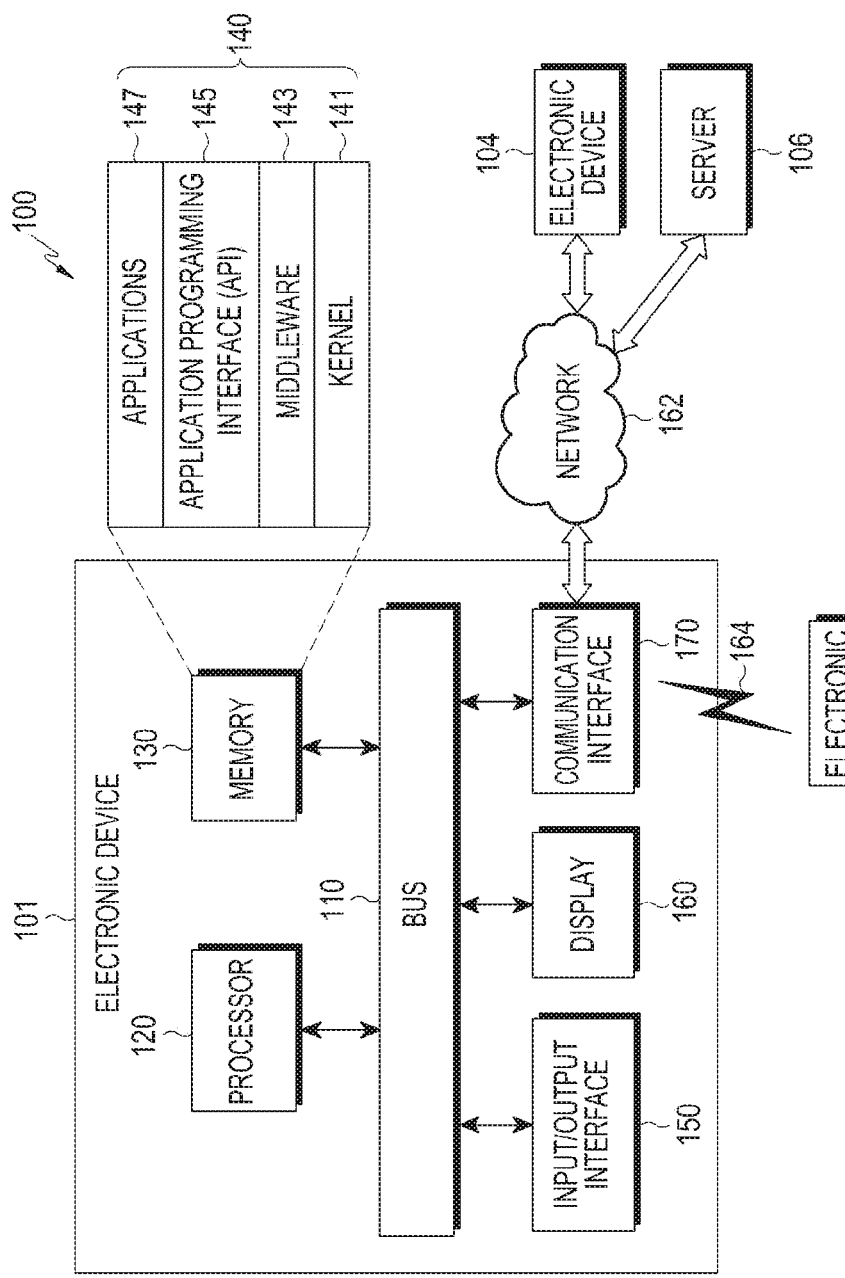
FIG. 1 illustrates a network environment including an electronic device according to an embodiment of the present disclosure.

Hereinafter, various embodiments of the present disclosure will be described with reference to the accompanying drawings. However, it should be understood that there is no intent to limit the present disclosure to the particular forms disclosed herein. Rather, the present disclosure should be construed to cover various modifications, equivalents, and/or alternative embodiments of the present disclosure. In describing the drawings, similar reference numerals may be used to designate similar constituent elements.

The terms used herein are merely for the purpose of describing particular embodiments and are not intended to limit the scope of other embodiments. As used herein, singular forms may include plural forms as well unless the context clearly indicates otherwise.

Unless defined otherwise, all terms used herein, including technical and scientific terms, have the same meanings as those commonly understood by a person skilled in the art to which the present disclosure pertains. Such terms as those defined in a generally used dictionary are to be defined consistently with the contextual meanings in the relevant field of the art, and are not to be defined to have ideal or excessively formal meanings unless clearly defined as such in the present disclosure. In some cases, even the terms defined in the present disclosure should not be interpreted to exclude embodiments of the present disclosure.

As used herein, the expressions "have", "may have", "include", and "may include" refer to the existence of a corresponding feature (e.g., numeral, function, operation, or constituent element such as component), and do not exclude one or more additional features.

As used herein, the expressions "A or B", "at least one of A and/or B", and "one or more of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The expression "a first", "a second", "the first", or "the second" may modify various components regardless of the order and/or the importance but does not limit the corresponding components. The above expressions are used merely for the purpose of distinguishing an element from the other elements. For example, a first user device and a second user device may indicate different user devices although both of them are user devices. For example, a first element may be termed a second element, and similarly, a second element may be termed a first element without departing from the scope of the present disclosure.

When an element (e.g., a first element) is referred to as being (operatively or communicatively) "connected," or "coupled," to another element (e.g., a second element), it may be directly connected or directly coupled to the other element or any other element (e.g., a third element) may be interposed between them. In contrast, when an element (e.g., a first element) is referred to as being "directly connected," or "directly coupled" to another element (e.g., a second element), there are no elements (e.g., a third element) interposed between them.

The expression "configured to" may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., a central processing unit (CPU) or an application processor (AP)) that can perform the corresponding operations by executing one or more software programs stored in a memory device.

Herein, an electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

The electronic device may be a smart home appliance such as a television (TV), a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

The electronic device may also include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA) device, a Magnetic Resonance Imaging (MRI) device, a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, and a gyro-compass), avionics, security devices, an automotive head unit, a robot for home or industry, an automatic teller machine (ATM) in banks, a point of sales (POS) terminal in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may also include at least one of a part of furniture or a building/structure, an electronic board, an electronic signature receiving device, a projector, and various kinds of measuring instruments (e.g., a water meter, an electric meter, a gas meter, and a radio wave meter).

The electronic device may also be a flexible device.

The electronic device may also be a combination of one or more of the aforementioned devices.

Further, an electronic device according to an embodiment of the present disclosure is not limited to the aforementioned devices, and may include a new electronic device according to the development of new technologies.

As used herein, the term "user" may indicate a person who uses an electronic device or a device (e.g., an artificial intelligence electronic device) that uses an electronic device.

Referring to FIG. 1, an electronic device 101 within a network environment 100 according to various embodiments of the present disclosure is illustrated. The electronic device 101 includes a bus 110, a processor 120, a memory 130, an input/output interface 150, a display 160, and a communication interface 170. Alternatively, the electronic device 101 may omit at least one of the above components or further include other components.

The bus 110 may include a circuit for connecting the components 120 to 170 and transferring communication between the components (for example, control messages and/or data).

The processor 120 may include one or more of a Central Processing Unit (CPU), an Application Processor (AP), and a Communication Processor (CP). The processor 120 may control one or more other components of the electronic device 101 and/or process an operation or data related to communication. The processor 120 may be called a controller or may include a controller as a part thereof.

The memory 130 may include a volatile memory and/or a non-volatile memory. The memory 130 may store instructions or data related to at least one other component of the electronic device 101. According to an embodiment of the present disclosure, the memory 130 stores software and/or a program 140. The program 140 includes a kernel 141, middleware 143, an Application Programming Interface (API) 145, and/or an application program (or "application") 147. At least some of the kernel 141, the middleware 143, and the API 145 may be referred to as an OS.

For example, the kernel 141 may control or manage system resources (for example, the bus 110, the processor 120, and the memory 130) which are used to execute an operation or a function implemented in the other programs (for example, the middleware 143, the API 145, and the application programs 147). Further, the kernel 141 may provide an interface through which the middleware 143, the API 145, or the application program 147 may access individual components of the electronic device 101 to control or manage system resources.

For example, the middleware 143 may serve as a relay for allowing the API 145 or the application programs 147 to communicate with the kernel 141 to exchange data. Furthermore, in regards to task requests received from the application program 147, the middleware 143 may execute control (for example, scheduling or load balancing) for the task requests using a method of assigning at least one application of the application program 147 a priority level for using the system resources (for example, the bus 110, the processor 120, or the memory 130) of the electronic device 101.

The API 145 is an interface by which the applications 147 control functions provided from the kernel 141 or the middleware 143, and may include at least one interface or function (for example, instructions) for file control, memory control, window control, image processing, or text control.

Herein, the applications may also be referred to as application programs.

The input/output interface 150 may serve as an interface which can transmit commands or data input from the user or another external device to other component(s) of the electronic device 101. Further, the input/output interface 150 may output commands or data received from another component(s) of the electronic device 101 to the user or another external device.

The display 160 may include a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of content (for example, text, images, videos, icons, or symbols) to users. The display 160 may include a touch screen and receive a touch input, a gesture input, a proximity input, or a hovering input using an electronic pen or a user's body part.

The communication interface 170 configures communication between the electronic device 101 and an external device (for example, a first external electronic device 102, a second external electronic device 104, or a server 106). The server 106 may provide the electronic device 101 with access to various applications over the network 162. For example, the communication interface 170 connects to a network 162 through wireless or wired communication to communicate with the external devices (for example, the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM) as a cellular communication protocol. The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of communication networks such as a computer network (for example, a local area network (LAN) or a wide area network (WAN)), the Internet, and a telephone network.

Each of the first and second external electronic devices 102 and 104 may be a device which is the same type as or a different type as the electronic device 101. The server 106 may include a group of one or more servers. All or some of the operations performed by the electronic device 101 may be performed by another electronic device or a plurality of electronic devices (for example, the electronic device 102 or 104 or the server 106). When the electronic device 101 performs some functions or services automatically or by request, the electronic device 101 may make a request for performing at least some of the functions related to the functions or services to the electronic device 102 or 104 or the server 106, instead of performing the functions or services by itself. The electronic device 102 or 104 or the server 106 may carry out the requested function or the additional function and transfer the result, obtained by carrying out the function, to the electronic device 101. The electronic device 101 may provide the requested functions or services based on the received result as it is or after additionally processing the received result. To perform this processing function cloud computing, distributed computing, or client-server computing technology may be used.

The communication module 170 is electrically connected to the processor 120 through the communication bus 110. Further, the processor 120 is electrically connected to the memory 130 through the communication bus 110. The memory 130 may include instructions for the processor 120 to perform the following operations. For example, the instructions may include an operation for providing a first environment and a second environment in which at least one application program can operate, an operation for installing a first application operating only in the first environment, an operation for installing a second application selectively operating in at least one of the first environment and the second environment, an operation for accepting access of first data by the first application, the first data being generated while the second application operates in the first environment, an operation for not accepting access of second data by the first application, the second data being generated while the second application operates in the second environment, an operation for accepting access of third data by the second application, the third data being generated while the first application operates in the first environment and an operation for allocating the second application to at least the second environment without a user's input when the second application is installed.

The second application may include metadata indicating whether the second application is an application related to the second environment.

The processor 120 may generate the second environment, which has not yet been generated in the electronic device, based on the metadata.

The metadata may include at least one of particular data, a security level of the second application and authentication related data for security.

The processor 120 may determine whether to allocate the second application to the second environment for security according to the security level.

The communication module 170 may transmit an authentication request for the second application to a security server and receive an authentication result that responds to the authentication request from the security server.

The processor 120 may determine whether to allocate the second application to the second environment based on the authentication result and allocate the second application to the second environment according to the result of the determination of the allocation.

The authentication request may include at least one of a security key for the authentication and an encoded value by the security key.

The processor 120 may control displaying of execution icons for executing the applications allocated to the first environment and the second environment on a single screen.

The second environment may be made to correspond with a user identifier.

The communication module 170 is electrically connected to the processor 120 as described above. Further, the processor 120 is electrically connected to the memory 130. The memory 130 may include instructions for the processor 120 to perform the following operations. For example, the instructions may include an operation for providing a first area in which at least one application program may operate and a second area having an operation environment which is at least partially different from the first area. The second area may be a domain, and the first area may be an area other than the domain, that is, a general area or a sandbox area. The instructions may include operations for accessing an application market provided by an external server 106 through a communication module, at least partially in response to a first input of the user in the first area. The instructions may include an operation for downloading the selected first application from the application market at least partially in response to a second input of the user in the first area. The instructions may also include an operation for installing the downloaded first application in the electronic device. Further, the instructions may include an operation for allocating the downloaded first application to the second area without a user input.

The communication module 170 may transmit an authentication request for the first application to the security server and receive a domain identifier from the security server in response to the authentication request.

The processor 120 may allocate the first application to the second area corresponding to the received domain identifier.

The authentication request may include at least one of a security key for the authentication and an encoded value by the security key.

The communication module 170 may receive the domain identifier related to the first application from the application market together with the first application.

The processor 120 may allocate the first application to the second area corresponding to the received domain identifier.

The processor 120 may control storing correlation information between the received domain identifier and the domain identifier for management.

The processor 120 may determine whether there is a domain corresponding to the received domain identifier.

When the second area corresponds to the received domain identifier, the processor 120 may allocate the first application to the second area. When there is no domain corresponding to the received domain identifier, the processor 120 may generate the second area corresponding to the received domain identifier and allocate the first application to the generated second area.

The processor 120 may execute a command for the first application in association with the second area.

The processor 120 may install the first application in the general area or the sandbox.

When the first application is deleted, the processor 120 may determine whether there is an application related to the second area corresponding to the first application, and determine whether to maintain the second area according to a result of the determination.

The processor 120 may identify metadata indicating whether the first application is allocated to the second area and allocate the first application to the second area according to a result of the identification.

The communication module 170 may download a second application related to the first application and the processor 120 may allocate the second application to the second area.

Figure 2:
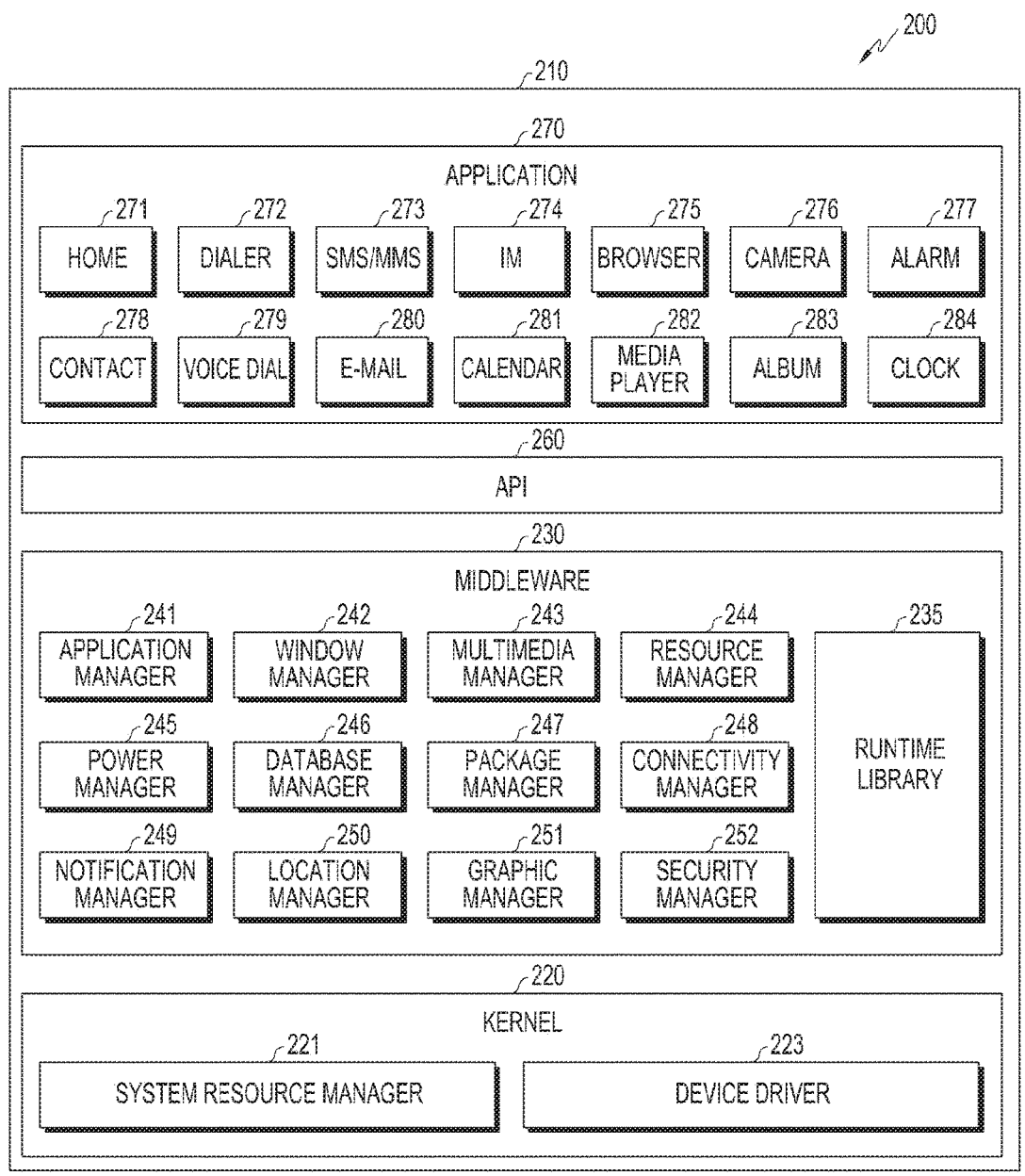
FIG. 2 is a block diagram illustrating a program module according to an embodiment of the present disclosure.

FIG. 2 is a block diagram 200 illustrating a program module 210 according to an embodiment of the present disclosure. The program module 210 (for example, the program 140) may include an OS for controlling resources related to the electronic device (for example, the electronic device 101) and/or various applications (for example, the application program 147) executed in the OS. The operating system may be, for example, Android®, iOS®, Windows®, Symbian®, Tizen®, Bada®, and the like.

The programming module 210 includes a kernel 220, middleware 230, an API 260, and/or an application 270. At least some of the program module 210 may be preloaded in the electronic device or downloaded from the server 106.

The kernel 220 includes a system resource manager 221 or a device driver 223. The system resource manager 221 may control, allocate, or collect the system resources. The system resource manager 221 may include a process manager, a memory manager, or a file system manager. The device driver 223 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 230 may provide a function required by the applications 270 in common or provide various functions to the applications 270 through the API 260 so that the applications 270 may efficiently use limited system resources of the electronic device. The middleware 230 includes at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251 and a security manager 252.

The runtime library 235 may include, for example, a library module that a compiler uses in order to add new functions through a programming language while the application 270 is executed. The runtime library 235 may perform input/output management, memory management, or a function for an arithmetic function.

The application manager 241 may manage, for example, a life cycle of at least one application among the applications 270. The window manager 242 may manage a GUI resource used in a screen. The multimedia manager 243 may detect a format required for reproducing various media files and encode or decode a media file using a codec appropriate for the corresponding media format. The resource manager 244 may manage resources such as source code, memory or a storage space of at least one application among the applications 270.

The power manager 245 may operate together with, for example, a Basic Input/Output System (BIOS), so as to manage a battery or power and may provide power information required for the operation of the electronic device. The database manager 246 may generate, search for, or change a database to be used by at least one of the applications 270. The package manager 247 may manage the installation or updating of applications distributed in the form of a package file.

The connectivity manager 248 may manage wireless connections, such as Wi-Fi or Bluetooth. The notification manager 249 may display or notify an event such as a received message, an appointment, a proximity notification, and the like to a user without disturbance. The location manager 250 may manage location information of the electronic device. The graphic manager 251 may manage graphic effects to be provided to a user and user interfaces related to the graphic effects. The security manager 252 may provide various security functions required for system security or user authentication. When the electronic device has a call function, the middleware 230 may further include a telephony manager for managing a voice call function or a video call function of the electronic device.

The middleware 230 may include a middleware module for forming a combination of various functions of the aforementioned components. The middleware 230 may provide a module specialized for each type of operating system in order to provide a differentiated function. In addition, a few existing components may be dynamically removed from the middleware 230, or new components may be added to the middleware 230.

The API 260, which is a set of API programming functions, may be provided in a different configuration for each operating system. For example, in the case of Android® or iOS®, one API set may be provided for each platform. In the case of Tizen®, two or more API sets may be provided for each platform.

The applications 270 (for example, the applications 147) include one or more of a home application 271, a diary application 272, an SMS/MMS application 273, an Instant Message (IM) application 274, a browser application 275, a camera application 276, an alarm application 277, a contact information application 278, a voice dial application 279, and e-mail application 280, a calendar application 281, a media player application 282, an album application 283, a clock application 284, a health care application (for example, an application for measuring an amount of exercise or blood sugar), and an environmental information application (for example, an application for providing atmospheric pressure, humidity, or temperature information).

The applications 270 may include an application (hereinafter, referred to as an "information exchange application" for convenience of description) supporting information exchange between the electronic device (for example, the electronic device 101) and an external electronic device (for example, the electronic device 102 or 104). The information exchange application may include a notification relay application for transmitting predetermined information to the external electronic device, or a device management application for managing the external electronic device.

The notification relay application may include a function of transferring to the external electronic device, notification information generated from other applications of the electronic device 101 (for example, an SMS/MMS application, an e-mail application, a health management application, or an environmental information application). Further, the notification relay application may receive notification information from an external electronic device and provide the received notification information to a user. The device management application may manage (for example, install, delete, or update) a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

The applications 270 may include an application (for example, health management application) designated according to attributes (for example, attributes of the electronic device such as the type of electronic device which corresponds to a mobile medical device) of the external electronic device (for example, the electronic device 102 or 104). According to an embodiment of the present disclosure, the applications 270 may include an application received from the external electronic device (for example, the server 106, or the electronic device 102 or 104). According to an embodiment of the present disclosure, the applications 270 may include a preloaded application or a third party application which can be downloaded from the server. Names of the elements of the program module 210, according to the above-described embodiments of the present invention, may change depending on the type of OS.

According to an embodiment of the present disclosure, at least some of the program module 210 may be implemented in software, firmware, hardware, or a combination of two or more thereof. At least some of the programming module 210 may be implemented (for example, executed) by the processor (for example, the AP 210). At least some of the programming module 210 may include a module, program, routine, sets of instructions, process, and the like for performing one or more functions.

Figure 3A:
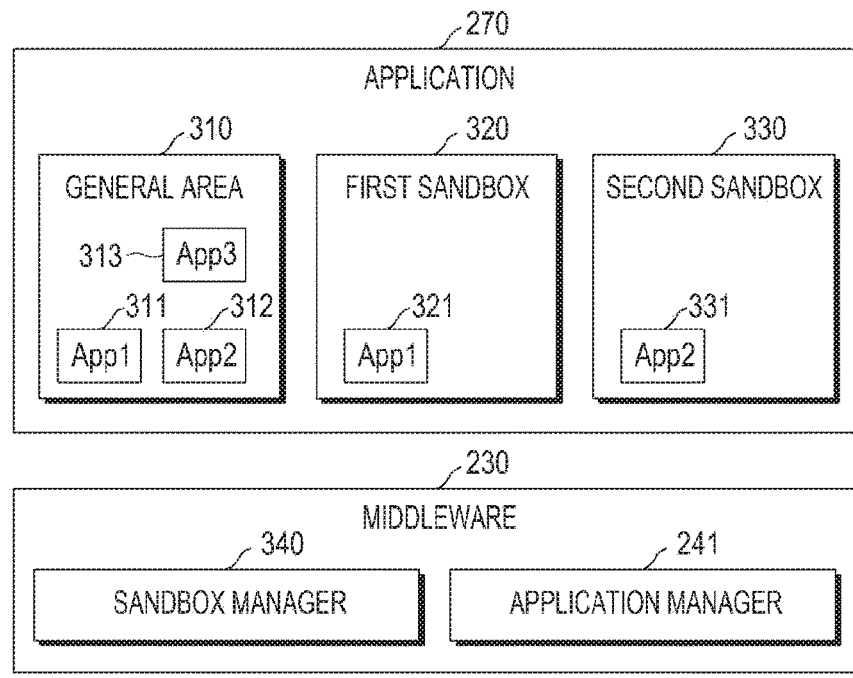
FIGS. 3A and 3B are block diagrams illustrating a program module according to an embodiment of the present disclosure.
Figure 3B:
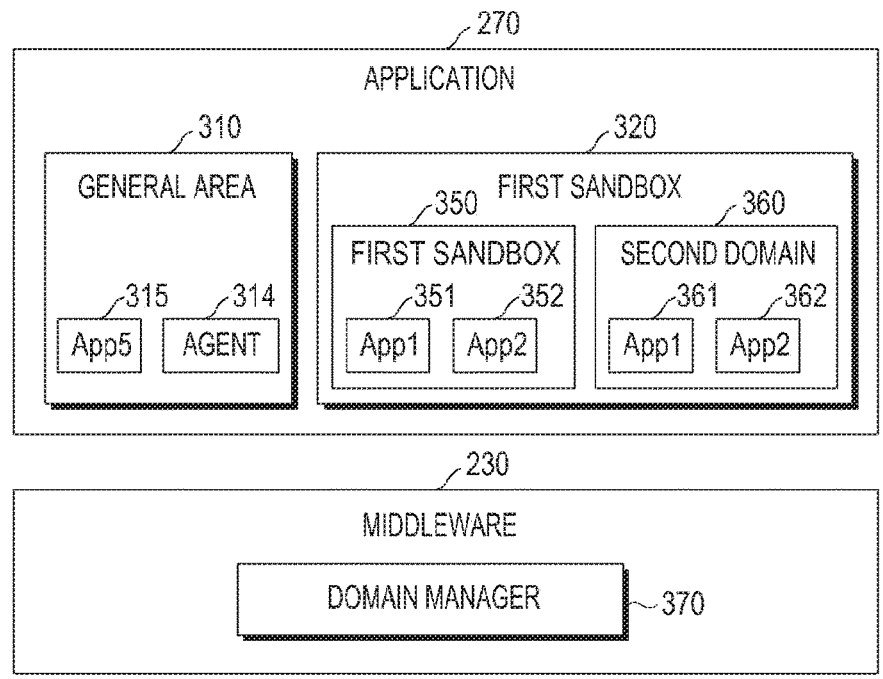

FIGS. 3A and 3B are block diagrams illustrating a concept of a sandbox area configured in an electronic device according to an embodiment of the present disclosure.

Referring to FIG. 3A, a general area 310, a first sandbox 320, and a second sandbox 330 may be defined in the application layer 270.

The application layer 270 may be a layer in which applications are installed and executed, and may be configured as an area in which data required for executing applications is stored and processed. The application layer 270 may transmit/receive data to/from the middleware layer 230.

The general area 310, the first sandbox 320, and the second sandbox 330 may be configured within the application layer 270. The sandbox may be named a security area, a container, and the like according to implementations. Each of the general area 310, the first sandbox 320, and the second sandbox 330 may be configured according to a user identifier. For example, the general area 310 may correspond to a user identifier "0", the first sandbox 320 may correspond to a user identifier "200", and the second sandbox 330 may correspond to a user identifier "201". The numbers of the identifiers are only examples.

An application which is not needed to be allocated to the sandbox, may be allocated to the general area 310. For example, a third application 313 may be an application which is not required to be security-processed and, accordingly, may be an application which does not need to be allocated to the sandbox. As illustrated in FIG. 3A, the third application 313 may be installed and allocated to the general area 310 of the application layer 270. The third application 313 may share data and code execution with another application, as opposed to the application allocated to the sandbox. The sandbox may also be referred to as an "environment".

A first application 321 may be installed and allocated to the first sandbox 320. An application which is required to be security-processed, may be allocated or executed in the sandbox, separately from the general area. For example, the first application 321 may input/output data, which is required to be security-processed, and may be stored or processed in resources corresponding to the first sandbox. A second application 331 may be installed and allocated to the second sandbox 330. The second application 331 may be an application which is required to be security-processed and should not share data with the first application 321. The electronic device 101 may allocate the first application 321 to the first sandbox 320 and the second application 331 to the second sandbox 330 in order to prevent data and code execution from being shared between the first application 321 and the second application 331.

The first application 311 and the second application 312 may be allocated to the general area 310. For example, the first application 311 and the second application 312 may operate in a general mode rather than a security mode. In this case, the electronic device 101 may allocate the first application 311 and the second application 312 to the general area 310 as well as the sandbox. Accordingly, the electronic device 101 may execute the first application 311 and the second application 312 in the general mode. The first application 311 may share data and code execution with the second application 312 and the third application 313 in the general mode. The electronic device 101 may also execute the first application 311 and the second application 312 in the security mode. As described above, the first application 311 may not share data and code execution with the second application 312 and the third application 313 in the security mode. Since the first application 311 allocated to the general area 310 and the first application 321 allocated to the first sandbox 320 may have the same package identifier or the same application identifier and different user identifiers, they may operate by different applications.

The electronic device 101 may display a screen for execution of the application, for example, a launcher application screen. The electronic device 101 according to various embodiments of the present disclosure may display a screen for executing applications including all the applications allocated to the general area 310, the first sandbox 320, and the second sandbox 330. In this case, when the user identifier "0" executes the first application, the first application 311 allocated to the general area 310 may be executed in the general mode. Further, when the user identifier "200" executes the first application, the first application 321 allocated to the first sandbox 320 may be executed in the security mode.

The middleware 230 may control a setting of the electronic device 101 by responding to a request from a particular module and perform the generation of the sandbox and the allocation of the application.

A sandbox manager 340 may manage generation and deletion of the sandbox. The application manager 241 may manage installation and execution of the application and determine an allocation location of the application. For example, the application manager 241 may determine the allocation location of the first application 321 as the first sandbox 320 and allocate the first application 321 to the first sandbox 320 when downloading the first application 321. According to another embodiment of the present disclosure, as illustrated in FIG. 3B, a sandbox agent 314 may determine the allocation location of the first application 321. For example, the sandbox agent 314 may determine the allocation within the first sandbox 320 by referring to metadata of the application. The sandbox agent 314 may output an installation request including the allocation location of the application 321 to the application manager 241. The application manager 241 may allocate the first application 321 to the first sandbox 320 while installing the first application 321 according to the installation request from the sandbox agent 314. The application manager 241 may allocate the first application 311 to the general area 310. The application manager 241 may be configured as one module or one or more separated modules in the middleware. The sandbox agent 314 may transmit an authentication request to a security server or receive an authentication result.

The electronic device 101 may install an application in a platform layer, and store and use a user data set according to an each area. In the process of changing an area, the electronic device 101 may provide a graphic user interface which may perform a user change. The graphic user interface may include a window for inputting a user identifier and a password and may activate an area corresponding to a logged-in user identifier.

When the first application is received, the application manager 241 may determine whether the received first application is an application to be executed in the sandbox. The electronic device 101 may install and allocate the first application according to whether the received first application is the application to be executed in the sandbox. As described above, when the first application is received, the sandbox agent 314 may determine whether the received first application is the application to be executed in the sandbox. The sandbox agent 314 may make a request for allocating the first application to the sandbox to the application manager 241 according to whether the received first application is the application to be executed in the sandbox. The application manager 241 may allocate the first application to the sandbox according to the installation request from the sandbox agent 314.

The first application may include metadata indicating whether the received first application is the application to be executed in the sandbox.

The sandbox agent 314 may also make a request for generating the sandbox, which has not yet been generated in the electronic device, to the sandbox manager 340 based on the metadata. The sandbox manager 340 may generate the sandbox, which has not yet been generated, according to the request from the sandbox agent 314.

The sandbox agent 314 may transmit an authentication request for the first application to the security server and receive an authentication result that responds to the authentication request from the security server.

Figure 4A:
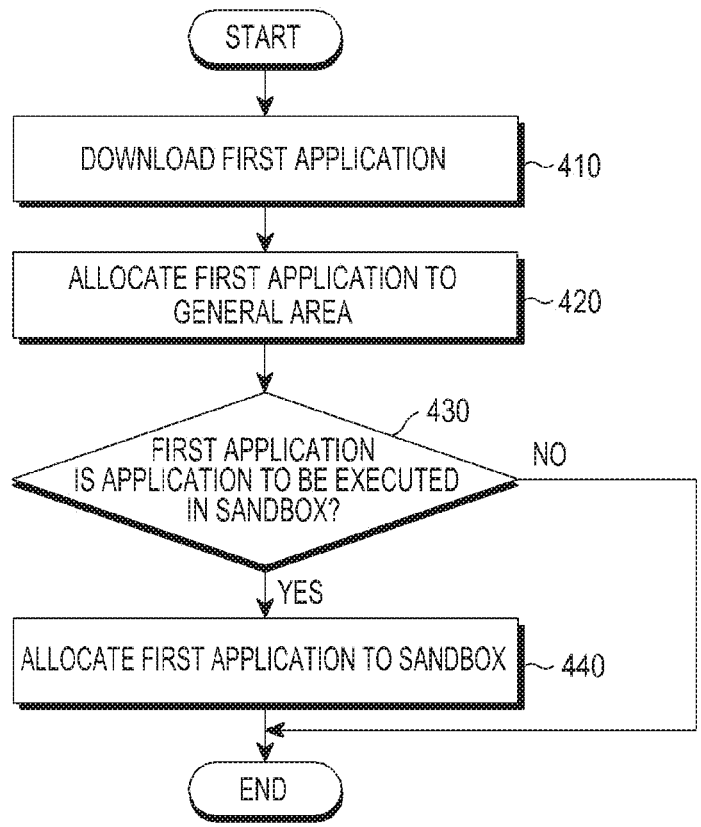
FIGS. 4A to 4C are flowcharts illustrating a method of installing an application according to an embodiment of the present disclosure.
Figure 4B:
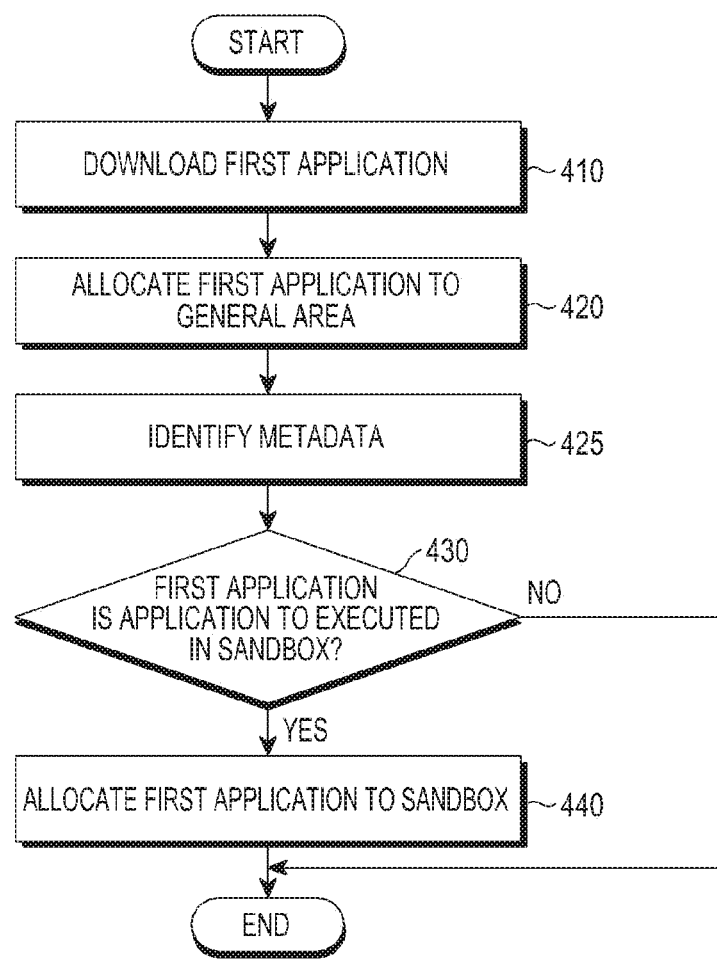
Figure 4C:
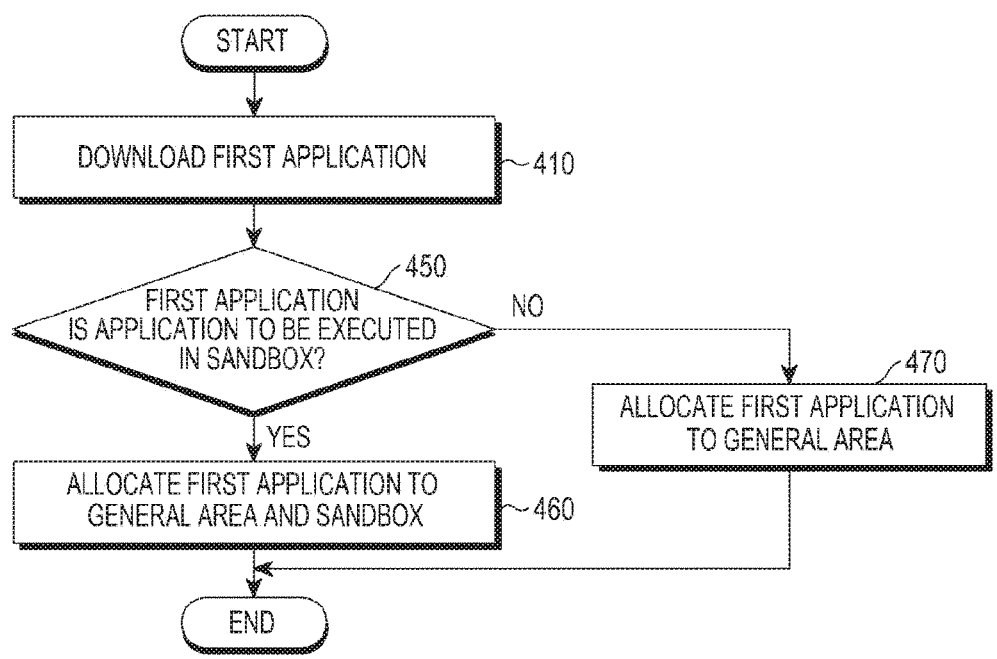

FIGS. 4A to 4C are flowcharts illustrating a method of installing an application according to an embodiment of the present disclosure.

Referring first to FIG. 4A, the electronic device 101 downloads a first application in step 410. For example, the electronic device 101 may download the first application from an application market.

In step 420, the electronic device 101 installs the downloaded first application and allocates the first application to the general area. According to an embodiment of the present disclosure, the electronic device 101 may first allocate the received application to the general area.

In step 430, the electronic device 101 determines whether the downloaded first application is an application to be executed in the sandbox. According to various embodiments of the present disclosure, the first application may include metadata indicating whether the first application is executed in the sandbox. For example, when the first application is produced based on an Android® OS, the first application may include metadata in the form in which particular data is inserted into a file of AndroidManifest.xml. However, the aforementioned example related to the Android OS is only an example, and the electronic device 101 according to various embodiments of the present disclosure may also identify and manage metadata indicating whether applications produced based on various OSs are the applications executed in the sandbox.

The electronic device 101 may identify the metadata of the first application to determine whether the downloaded first application is the application to be executed in the sandbox. For example, when the first application is produced based on the Android® OS, the electronic device 101 may determine whether particular data is included in the file of AndroidManifest.xml of the first application to determine whether the downloaded first application is the application to be executed in the sandbox.

When the first application is the application to be executed in the sandbox, the electronic device 101 may allocate the first application to the sandbox in step 440.

Figure 5A:
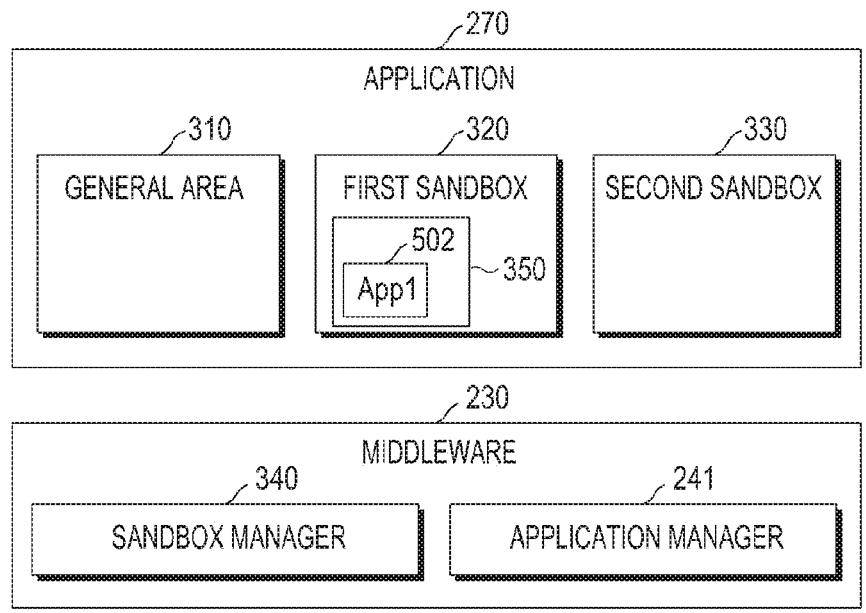
FIGS. 5A and 5B are block diagrams illustrating a program module according to an embodiment of the present disclosure.

For example, as illustrated in FIG. 5A, the electronic device 101 may first allocate a first application 501 to the general area 310 and allocate a first application 502 to the first sandbox 320. In this case, the electronic device 101 may allocate data corresponding to the general mode of the first application to resources corresponding to the general area 310 and allocate data corresponding to the security mode of the first application to resources corresponding to the first sandbox 320.

When the first application is not the application to be executed in the sandbox, the electronic device 101 may allocate the first application only to the general area.

Figure 5B:
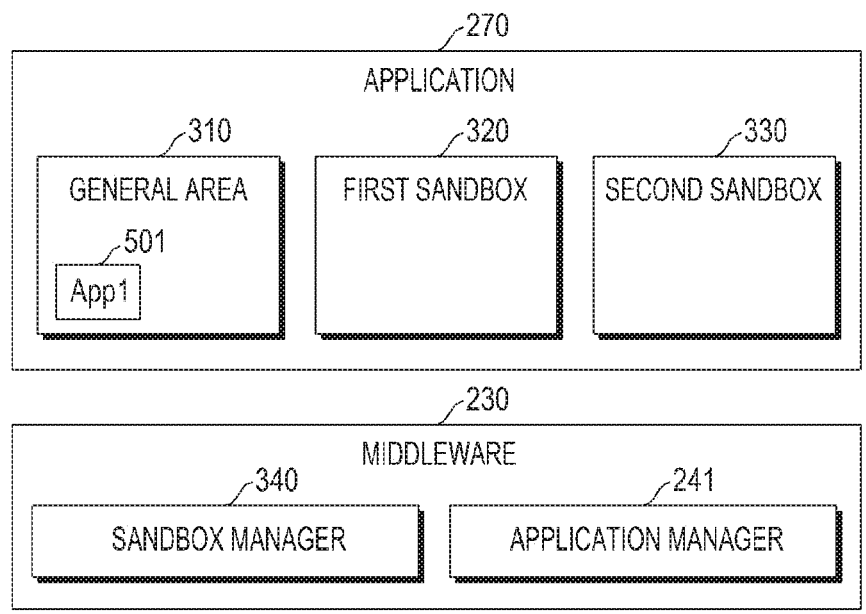

For example, as illustrated in FIG. 5B, the electronic device 101 may allocate the first application 501 to the general area 310. In this case, the electronic device 101 may allocate the data corresponding to the general mode of the first application to the resources corresponding to the general area 310. When the first application 501 is executed, data and code execution of the first application 501 may be shared with another application.

FIG. 4B is a flowchart illustrating a method of installing an application according to various embodiments of the present disclosure.

The electronic device 101 downloads the first application in step 410. In step 420, the electronic device 101 installs the first application and allocates the first application to the general area. The electronic device 101 identifies metadata of the first application in step 425. The electronic device 101 may identify the metadata by particular data inserted into the file of the first application. According to various embodiments of the present disclosure, the metadata relates to whether the application should be allocated to the security area, and may directly indicate whether the application should be allocated to the security area or implemented in the form of a security level.

In step 430, the electronic device 101 determines whether the first application is an application to be allocated to the security area. For example, when the metadata directly indicates that the first application should be allocated to the security area, the electronic device 101 may determine that the first application is allocated to the security area. Alternatively, when the metadata corresponds to the security level, the electronic device 101 may determine whether the first application is the application to be allocated to the security area according to the identified security level. Since step 440 has been described in detail with reference to FIG. 4A, a further description thereof will be omitted herein.

FIG. 4C is a flowchart illustrating a method of installing an application according to an embodiment of the present disclosure.

The electronic device 101 downloads and installs the first application in step 410. In step 450, the electronic device 101 determines whether the first application is the application to be executed in the sandbox. When it is determined that the first application is the application to be executed in the sandbox, the electronic device 101 allocates the first application to the general area and the sandbox in step 460. When it is determined that the first application is not the application to be executed in the sandbox, the electronic device 101 allocates the first application to the general area in step 470.

Figure 6A:
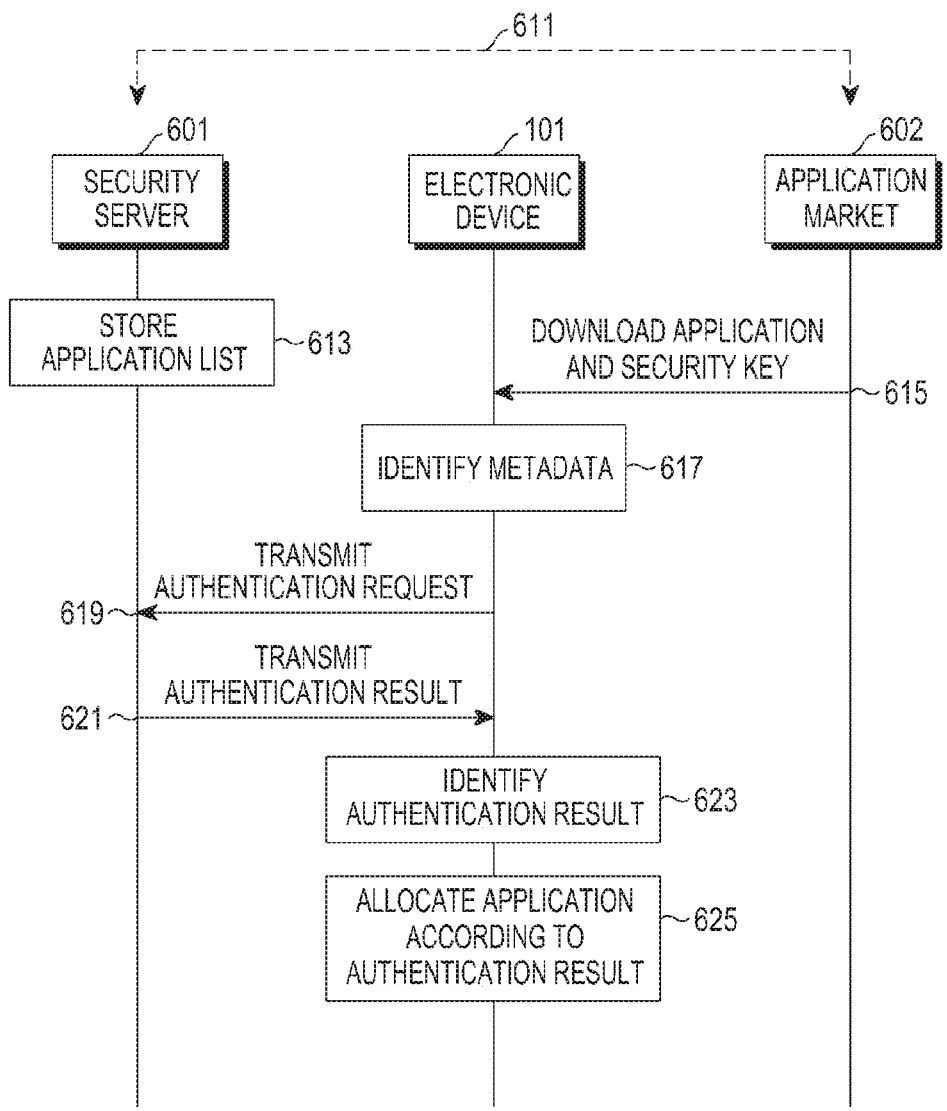
FIG. 6A is a flow diagram illustrating a method of installing an application according to an embodiment of the present disclosure.

FIG. 6A is a flow diagram illustrating a method of installing an application according to an embodiment of the present disclosure.

In step 611, a security server 601 may share an application list with an application market 602. According to an embodiment of the present disclosure, the security server 601 may receive correlation information between an application uploaded to the application market 602 and a security key corresponding to the application from the application market 602 or another external entity. Table 1 shows an example of the correlation information between the application and the security key according to various embodiments of the present disclosure.

TABLE 1

| Application | Security key |
|---|---|
| First application | akbidll |
| Second application | vnei3 |
| Third application | villlwo5 |

In step 613, the security server 601 stores an application list such as the list shown in Table 1.

The electronic device 101 downloads and installs the application from the application market 602 in step 615. Further, the electronic device 101 downloads the security key from the application market 602. The security key stored in the security server 601 and the security key received by the electronic device 101 may be different from or the same as each other. The security key stored in the security server 601 and the security key received by the electronic device 101 may be key values which can be used in various encoding/decoding algorithms. Herein, it is assumed that the electronic device 101 downloads the first application and the security key of "akbidll" from the application market 602. The first application may include metadata indicating that the first application is executed in the sandbox. As described above, the metadata may be data indicating the execution in the sandbox or the security level, or the security key may be used as the metadata.

In step 617, the electronic device 101 identifies the metadata and determines whether the downloaded first application is the application to be executed in the sandbox according to a result of the identification. For example, the electronic device 101 may determine whether the first application is the application to be executed in the sandbox based on data indicating that the first application is executed in the sandbox, which is directly implied in the metadata. Alternatively, the electronic device 101 may determine that the first application is executed in the sandbox according to the security level of the first application. Alternatively, the electronic device 101 may determine that the first application is executed in the sandbox based on the security key received together with the first application.

In step 619, the electronic device 101 transmits an authentication request for the first application to the security server 601. For example, the authentication request may include an identifier of the first application and the security key. The identifier of the first application may be implemented by various pieces of information such as an application package name, an application registration number, and the like. It is understood by those skilled in the art that there is no limitation on how the application can be identified through the data.

The authentication request may also include a value encoded using the security key. The electronic device 101 may generate the encoded value by applying various encoding algorithms to the security key received from the application market 602. The electronic device 101 may transmit the authentication request including the application identifier and the encoded value. Alternatively, an application developer may sign the application by the security key, and the security server 601 may perform the authentication by identifying the signing. The sandbox agent 314 may transmit the authentication request to the security server 601 and receive an authentication result from the security server 601.

In step 621, the security server 601 transmits an authentication result corresponding to the authentication request to the electronic device 101. The security server 601 may perform the authentication by comparing the application identifier and the security key, which are included in the authentication request, with the stored application list. Alternatively, the security server 601 may perform the authentication by decoding the encoded value, which is included in the authentication request, by using the pre-stored security key. The security server 601 may determine whether the authentication of the first application is successful or failed. The security server 601 transmits the authentication result including authentication success or authentication failure to the electronic device 101 in step 621.

In step 623, the electronic device 101 identifies the authentication result. The electronic device 101 may allocate the first application according to the authentication result in step 625. For example, when the authentication is successful, the electronic device 101 may allocate the first application to the general area and the sandbox. Alternatively, the electronic device 101 may allocate the first application to the sandbox.

The metadata may further include user identifier information on the sandbox, to which the metadata should be allocated, and the electronic device 101 may allocate the first application to the corresponding sandbox with reference to the metadata. Alternatively, when the metadata does not include the user identifier information, the electronic device 101 may, based on the metadata, determine a sandbox to which the first application will be allocated and allocate the first application to the determined sandbox. When the sandbox, to which the first application will be allocated, has not yet been generated, the electronic device 101 may generate the sandbox and allocate the first application. When the authentication fails, the electronic device 101 may allocate the first application to the general area.

Although the security server 601 and the application market 602 are illustrated as different entities in the embodiment of FIG. 6, the security server 601 and the application market 602 may be implemented as one entity.

Figure 6B:
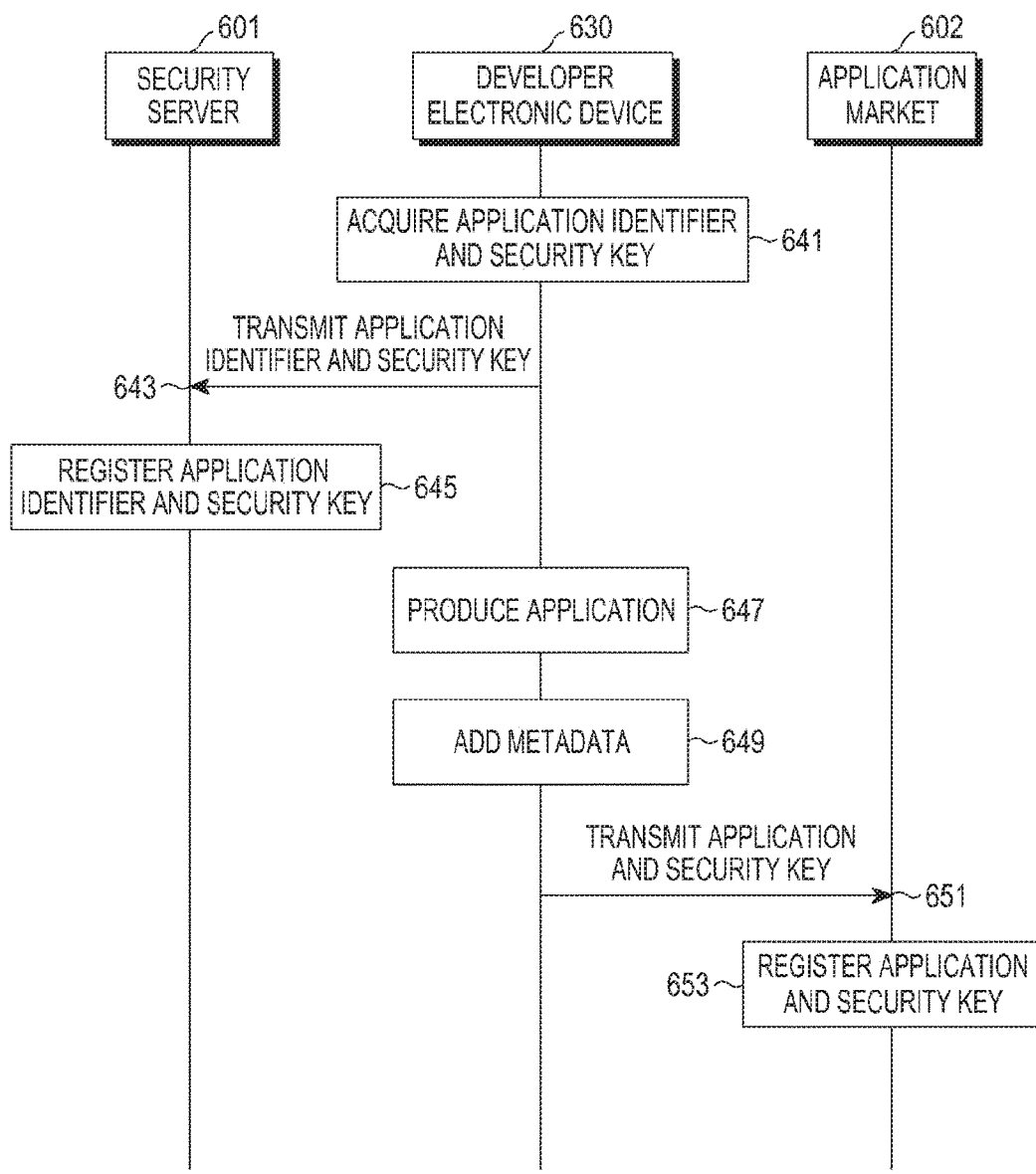
FIG. 6B is a flow diagram illustrating a process of uploading an application according to various embodiments of the present disclosure.

FIG. 6B is a flow diagram illustrating a process of uploading an application according to an embodiment of the present disclosure.

In step 641, a developer electronic device 630 acquires an application identifier and a security key. For example, the developer electronic device 630 may acquire the application identifier and the security key through a contract with a platform operator. In this case, the application identifier and the security key may be named a license key.

In step 643, the developer electronic device 630 transmits the application identifier and the security key to the security server 601. In step 645, the developer electronic device 601 registers the received application identifier and security key. Accordingly, the security server 601 may store correlation information between the application identifier and the security key. The security server 601 may authenticate the authentication request received from the electronic device 101 by using the correlation information between the application identifier and the security key as described in FIG. 6A.

In step 647, the developer electronic device 630 produces an application. In step 649, the developer electronic device 630 adds metadata to the application, and the metadata may be data indicating whether the application is executed in the sandbox as described above.

In step 651, the developer electronic device 630 transmits the application and the security key to the application market 602. In step 653, the application market 602 registers the received application and security key. When the application market 602 receives an application download request from the electronic device 101, the application market 602 transmits the application and the security key to the electronic device 101 in response to the request.

Figure 7:
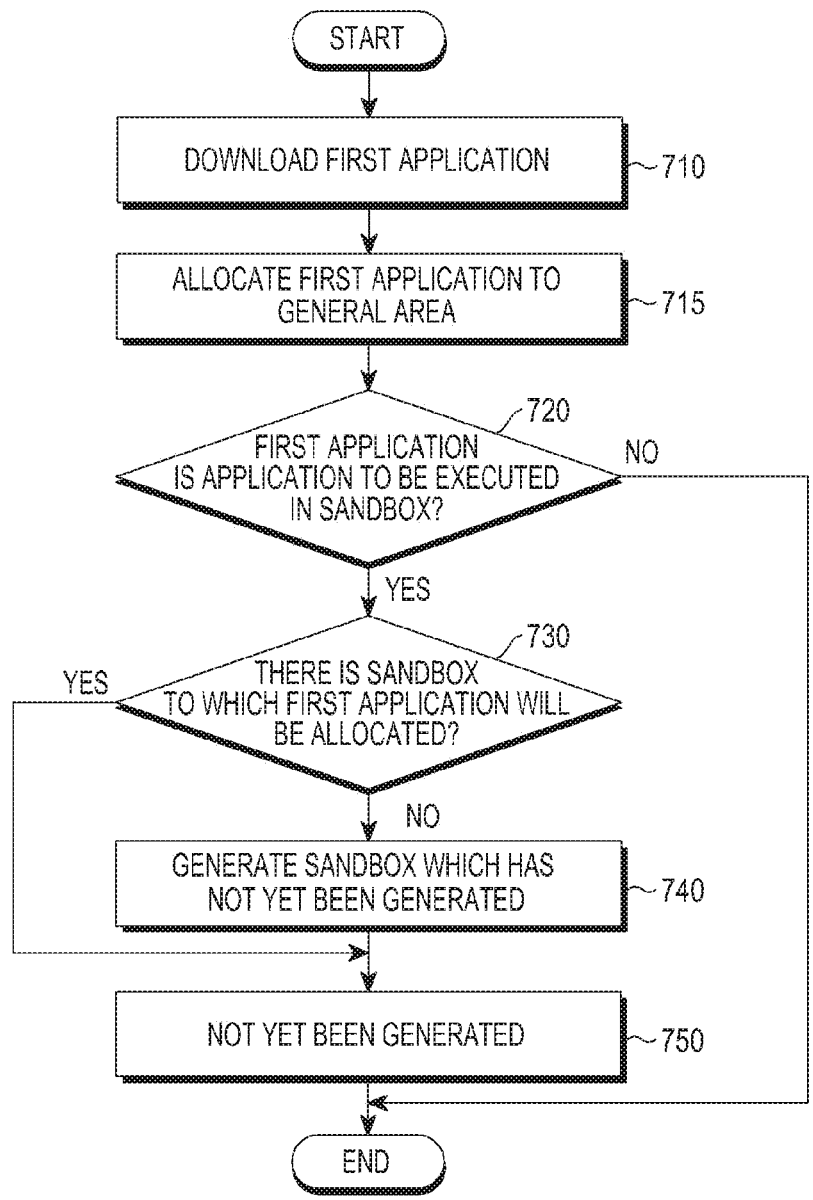
FIG. 7 is a flowchart illustrating a control method of an electronic device according to an embodiment of the present disclosure.

FIG. 7 is a flowchart illustrating a control method of an electronic device according to an embodiment of the present disclosure.

Referring to FIG. 7, the electronic device 101 downloads and installs the first application in step 710.

In step 715, the electronic device 101 allocates the first application to the general area.

In step 720, the electronic device 101 determines whether the first application is an application to be executed in the sandbox. According to an embodiment of the present disclosure, the electronic device 101 may determine whether the first application is the application to be executed in the sandbox by using metadata included in the first application.

When it is determined that the first application is the application to be executed in the sandbox, the electronic device 101 may determine whether the sandbox to which the first application will be allocated exists in step 730. As described above, the metadata may further include user identifier information of the sandbox, to which the metadata should be allocated, and the electronic device 101 may allocate the first application to the corresponding sandbox with reference to the metadata. Alternatively, according to an embodiment of the present disclosure in which the metadata does not include the user identifier information, the electronic device 101 may, based on the metadata, determine a sandbox to which the first application will be allocated and allocate the first application to the determined sandbox. Accordingly, the electronic device 101 may determine whether the identified sandbox has been already allocated to the electronic device 101.

Figure 8A:
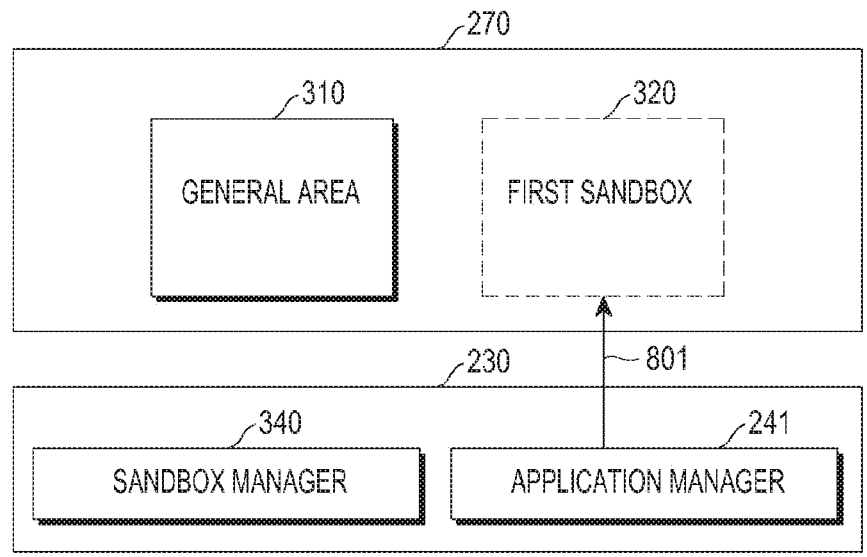
FIGS. 8A and 8B are block diagrams illustrating a program module according to an embodiment of the present disclosure.

For example, as illustrated in FIG. 8A, the electronic device 101 may determine that the sandbox to which the first application will be allocated is the first sandbox 320. The electronic device 101 may determine whether the first sandbox 320 has been already generated. According to an embodiment of the present disclosure, the application manager 241 defined in the electronic device 101 may determine whether the first sandbox 320 is generated in the application layer 270. In the embodiment of FIG. 8A, it is assumed that the first sandbox 320 has not yet been generated.

Figure 8B:
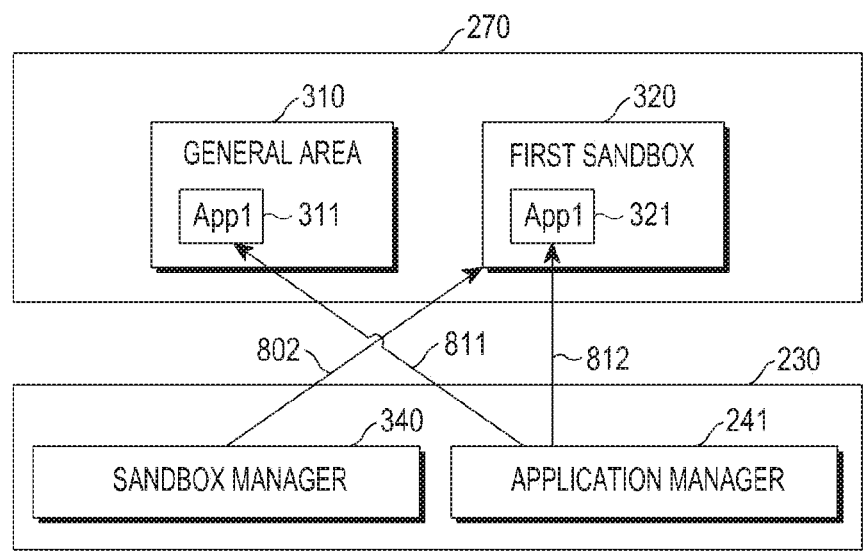

When the sandbox has not been generated, the electronic device 101 generates the sandbox, which has not been generated, in step 740. For example, as illustrated in FIG. 8B, the sandbox manager 340 defined in the electronic device 101 may generate the first sandbox 320 as indicated by reference numeral 802.

When the sandbox is generated, the electronic device allocates the first application 321 to the generated or existing sandbox in step 750 as indicated by reference numeral 812. According to various embodiments of the present disclosure, as illustrated in FIG. 8B, the electronic device may allocate the first application 321 to the sandbox indicated by reference numeral 812 while preferentially allocating the first application 311 to the general area as indicated by reference numeral 811.

When it is determined that the first application is not the application to be executed in the sandbox, the electronic device 101 may allocate the first application only to the general area.

According to another embodiment of the present disclosure, the electronic device 101 may first determine whether the application is the application to be executed in the sandbox without allocating the application to any area. When it is determined that the application is executed in the sandbox, the electronic device 101 may allocate the application to the general area and the sandbox. When it is determined that the application is not executed in the sandbox, the electronic device 101 may allocate the application to the general area.

In step 760, the electronic device 101 allocates the first application to the general area.

FIGS. 9A to 9H are conceptual diagrams illustrating screens of the electronic device according to an embodiment of the present disclosure.

Figure 9A:
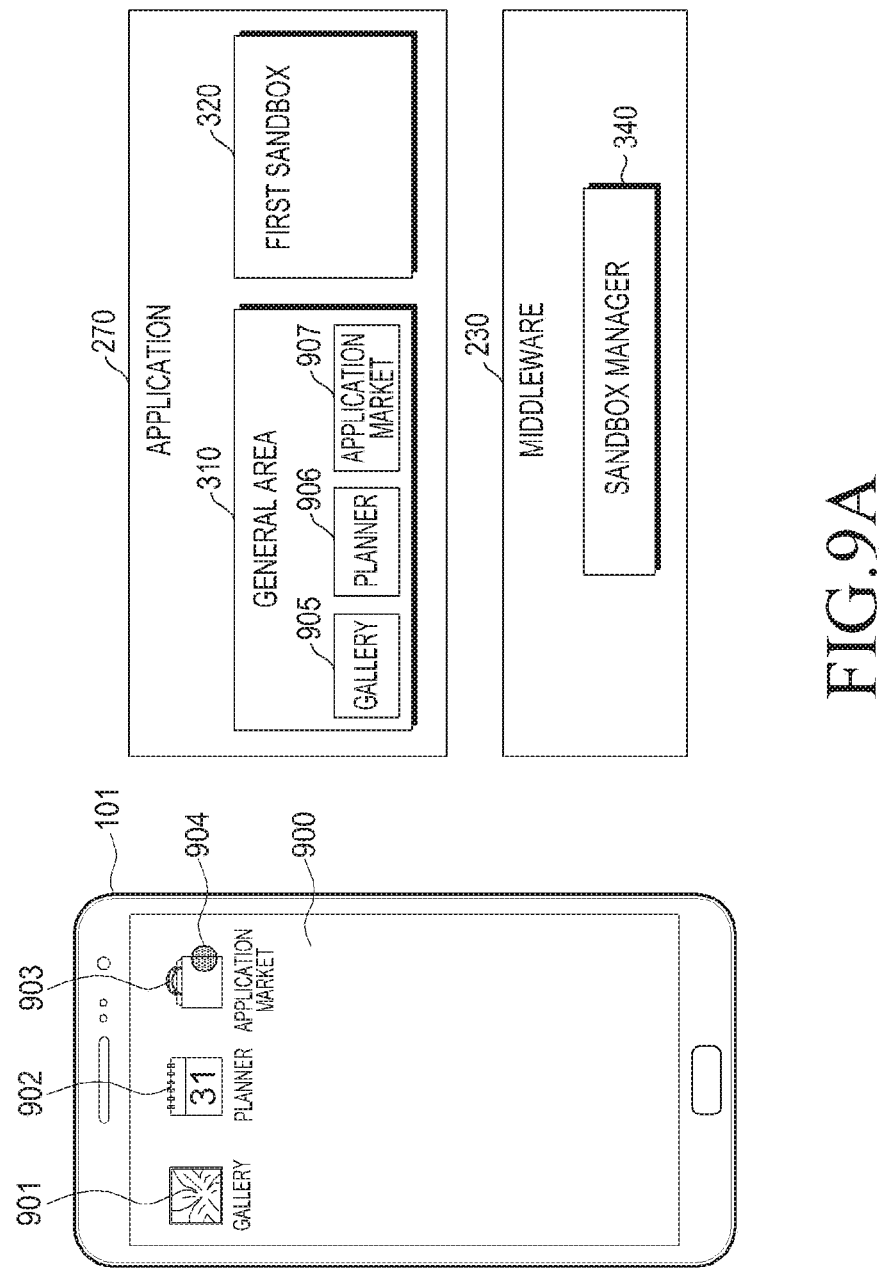
FIGS. 9A to 9H are conceptual diagrams illustrating screens of an electronic device according to an embodiment of the present disclosure.

Referring to FIG. 9A, the electronic device 101 displays a menu screen 900 in the general area. The menu screen 900 is a screen of a launcher application and may be also called a launch application execution screen according to an embodiment of the present disclosure. The electronic device 101 displays one or more application execution icons 901, 902, and 903. For example, the electronic device 101 may display an execution icon 901 of a gallery application, an execution icon 902 of a planner application, and an execution icon 903 of an application market application. In this case, the electronic device 101 may pre-install a gallery application 905, a planner application 906, and an application market application 907 in the general area 310. Meanwhile, the electronic device 101 may acquire an execution command according to designation 904 of the execution icon 903 of the application market application.

Figure 9B:
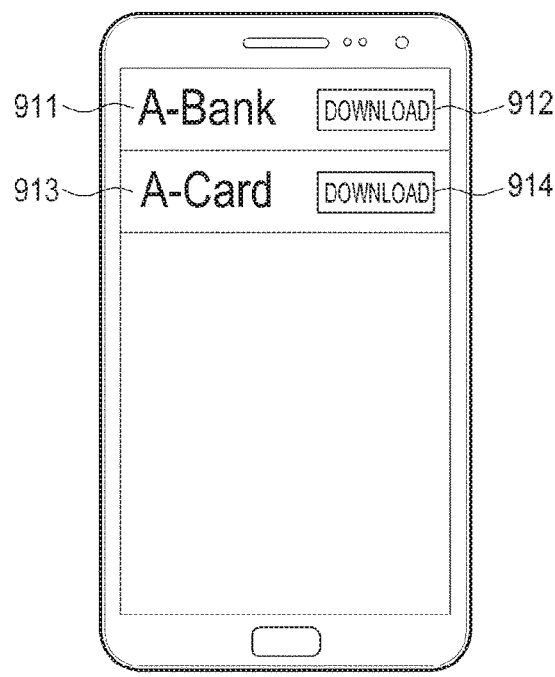
Figure 9C:
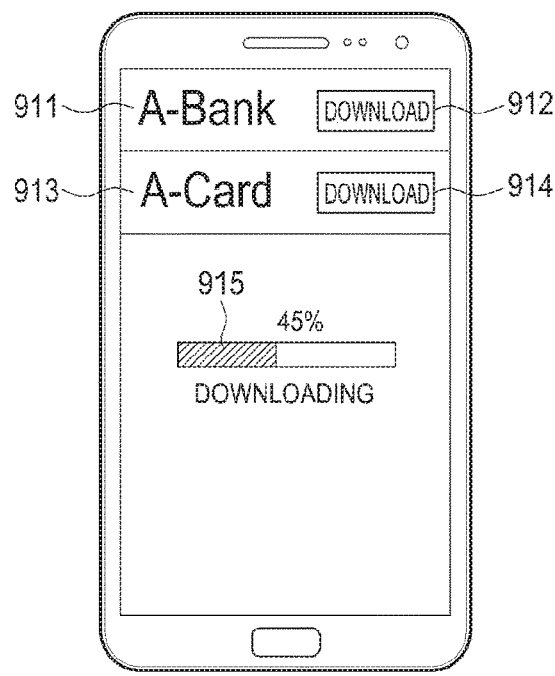

Referring to FIG. 9B, the electronic device 101 may execute the application market application according to the execution command. The electronic device 101 may display an execution screen of the application market application, and the execution screen may include applications 911 and 913 uploaded to the application market and download command objects 912 and 914. For example, it is assumed that the electronic device 101 downloads an "A-bank application" 911. The user may designate the download command object 912. The electronic device 101 may download the "A-bank application" 911 from the application market in response to the download command object 912. FIG. 9C is a conceptual diagram illustrating the electronic device 101 that displays a download progress status 915 of the "A-bank application" 911. When the download is completed, the electronic device 101 may install the downloaded application 931.

Figure 9D:
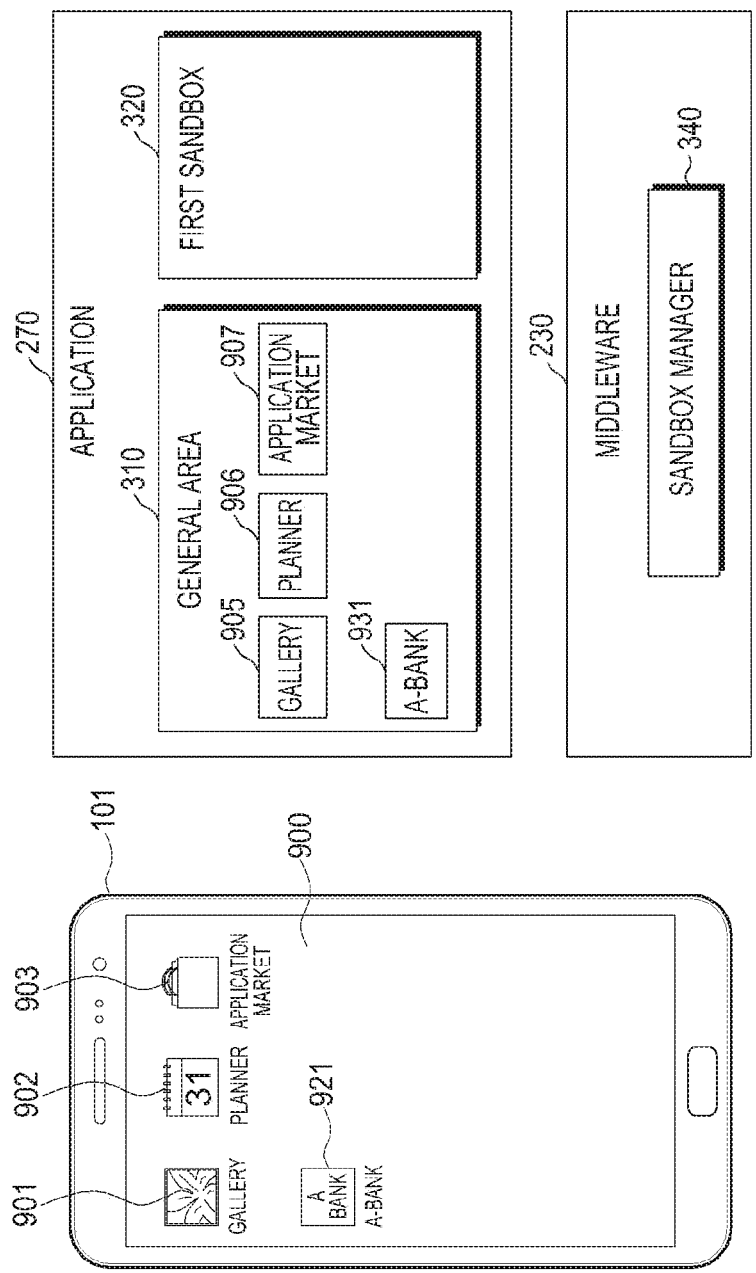
Figure 9E:
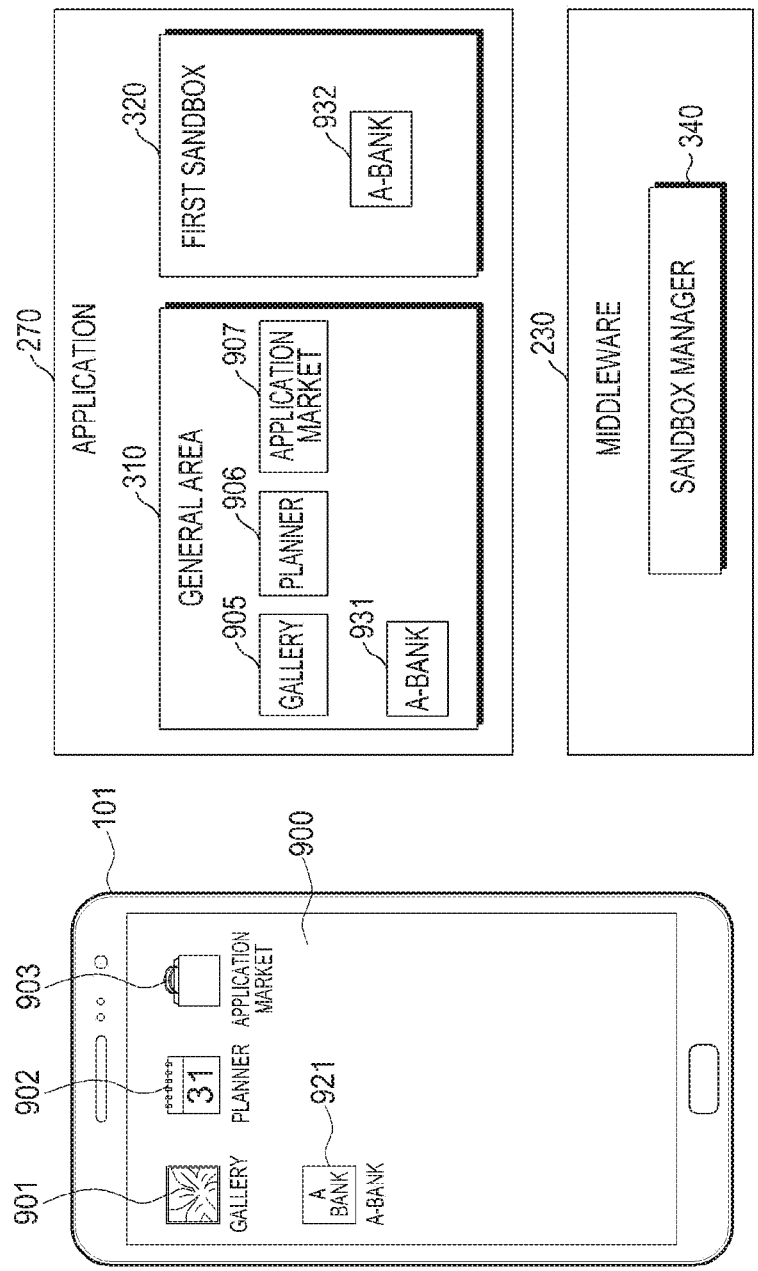

The electronic device 101 may allocate the application 931 to the general area 310 as illustrated in FIG. 9D. The electronic device 101 may determine whether the application 931 is the application to be executed in the first sandbox 320. For example, the electronic device 101 may determine whether the application 931 is the application to be executed in the sandbox by identifying metadata of the application 931. When it is determined that the downloaded application 931 is the application to be executed in the sandbox, the electronic device 101 may allocate a first application 932 to the first sandbox 320 as illustrated in FIG. 9E. The electronic device 101 may not further display an execution icon 921 of the installed application on the menu screen 900. Thereafter, when the execution screen 921 is designated, the electronic device 101 may execute the "A-bank application" in the first sandbox 320. For example, the electronic device 101 may not share data and code execution from the "A-bank application" with an application allocated outside the first sandbox 320.

Figure 9F:
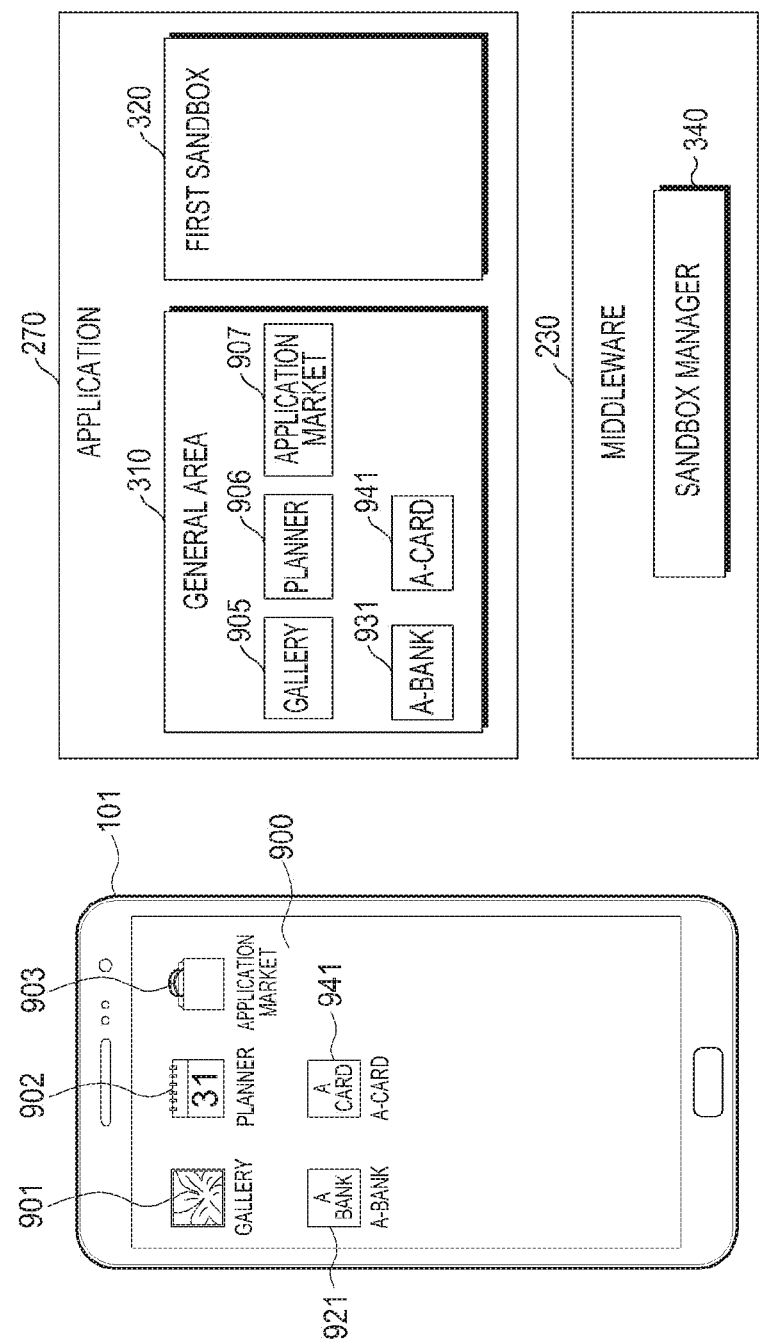
Figure 9G:
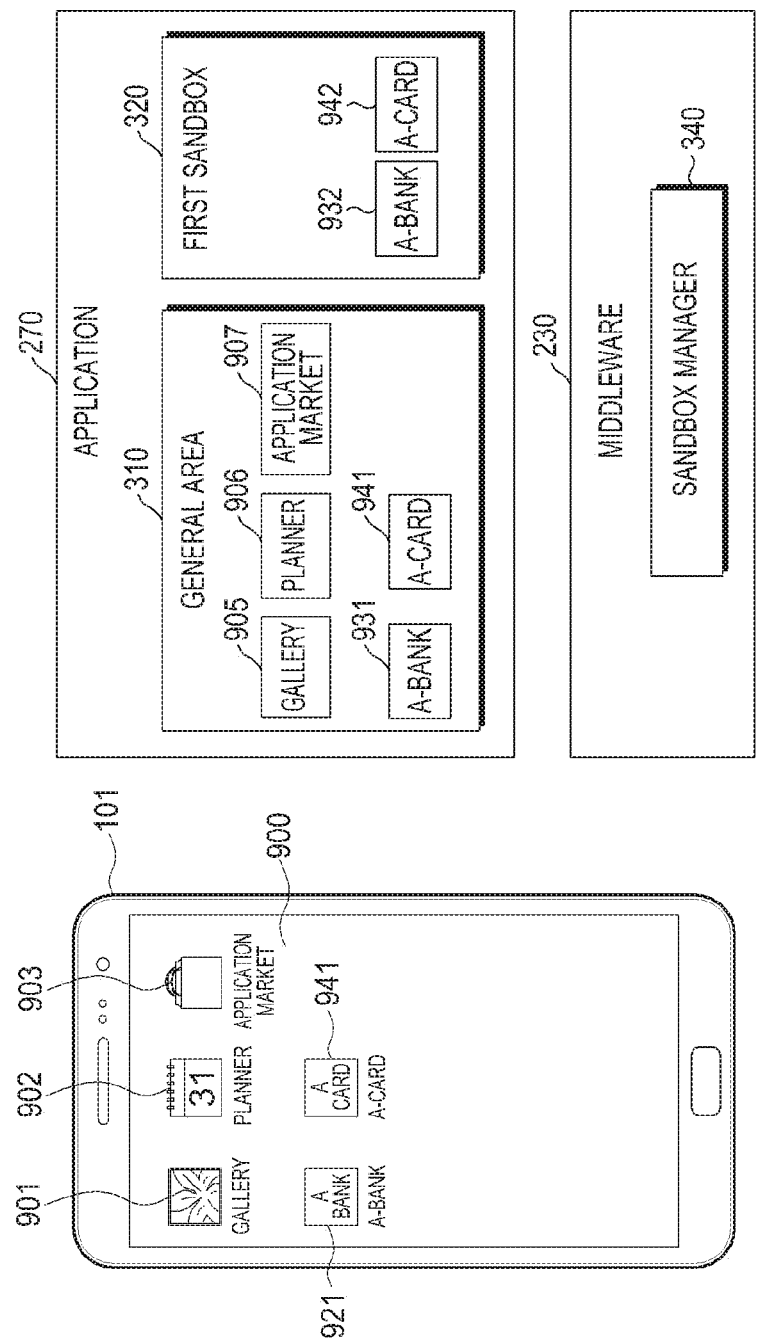

The electronic device 101 may also download a second application related to the first application. For example, as illustrated in FIGS. 9F and 9G, the electronic device 101 may also download an "A-card application" related to the "A-bank application". The electronic device 101 may allocate the downloaded "A-card application" 941 to the general area 310 and "A-card application" 942 to the first sandbox 320.

The second application may be executed in the same sandbox in which the first application is executed. Accordingly, the electronic device 101 may install and allocate the "A-card application" 942 to the first sandbox 320. Further, the electronic device 101 may not further display an execution icon 940 of the installed application on the menu screen 900. Thereafter, when the execution screen 940 is designated, the electronic device 101 may execute the "A-card application" 942 in the first sandbox 320. For example, the electronic device 101 may not share data and code execution from the "A-card application" with other applications, which are not allocated to the first sandbox 320. Meanwhile, the electronic device 101 may share input/output data from the "A-card application" with the "A-bank application". The second application is an application related to the first application and may include, for example, an application developed by the same developer, which develops the first application, an application related to authentication or password required when the first application is executed, and the like, but there is no limitation on the type of application. The second application is executed in the same sandbox in which the first application is executed and may be an application corresponding to the same domain identifier.

Figure 9H:
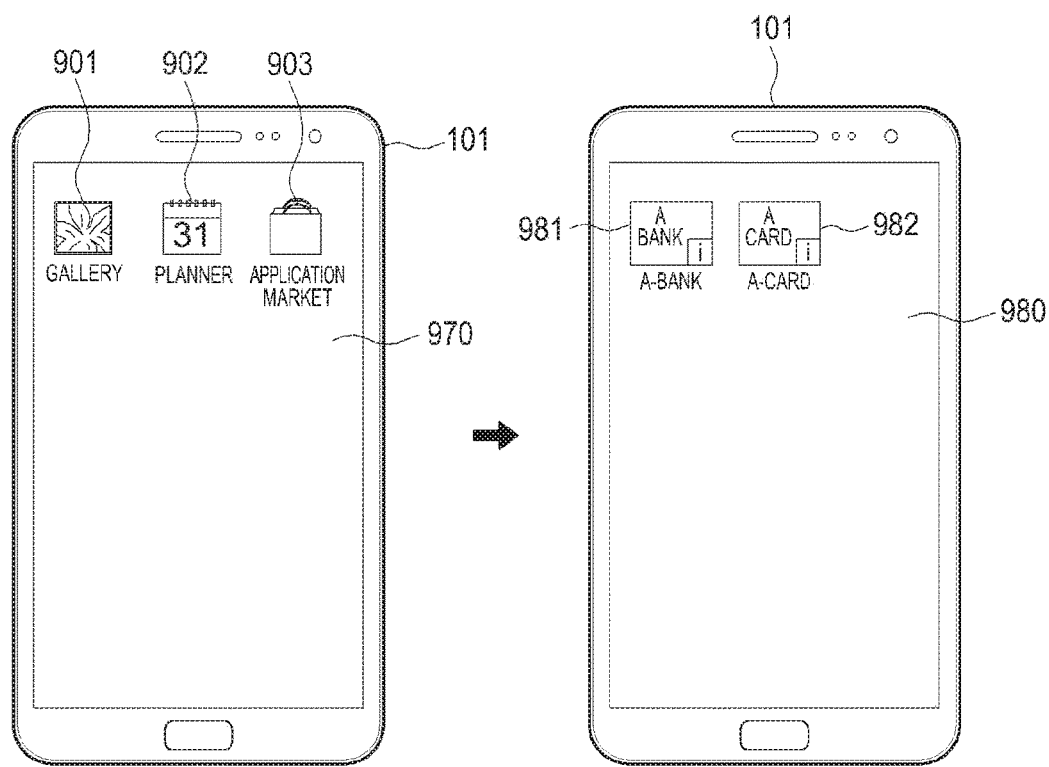

FIG. 9H illustrates screens 970 and 980 of the electronic device according to a comparative example to be compared with the present disclosure. The electronic device 101 according to the comparative example may display a screen 970 corresponding to the general area. The screen 970 corresponding to the general area may include execution icons 971, 972, and 973 for applications allocated to the general area. The screen 970 corresponding to the general area may be an execution screen of a launcher application allocated to the general area. For example, in the comparative example, the general area may correspond to a user identifier of "0", and the screen 970 corresponding to the general area may be a screen in a case where a user having the user identifier of "0" logs in.

In the comparative example, the sandbox may correspond to a user identifier of "200". When a user having the user identifier of "200" logs in, the electronic device 101 according to the comparative example may display a screen 980 corresponding to the first sandbox. As illustrated in FIG. 9H, the screen 980 corresponding to the first sandbox may include application execution icons 981 and 982 allocated to the first sandbox. The electronic device 101 according to the comparative example may also display an additional identification object such as "!" next to first application execution icons 981 and 982 to be compared with first application execution icons 901, 902, and 903 corresponding to the general area. As described above, the electronic device 101 according to the comparative example may differently display the corresponding screens 970 and 980 according to each user. Accordingly, the user may additionally input a command for the log-in with the user identifier of "200" to execute the application in the security mode.

In contrast, the electronic device 101 according to various embodiments of the present disclosure may display execution icons of all applications allocated to the general area and the sandbox on a single screen as illustrated in FIG. 9G, and may determine one of the general area and the sandbox area as an execution area of the application by identifying metadata. Accordingly, even though the electronic device 101 does not receive a particular additional command from the user, the electronic device 101 may execute the application in the sandbox.

Figure 10:
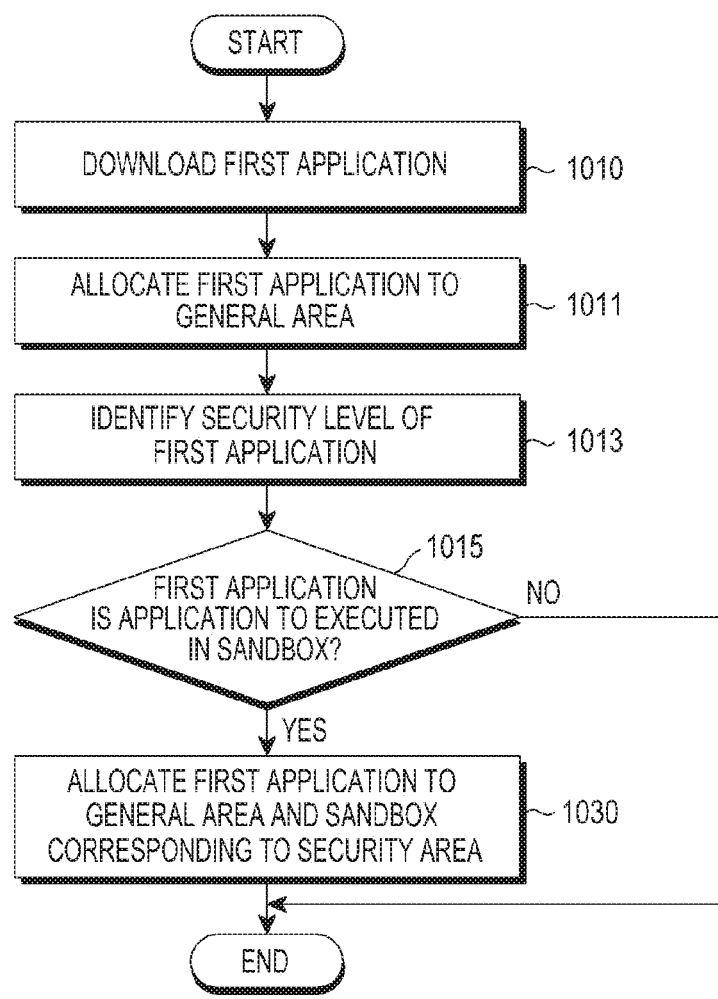
FIG. 10 is a flowchart illustrating a control method of an electronic device according to an embodiment of the present disclosure.

FIG. 10 is a flowchart illustrating a control method of an electronic device according to an embodiment of the present disclosure.

Referring to FIG. 10, the electronic device 101 downloads and installs the first application in step 1010. The electronic device 101 may receive a security level of the first application. For example, the electronic device 101 may receive a first application package including the security level from an application market. The security level may be included in metadata of the first application. Alternatively, the electronic device 101 may receive the security level separately from the first application.

In step 1011, the electronic device 101 allocates the first application to the general area.

The electronic device 101 identifies the security level of the first application in step 1013. For example, the electronic device 101 may identify the security level within the application package, the metadata, or the separately received security level.

In step 1015, the electronic device 101 determines whether the first application is an application to be allocated to the security area. For example, the electronic device 101 may determine whether the first application is the application to be allocated to the security area based on the identified security level. According to various embodiments of the present disclosure, the electronic device 101 may pre-store correlation information between the security level and the sandbox. For example, the electronic device 101 may pre-store correlation information such as contained in Table 2.

TABLE 2

| Security level | Application allocation area |
|---|---|
| 0 | General area |
| 1 | General area and first sandbox |
| 2 | General area and second sandbox |

When it is determined that the first application is the application to be allocated to the security area, the electronic device 101 allocates the first application to the general area and the sandbox corresponding to the security area in step 1030. When it is determined that the first application is not the application to be allocated to the security area, the electronic device 101 may allocate the first application only to the general area. Although the security level is expressed by discrete values of 0, 1, and 2 in Table 2, it is only an example and it may be easily understood by those skilled in the art that there is no limitation on a security level form.

Figure 11:
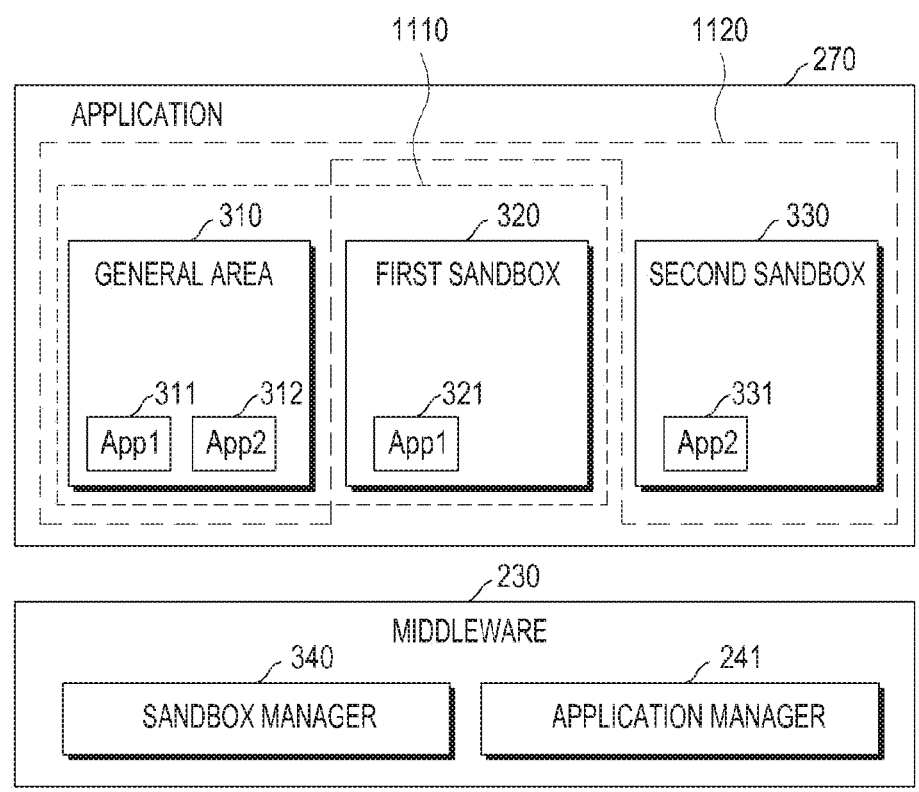
FIG. 11 is a block diagram illustrating a program module according to an embodiment of the present disclosure.

For example, it is assumed that the electronic device 101 downloads the first application and the second application. In this case, the electronic device 101 may identify that the security level of the first application is 1 and the security level of the second application is 2. The electronic device 101 may determine the allocation area of the first application as the general area and the first sandbox based on the correlation information between the security level and the allocation area such as indicated in Table 2. The electronic device 101 may determine the allocation area of the second application as the general area and the second sandbox based on the correlation information between the security level and the allocation area such as indicated in Table 2. Accordingly, as illustrated in FIG. 11, the electronic device 101 may allocate the first application to a determined area 1110, that is, the general area 310 and the first sandbox 320. The electronic device 101 may allocate the first application to a determined area 1120, that is, the general area 310 and the second sandbox 330.

According to another embodiment of the present disclosure, the electronic device 101 may not allocate the application to any area and first identify the security level. The electronic device 101 may allocate the application to at least one of the general area and the sandbox in accordance with the identified security level.

As described above, various embodiments of the present disclosure may provide an electronic device, which can identify whether to allocate the application to the sandbox by identifying various pieces of metadata of the application. Accordingly, an application designer or provider, rather than a user of the electronic device or a security manager, may determine whether to allocate the application to the sandbox.

Figure 12:
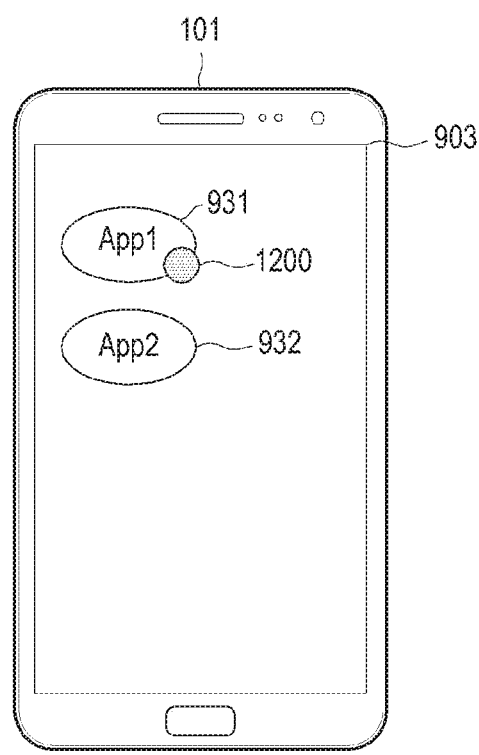
FIG. 12 is a conceptual diagram illustrating execution of an application according to an embodiment of the present disclosure.

FIG. 12 is a conceptual diagram illustrating execution of an application according to an embodiment of the present disclosure. In the embodiment of FIG. 12, it is assumed that the electronic device 101 allocates the first application to the general area and the first sandbox and allocates the second application to the general area and the second sandbox. Further, it is assumed that the electronic device 101 matches the general area to the user identifier of "0", matches the first sandbox to the user identifier of "200" and matches the second sandbox to the user identifier of "201".

Referring to FIG. 12, the electronic device 101 displays a screen 930 including execution icons 931 and 932 of all applications allocated to the general area, the first sandbox, and the second sandbox. The electronic device 101 may acquire an application execution command such as a touch gesture 1200 on the execution icon.

When the first application execution icon 931 is designated, the electronic device 101 may execute the first application. When the user having the user identifier of "0" logs in, the electronic device 101 may execute the first application in the general mode. That is, the electronic device 101 may execute the first application allocated to the general area. When the user having the user identifier of "200" logs in, the electronic device 101 may execute the first application in the security mode. That is, the electronic device 101 may execute the first application allocated to the general area. Accordingly, even though the electronic device 101 does not receive a particular additional command from the user, the electronic device 101 may execute the application in the sandbox.

Figure 13:
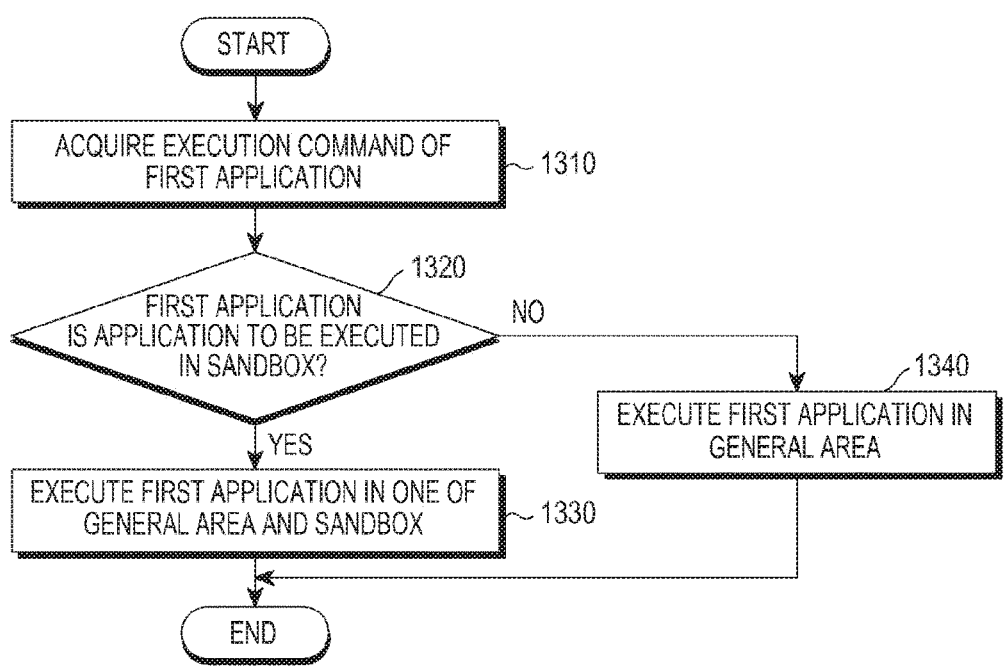
FIG. 13 is a flowchart illustrating a method of executing an application according to an embodiment of the present disclosure.

FIG. 13 is a flowchart illustrating a method of executing an application according to an embodiment of the present disclosure.

Referring to FIG. 13, in step 1310, the electronic device 101 acquires the first application execution command. For example, as illustrated in FIG. 12, the electronic device 101 may display a first application execution icon and acquire an application execution command through designation of the displayed execution icon such as a touch gesture.

In step 1320, the electronic device 101 determines whether the first application is an application to be executed in the sandbox. According to various embodiments of the present disclosure, the application may include metadata indicating whether the application is executed in the sandbox. For example, the metadata may be data directly indicating whether the application is executed in the sandbox or may be a security level. As described above, the application may include the metadata when the application is downloaded or the electronic device 101 may also receive the corresponding metadata when the application is downloaded. The electronic device 101 may store the received metadata and refer to the metadata at a later time. According to various embodiments of the present disclosure, the metadata indicating whether the application is the application to be allocated to the sandbox and the metadata indicating whether the application is the application to be allocated to the sandbox may be the same as each other.

The electronic device 101 may also generate metadata when the application is installed. In this case, the metadata may be included in an application package and may be generated when the application is installed. The electronic device 101 may refer to the metadata at the installation time.

When it is determined that the first application is the application to be executed in the sandbox, the electronic device 101 executes the first application in one area of the general area and the sandbox in step 1330. According to various embodiments of the present disclosure, the electronic device 101 may determine the area in which the first application is executed as one of the general area and the sandbox.

When an application is to be executed in the sandbox, the electronic device 101 may enforce the execution of the corresponding application within the sandbox, which may be called an enforcement mode. In the enforcement mode, the electronic device 101 may execute the first application. When the sandbox has not yet been generated or the first application has not yet been generated in the sandbox due to an allocation delay time, the electronic device 101 may pause or stop the execution of the first application. Alternatively, the electronic device 101 may inquire about the execution of the first application in the general area while displaying a statement that execution of the first application in the sandbox is impossible. When an execution command in the general area is received, the electronic device 101 may execute the first application in the general area.

The electronic device 101 may inquire about an execution area of the first application. For example, the electronic device 101 may display a graphic user interface, which may determine one of the general area and the sandbox as the execution area of the first application and receive a selection command of one of the two areas. The electronic device 101 may execute the first application in one of the general area and the sandbox according to the received selection command.

When it is determined that the first application is not the application to be executed in the sandbox, the electronic device 101 executes the first application in the general area in step 1340.

Figure 14:
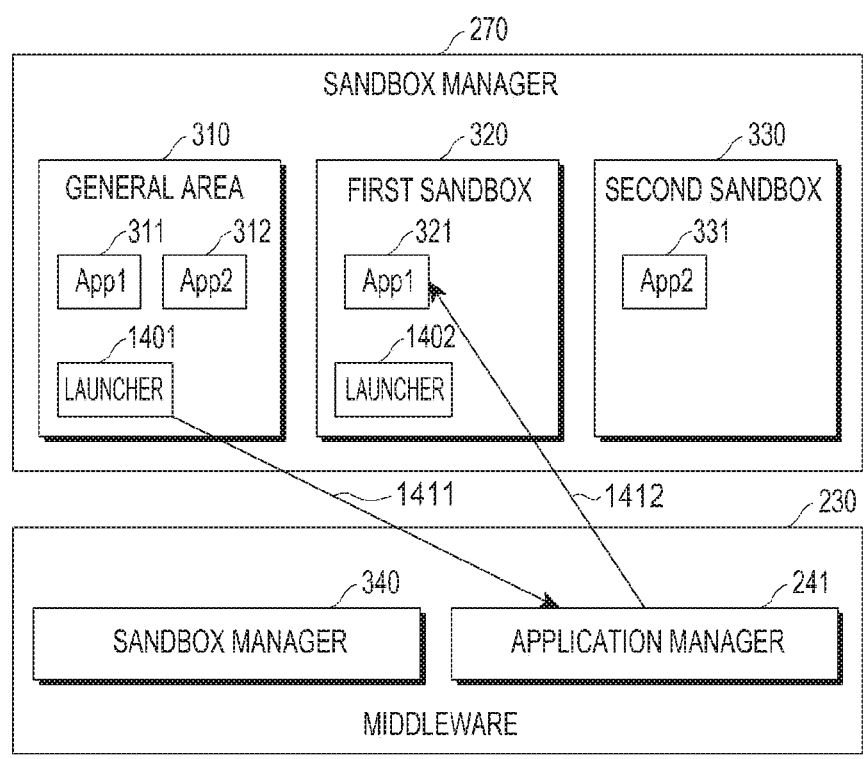
FIG. 14 is a conceptual diagram illustrating a process of executing an application.

FIG. 14 is a conceptual diagram illustrating a process of executing an application.

Referring to FIG. 14, a launcher application 1401 allocated to the general area 310 may receive an application execution command. More specifically, the launcher application may display execution icons related to all the applications allocated to the general area 310, the first sandbox 320, and the second sandbox 330 of the electronic device 101. When the execution icon is designated, the launcher application 1401 may identify shortcut information corresponding to the execution icon. The shortcut information may include a unique value which may distinguish between applications, such as a package name of the application. The launcher application 1401 may identify information required for executing the first application based on the identified shortcut information and output an execution request 1411 to the application manager 241 together with the identified information.

The application manager 241 may receive the execution request 1411 and determine whether the corresponding application is the application to be executed in the sandbox. According to an embodiment of the present disclosure, the application manager 241 may determine whether the corresponding application is the application to be executed in the sandbox by identifying metadata of the application. For example, the application manager 241 may further include a check module that identifies a user mode, and the check module may determine whether the corresponding application is the application to be executed in the sandbox. For example, when the first application is produced based on the Android® OS, the application manager 241 may determine whether the corresponding application is the application to be executed in the sandbox according to whether particular data is included in a file of AndroidManifest.xml.

As described above, the application manager 241 may inquire about whether to execute the first application in the sandbox. The application manager 241 may inquire about whether to execute the first application in the sandbox whenever the first application is executed or inquire about whether to execute the first application in the sandbox when the first application is initially executed. Alternatively, the application manager 241 may control the first application in the sandbox without any inquiry to or response from the user as indicated by reference numeral 1412.

The application manager 241 may also refer to an authentication result when the application is executed. As described above, the electronic device 101 according to various embodiments of the present disclosure may transmit an authentication request to a security server (not shown) when the application is downloaded, and receive and store an authentication result. When the application is executed, the application manager 241 may determine whether to execute the application in the sandbox with reference to the stored authentication result. When the application is executed, the application manager 241 determines to execute the application in the general area or the sandbox or whether to execute the application or not with reference to the stored authentication result.

Figure 15:
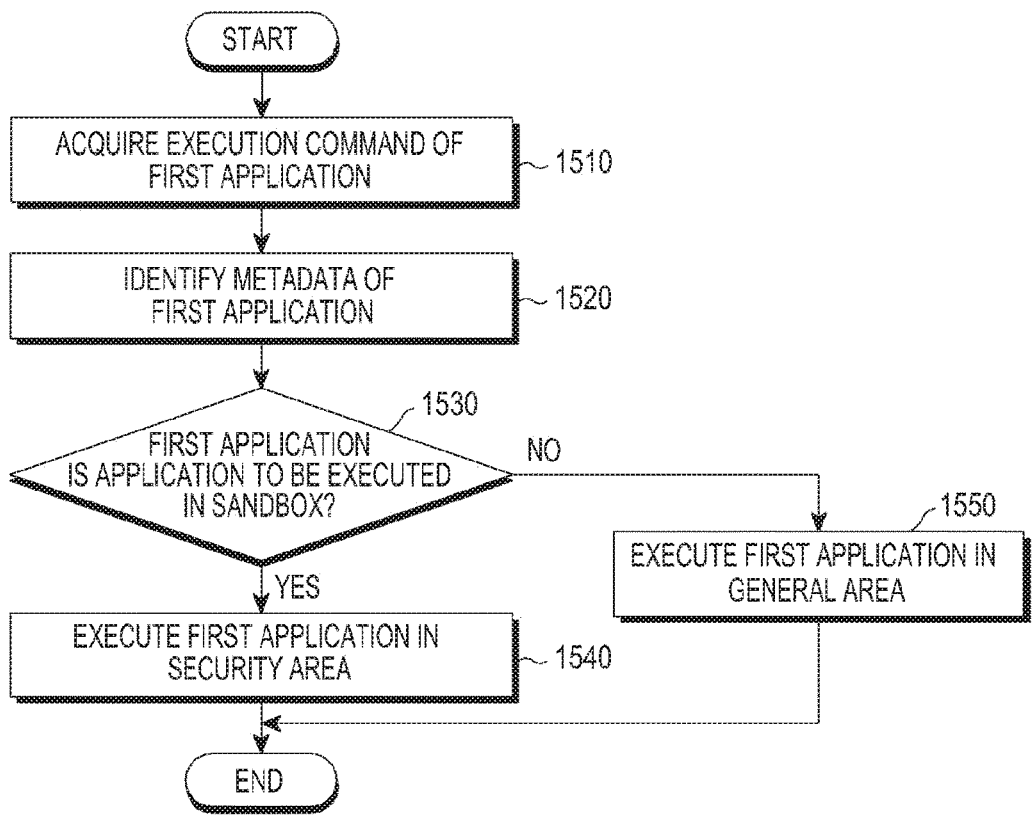
FIG. 15 is a flowchart illustrating a method of executing an application according to an embodiment of the present disclosure.

FIG. 15 is a flowchart illustrating a method of executing an application according to an embodiment of the present disclosure.

Referring to FIG. 15, in step 1510, the electronic device 101 acquires the first application execution command. The electronic device 101 identifies metadata of the first application in step 1520. The first application may include metadata indicating whether the first application is executed in the sandbox or the application manager may manage the metadata corresponding to the first application. For example, the metadata may be implemented by particular data, a security level, or an authentication result.

In step 1530, the electronic device 101 determines whether the first application is an application to be executed in or allocated to the security area. When it is determined that the first application is the application to be executed in the security area, the electronic device 101 executes the first application in the security area in step 1540. When it is determined that the first application is not the application to be executed in the security area, the electronic device 101 executes the first application in the general area in step 1550. According to an embodiment of the present disclosure, the electronic device 101 may execute the first application in the security area without separate user switching. According to another embodiment of the present disclosure, the electronic device 101 may execute the first application in the security area after performing a process for separate user switching.

Figure 16:
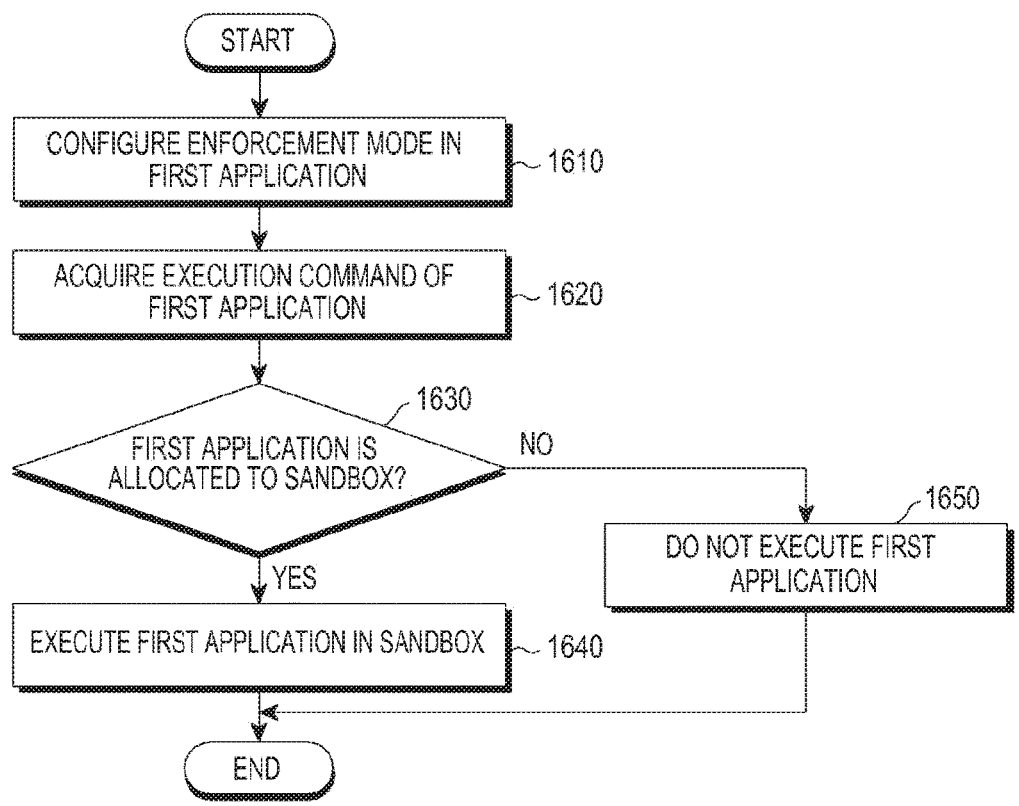
FIG. 16 is a flowchart illustrating a process of configuring an enforcement mode according to an embodiment of the present disclosure.

FIG. 16 is a flowchart illustrating a process of configuring an enforcement mode according to an embodiment of the present disclosure.

Referring to FIG. 16, the electronic device 101 configures an enforcement mode in the first application in step 1610. As described above, the enforcement mode may be a mode for enforcing the execution of the first application only in the sandbox. For example, the application manager 261 may configure the enforcement mode in the first application.

In step 1620, the electronic device 101 acquires the first application execution command.

Figure 17:
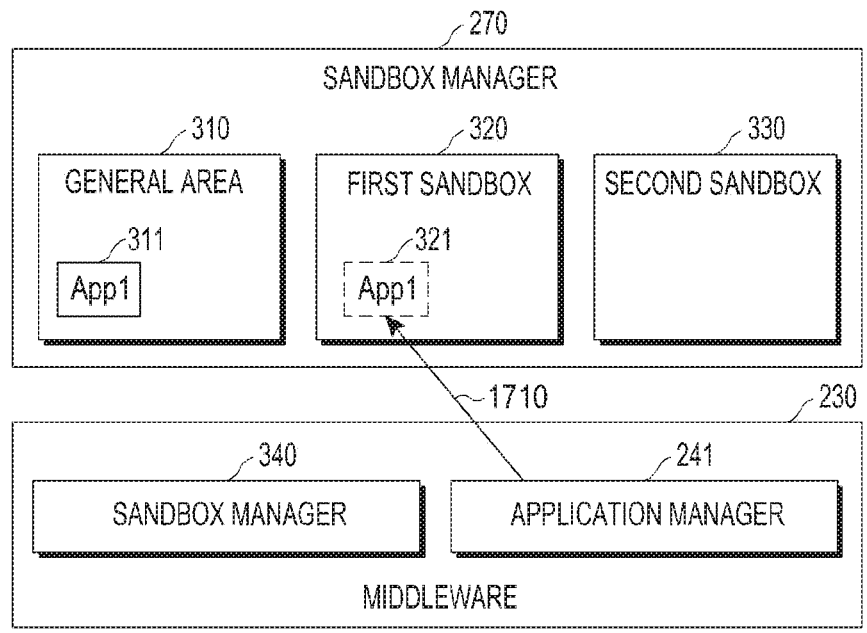
FIG. 17 is a block diagram illustrating a program module according to an embodiment of the present disclosure.

In step 1630, the electronic device 101 determines whether the first application is allocated to the sandbox for security. When the first application is allocated to the sandbox, the electronic device 101 executes the first application in the sandbox in step 1640. When the first application is not allocated to the sandbox, the electronic device 101 does not execute the first application in step 1650. Alternatively, the electronic device 101 may wait for the allocation of the first application to the sandbox and execute the first application in the sandbox after the allocation. For example, as illustrated in FIG. 17, the application manager 241 determines whether the first application is allocated to the first sandbox 320 as indicated by reference numeral 1710.

Figure 18:
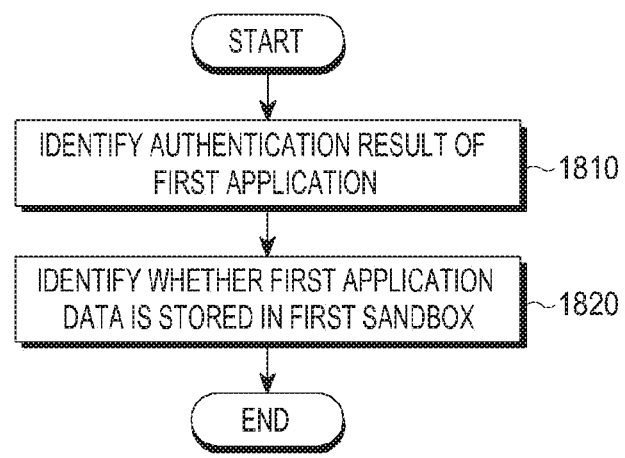
FIG. 18 is a flowchart illustrating a method of determining whether an application is allocated to a sandbox according to an embodiment of the present disclosure.

FIG. 18 is a flowchart illustrating a method of determining whether an application is allocated to a sandbox according to an embodiment of the present disclosure.

Referring to FIG. 18, the electronic device 101 identifies an authentication result of the first application in step 1810. As described above, the electronic device 101 according to various embodiments of the present disclosure may transmit an authentication request to a security server (not shown) when the application is downloaded, and receive and store an authentication result. The electronic device 101 may determine whether the application is properly installed with reference to the stored authentication result. When the authentication results in success, the electronic device 101 may determine that the first application is properly installed and allocated. When the authentication results in failure, the electronic device 101 may determine that the first application is not allocated to the sandbox.

In step 1820, the electronic device 101 determines whether the first application data is stored in the first sandbox. For example, the application manager may determine whether the first application data is stored in resources of the electronic device 101 corresponding to the sandbox. When it is determined that the first application data is stored in the sandbox, the electronic device 101 may determine that the first application is allocated to the sandbox. When it is determined that the first application data is not stored in the sandbox, the electronic device 101 may determine that the first application is not allocated to the sandbox.

Figure 19:
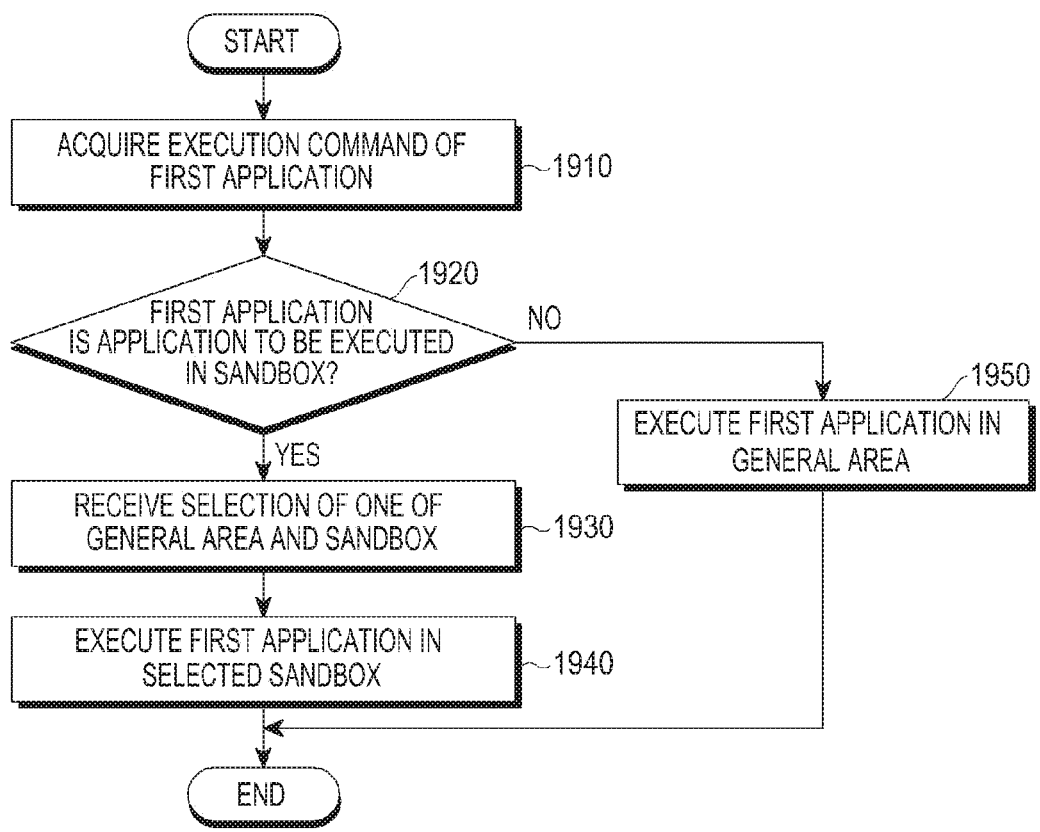
FIG. 19 is a flowchart illustrating a method of executing an application according to an embodiment of the present disclosure.
Figure 20:
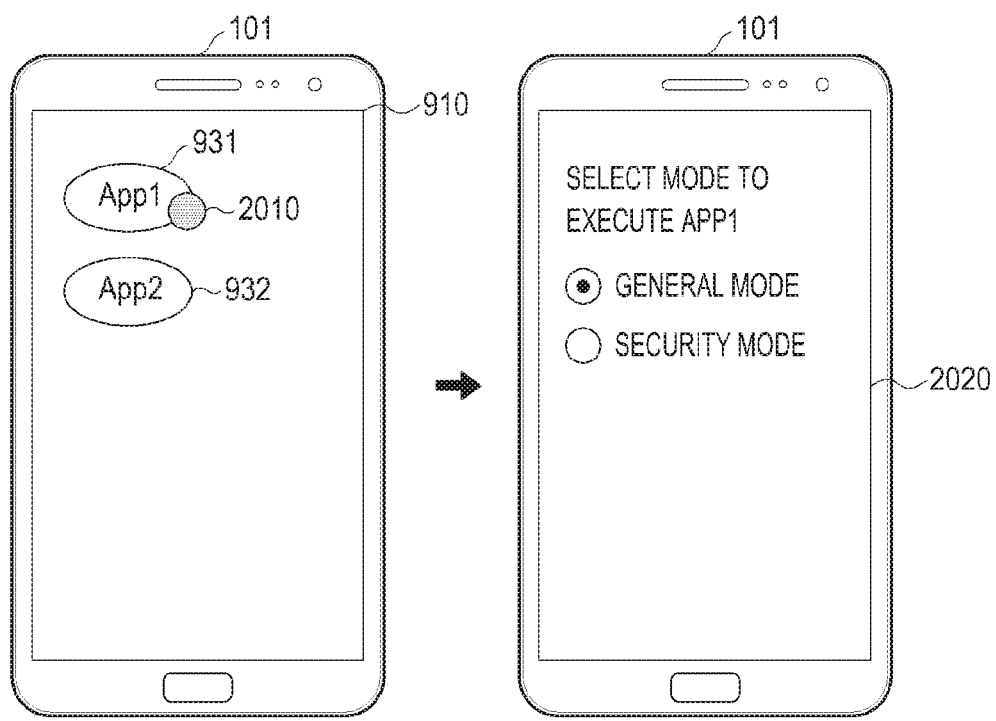
FIG. 20 is a conceptual diagram illustrating a screen of an electronic device according to an embodiment of the present disclosure.

FIG. 19 is a flowchart illustrating a method of executing an application according to an embodiment of the present disclosure, and FIG. 20 is a conceptual diagram illustrating a screen of an electronic device according to an embodiment of the present disclosure.

Referring to FIG. 19, in step 1910, the electronic device 101 acquires the first application execution command. For example, the electronic device 101 may display a screen including the application execution icons 931 and 932 as illustrated in FIG. 20. The electronic device 101 acquires, for example, a touch gesture 2010 for the first application execution icon 931.

In step 1920, the electronic device 101 determines whether the first application is an application to be executed in the sandbox. For example, the electronic device 101 may determine whether the first application is the application to be executed in the sandbox with reference to metadata of the first application.

When it is determined that the first application is the application to be executed in the sandbox, the electronic device 101 receives selection of one of the general area and the sandbox in step 1930. For example, the electronic device 101 may display a graphic user interface 2020 as illustrated in FIG. 20. The graphic user interface 2020 according to various embodiments of the present disclosure may be a selection window for an area to execute the first application. The graphic user interface 2020 may receive selection of one of the general mode and the security mode.

In step 1940, the electronic device 101 executes the first application in one area of the general area and the sandbox according to the selection.

When it is determined that the first application is not the application to be executed in the sandbox, the electronic device 101 executes the first application in the general area in step 1950.

Figure 21A:
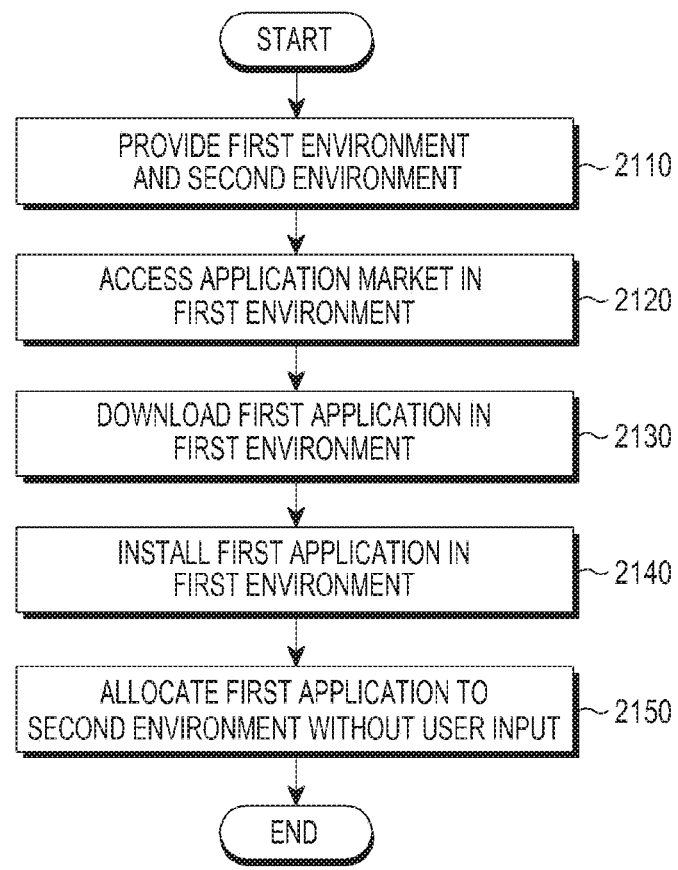
FIGS. 21A and 21B are flowcharts illustrating a control method of an electronic device according to an embodiment of the present disclosure.

FIG. 21A is a flowchart illustrating a control method of an electronic device according to an embodiment of the present disclosure.

Referring to FIG. 21A, in step 2110, the electronic device 101 provides a first environment, for example, the general area in which at least one application program may operate, and a second environment, for example, the sandbox having an operation environment which is partially different from the general area.

In step 2120, the electronic device 101 accesses an application market provided by an external server through a communication module, at least partially in response to a first input of the user in the first environment.

In step 2130, the electronic device 101 downloads the selected first application from the application market and installs the downloaded first application at least partially in response to a second input of the user in the first environment.

In step 2140, the electronic device 101 allocates the installed first application to the first environment.

In step 2150, the electronic device 101 allocates the installed first application to the second environment without any input from the user.

The first application may further include metadata indicating whether the first application is an application to be executed in the second environment. The electronic device 101 may generate the second environment, which has not yet been generated in the electronic device, based on the metadata.

The metadata may include at least one of particular data, a security level of the first application, and authentication related data for security.

The electronic device 101 may determine whether to allocate the first application to the second environment for security according to the security level.

The electronic device 101 may transmit an authentication request for the first application to the security server and receive an authentication result that responds to the authentication request from the security server.

The electronic device 101 may determine whether to allocate the first application to the second environment based on the authentication result and allocate the first application to the second environment according a result of the determination on the allocation. The authentication request may include at least one of a security key for the authentication and an encoded value by the security key.

The electronic device 101 may further include an operation for displaying execution icons for executing the applications allocated to the first environment and the second environment on a single screen. The second environment may be made to correspond with each user identifier.

Figure 21B:
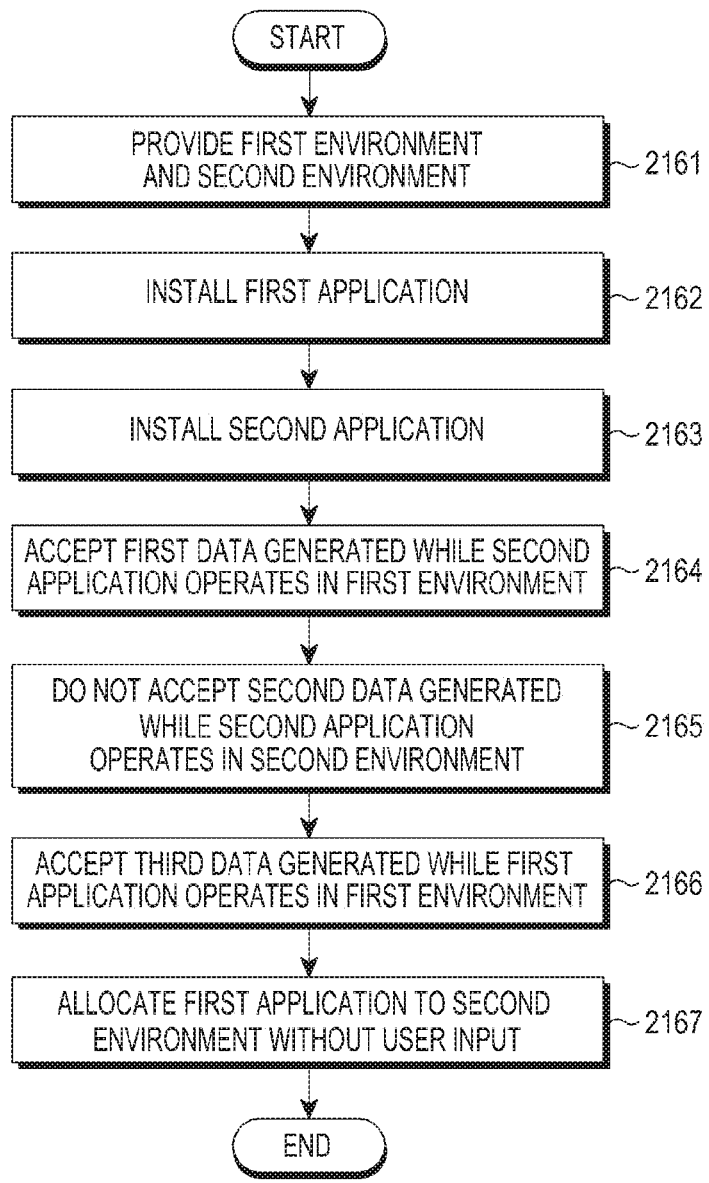

FIG. 21B is a flowchart illustrating a control method of an electronic device according to an embodiment of the present disclosure.

Referring to FIG. 21B, in step 2161, the electronic device 101 provides the first environment and the second environment in which at least one application program may operate.

In step 2162, the electronic device 101 installs the first application which operates only in the first environment. In step 2163, the electronic device 101 installs the second application which selectively operates in at least one of the first environment and the second environment.

In step 2164, the electronic device 101 accepts the access of first data, which is generated while the second application operates in the first environment, by the first application. In step 2165, the electronic device 101 may not accept the access of second data, which is generated while the second application operates in the second environment, by the first application. In step 2166, the electronic device 101 accepts the access of third data, which is generated while the first application operates in the first environment, by the second application. In step 2167, when the second application is installed, the electronic device 101 allocates the second application to at least the second environment without any input from the user.

The second application may include metadata indicating whether the second application is an application related to the second environment. The electronic device 101 may generate the second environment, which has not yet been generated in the electronic device, based on the metadata.

The metadata may include at least one of particular data, a security level of the second application, and authentication related data for security.

The electronic device 101 may determine whether to allocate the second application to the second environment for security according to the security level.

The electronic device 101 may transmit an authentication request for the second application to the security server and receive an authentication result that responds to the authentication request from the security server.

The electronic device 101 may determine whether to allocate the second application to the second environment based on the authentication result and allocate the second application to the second environment according a result of the determination on the allocation. The authentication result may include at least one of a security key for the authentication and an encoded value by the security key.

The electronic device 101 may further include an operation for displaying execution icons for executing the applications allocated to the first environment and the second environment on a single screen. The second environment may correspond with each user identifier.

Figure 22:
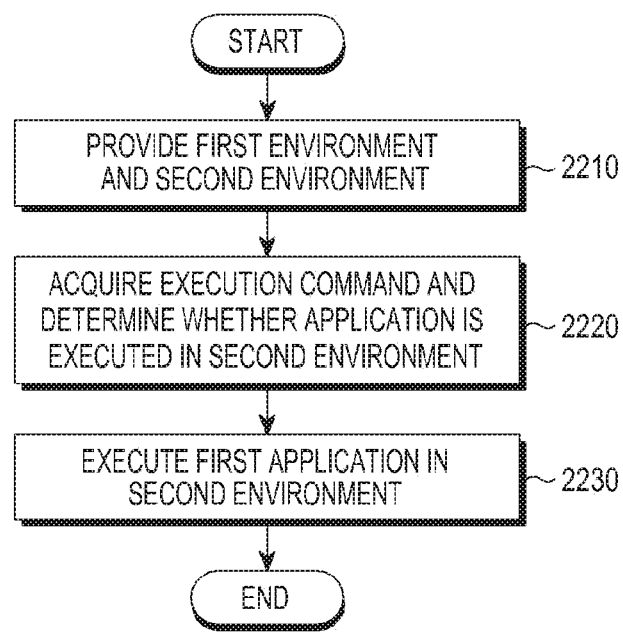
FIG. 22 is flowchart illustrating a control method of an electronic device according to an embodiment of the present disclosure.

FIG. 22 is flowchart illustrating a control method of the electronic device 101 according to an embodiment of the present disclosure:

Referring to FIG. 22, in step 2210, the electronic device 101 provides a first environment in which at least one application program may operate and a second environment having an operation environment which is at least partially different from the general area.

When the electronic device 101 acquires an execution command of a first application through the input/output interface, the electronic device 101 determines whether the first application is an application to be executed in the second environment in step 2220.

When it is determined that the first application is the application to be executed in the second environment, the electronic device 101 executes the first application in the second environment in step 2230.

According to various embodiments of the present disclosure, the electronic device 101 may display an execution icon of the first application and acquire designation of the displayed execution icon of the first application.

The first environment and the second environment may be made to correspond with each piece of user identification information.

The electronic device 101 may identify metadata, which is included in the first application, indicating whether the first application is executed in the second environment. The metadata may include at least one of data inserted into the first application when the first application is produced, a security level of the first application, and an authentication result of the first application.

The electronic device 101 may determine whether the first application is allocated to the second environment.

When the first application is not allocated to the second environment, the electronic device 101 may not execute the first application or may execute the first application in the first environment.

When the first application is allocated to the second environment, the electronic device 101 may execute the first application in the second environment.

The electronic device 101 may determine whether data of the first application is stored in the second environment.

When the electronic device 101 receives selection of one of the first environment and the second environment, the electronic device 101 may execute the first application in the selected area.

Figure 23:
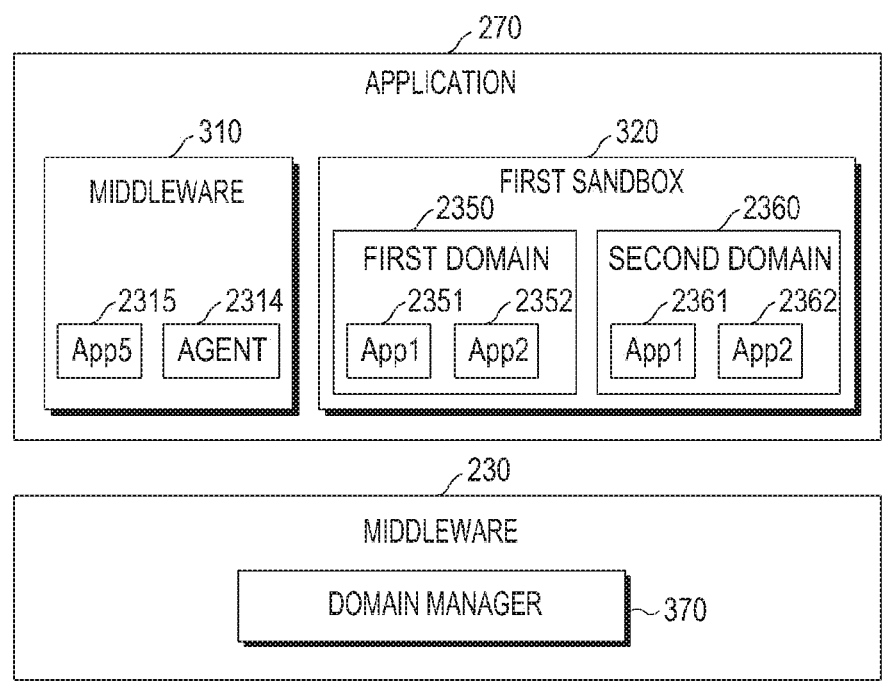
FIG. 23 is a block diagram illustrating a concept of a domain configured in an electronic device according to an embodiment of the present disclosure.

FIG. 23 is a block diagram illustrating a concept of a domain configured in the electronic device 101 according to an embodiment of the present disclosure.

Referring to FIG. 23, a first domain 2350 and a second domain 2360 are configured in the first sandbox 320. As described above, the first sandbox 320 may be configured according to a user identifier. A first application 2351 and a second application 2352 may be allocated to the first domain 2350, and a third application 2361 and a fourth application 2362 may be allocated to the second domain 2360 while the first application 2351, the second application 2352, the third application 2361, and the fourth application 2362 are allocated to the first sandbox 320. The first domain 2350 of the electronic device 101 according to various embodiments of the present disclosure may be implemented by context of input/output data of the first application 2351 and the second application 2352 allocated to the first domain 2350, and the context may be as follows:

```
"$ ls -lZ /home
drwx------ kdj kdj system_u:object_r:user_home_dir_t kdj
drwx------ fedora fedora root:object_r:user_home_dir_t fedora
$ ls -Z /etc/passwd
-rw-r--r-- root root system_u:object_r:etc_t /etc/passwd
$ "
```

As described above, the electronic device 101 may add a suffix of "_t" to the context of the input/output data of the allocation allocated to a particular domain, so as to indicate the application to be installed in or allocated to the particular domain. The suffix of "_t" is only an example, and the electronic device 101 may add a domain-related indication to the context of the input/output data of the application to be installed in or allocated to a particular domain in various manners.

The electronic device 101 may separate data of the application of the first domain 2350, from the application of the second domain 2360: For example, the electronic device 101 may control the rights of file read/write as determined by operating inside or outside the domain, and control whether to transmit/receive a system message or an OS intent. Accordingly, the application allocated to the first domain 2350 and the application allocated to the second domain 2360 may not share data and code execution.

A fifth application 2315 and an agent 2314 may be allocated to the general area 310 The agent 2314 may determine an allocation location of the application. For example, the agent 2314 may determine whether to allocate the application to the domain with reference to metadata of the application. The agent 2314 may provide an installation request including the allocation location of the application to the domain manager 370. The domain manager 370 may allocate the application to the domain while installing the application according to the installation request from the agent 2314. The agent 2314 may transmit an authentication request to the security server or receive a domain identifier from the security server.

The domain manager 370 may generate and delete the domain. The domain manager 370 may generate and delete the domain based on a security enhanced function. The domain manager 370 may allocate the application or a data processing area of a file to a particular domain.

Allocating the application to the particular domain or executing the application in the particular domain may be understood as adding the installed application to a list of applications included in the particular domain, for example, updating a database to operate the application based on the application of the database to a policy of the domain to which the installed application is allocated based on the policy. The agent 2314 may authenticate the application to be executed in the domain and output a domain identifier acquired according to the authentication to the domain manager 370.

The domain manager 370 may be implemented by the same entity as the sandbox manager 340. The domain manager 370 may be replaced with the sandbox manager 340.

Figure 24A:
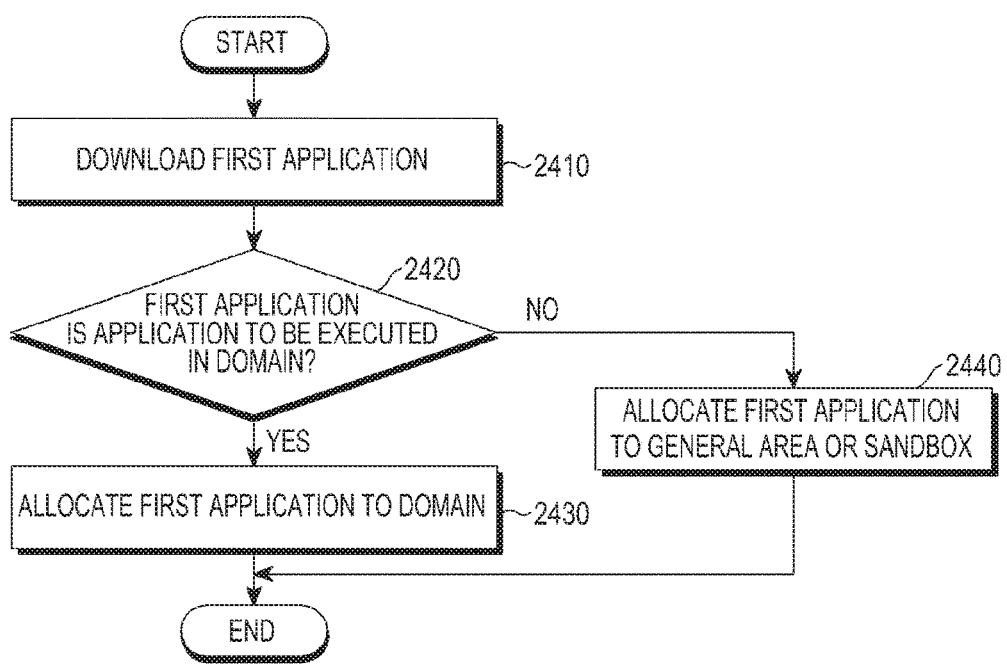
FIG. 24A is a flowchart illustrating a method of installing an application according to an embodiment of the present disclosure.

FIG. 24A is a flowchart illustrating a method of installing an application according to an embodiment of the present disclosure.

The electronic device 101 downloads a first application in step 2410. For example, the electronic device 101 may download the first application from an application market. Meanwhile, according to various embodiments of the present disclosure, the electronic device 101 may acquire an application through various paths such as Peer to Peer communication, email transmission, and transmission through access to an external memory as well as a general application download process.

In step 2420, the electronic device 101 determines whether the downloaded first application is an application to be executed in a domain. According to various embodiments of the present disclosure, the first application may include metadata indicating at least one of whether the first application is executed in the domain or the first application is allocated to the domain. For example, when the first application is produced based on an Android® OS, the first application may include metadata in the form in which particular data is inserted into a file of AndroidManifest.xml. However, the aforementioned example related to the Android® OS is only an example, and the electronic device 101 according to various embodiments of the present disclosure may also identify and manage metadata indicating whether applications produced based on various OSs are the applications executed in the domain. The metadata may be implemented in a simple flag form, and the electronic device 101 may determine whether the first application is the application to be executed in the domain according to the identification of the corresponding metadata.

The electronic device 101 may determine whether the downloaded first application is the application to be executed in the domain by identifying the metadata of the first application. For example, when the first application is produced based on the Android® OS, the electronic device 101 may determine whether the downloaded first application is the application to be executed in the domain by determining whether particular data is included in a file of AndroidManifest.xml of the first application.

When the first application is the application to be executed in the domain, the electronic device 101 installs and allocate the first application to the domain in step 2430. The electronic device 101 may allocate the first application to the domain configured in the general area while allocating the first application to the general area. Alternatively, the electronic device 101 may allocate the first application to the domain configured in the first sandbox while allocating the first application to the first sandbox.

Figure 25A:
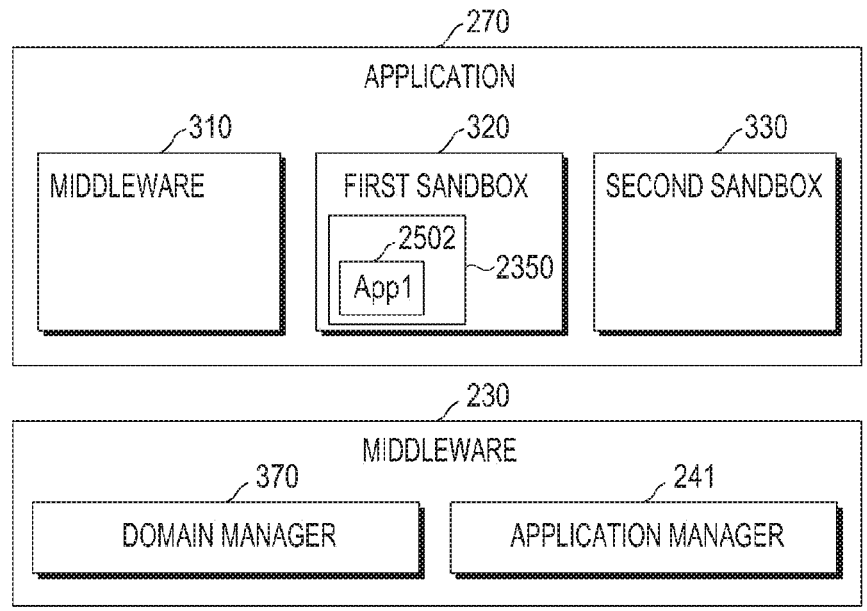
FIGS. 25A and 25B are block diagrams illustrating a program module according to an embodiment of the present disclosure.

For example, as illustrated in FIG. 25A, the electronic device 101 allocates a first application 2502 to the first domain 2350. The electronic device 101 configures the first domain 2350 in the first sandbox 320. In this case, the electronic device 101 allocates data of the first application to the first domain 2350. For example, the electronic device 101 may add an identifier of the first domain 2350 to the data of the first application. Alternatively, the electronic device 101 may generate the first domain 2350 in the general area 310 and allocate the first application to the generated first domain 2350.

When the first application is not the application to be executed in the domain, the electronic device 101 allocates the first application to the general area or the sandbox in step 2440. That is, the electronic device 101 may not allocate the first application to the domain.

Figure 25B:
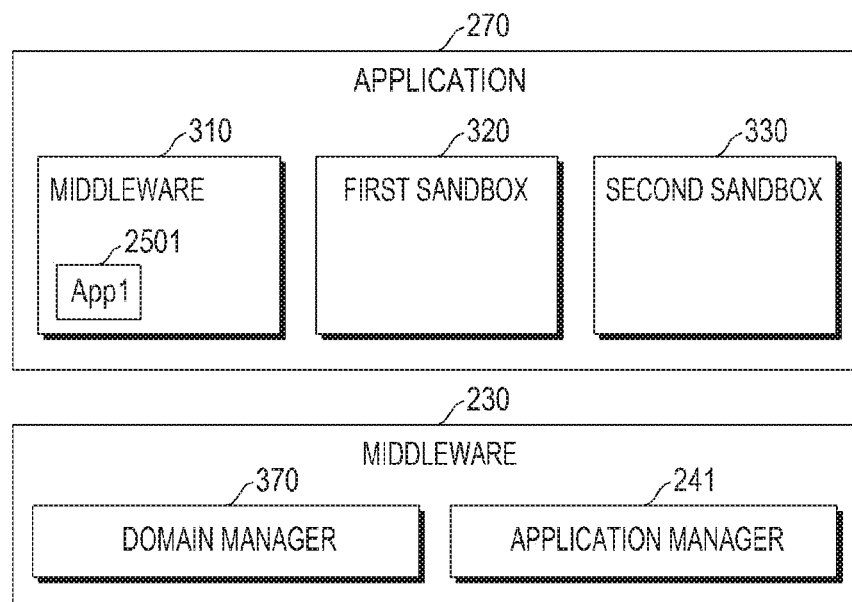

For example, as illustrated in FIG. 25B, the electronic device 101 allocates a first application 2501 to the general area 310. In this case, the electronic device 101 may allocate the data corresponding to the general mode of the first application to the resources corresponding to the general area 310. Further, when another application is allocated to the first domain 2350, the electronic device 101 may isolate data and code execution of the first application from the other application allocated to the first domain 2350. The electronic device 101 may also allocate the first application to the first sandbox 320, but not to the first domain 2350.

When the first application 2501 is executed, data and code execution of the first application 2501 may be shared with another application allocated outside the first domain 2350.

Figure 24B:
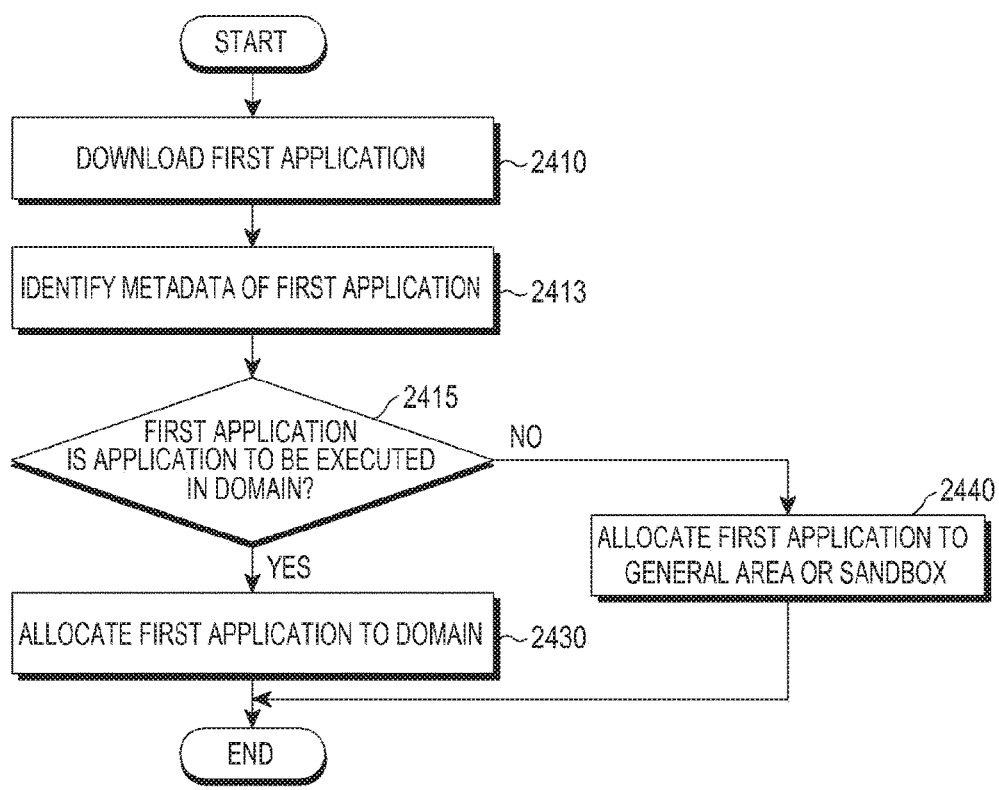
FIG. 24B is a flowchart illustrating a method of installing an application according to an embodiment of the present disclosure.

FIG. 24B is a flowchart illustrating a method of installing an application according to an embodiment of the present disclosure.

The electronic device 101 downloads a first application in step 2410. The electronic device 101 may identify metadata of the first application in step 2413. The electronic device 101 may identify the metadata by particular data inserted into a file of the first application. The metadata may relate to whether the application should be allocated to the domain or whether the application is executed in the domain (for example, execution or operation of the first application based on a policy of the domain), and may directly indicate whether the application should be allocated to the security area or may be implemented in the form of a security level.

In step 2415, the electronic device 101 determines at least one of whether the first application is allocated to the domain and whether the first application is an application to be executed in the domain based on the policy of the domain. When the metadata directly indicates that the first application should be allocated to and executed in the domain, the electronic device 101 may determine to allocate the first application to the domain. Alternatively, when the metadata corresponds to the security level, the electronic device 101 may determine whether the first application is the application which should be allocated to the domain, according to the identified security level, for example, a low or high security level. Since steps 2430 and 2440 have been described in detail with reference to FIG. 24A, a further description thereof will be omitted herein.

Figure 26:
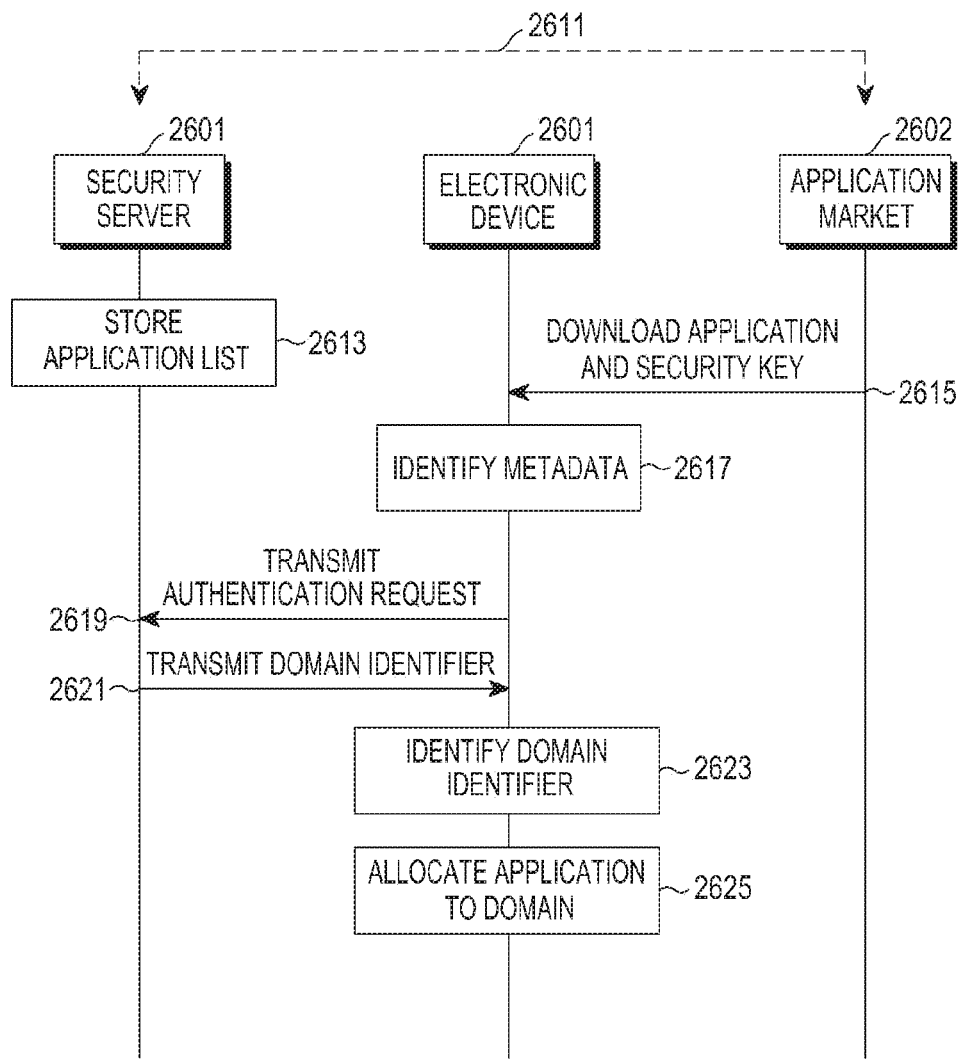
FIG. 26 is a flow diagram illustrating a method of installing an application according to an embodiment of the present disclosure.

FIG. 26 is a flow diagram illustrating a method of installing an application according to an embodiment of the present disclosure.

In step 2611, a security server 2601 shares an application list with an application market 2602. The security server 2601 receives correlation information between an application uploaded to the application market 2602, a security key and a domain identifier corresponding to the application from the application market 2602 or another external entity. Table 3 shows an example of the correlation information between the application, the security key, and the domain identifier according to various embodiments of the present disclosure.

TABLE 3

| Application | Domain identifier | Security key |
|---|---|---|
| First application | abc | akbidll |
| Second application | def | vnei3 |
| Third application | ghi | villlwo5 |

In step 2613, the security server 2601 stores an application list such as Table 3.

The electronic device 101 downloads the application from the application market 2602 in step 2615. Further, the electronic device 101 may download the security key from the application market 2602. The security key stored in the security server 2601 and the security key received by the electronic device 101 may be different from or the same as each other. The security key stored in the security server 2601 and the security key received by the electronic device 101 may be key values which can be used in various encoding/decoding algorithms. Herein, it is assumed that the electronic device 101 downloads the first application and security key of "akbidll" from the application market 2602. The first application may include metadata indicating that the application is executed in the domain. As described above, the metadata may be data indicating the execution in the domain or the security level, or the security key may be used as the metadata.

In step 2617, the electronic device 101 identifies the metadata and determines whether the downloaded first application is the application to be executed in the domain according to a result of the identification. For example, the electronic device 101 may determine whether the first application is the application to be executed in the domain based on data indicating that the first application is executed in the domain, which is directly implied in the metadata. Alternatively, the electronic device 101 may determine that the first application is executed in the domain according to the security level of the first application. Alternatively, the electronic device 101 may determine that the first application is executed in the domain based on the security key received together with the first application.

In step 2619, the electronic device 101 transmits an authentication request for the first application to the security server 2601. For example, the authentication request may include an identifier of the first application and the security key. The identifier of the first application may be implemented by various pieces of information such as an application package name, an application registration number, and the like. It is understood by those skilled in the art that there is no limitation on the type of data if the application can be identified through the data.

The authentication request may include a value encoded using the security key. The electronic device 101 may generate the encoded value by applying various encoding algorithms to the security key received from the application market 2602. The electronic device 101 may transmit the authentication request including the application identifier and the encoded value.

An application developer may sign the application by the security key, and the security server 2601 may perform the authentication by identifying the signing. A domain agent may transmit the authentication request to the security server 2601 and receive an authentication result or the domain identifier from the security server 601. Alternatively, the security server 2601 may identify only an application identifier and, accordingly, return the domain identifier. Alternatively, when the authentication fails, the security server 2601 may transmit an error message.

In step 2621, the security server 2601 transmits the domain identifier to the electronic device 101 in response to the authentication request. The security server 2601 may perform the authentication by comparing the application identifier and the security key, which are included in the authentication request, with the stored application list. Alternatively, the security server 2601 may perform the authentication by decoding the encoded value, which is included in the authentication request, by using the pre-stored security key. The security server 2601 may determine whether the authentication of the first application is successful or has failed. The security server 601 may transmit the identifier corresponding to the first application to the electronic device 101 when the authentication is successful.

In step 2623, the electronic device 101 identifies the domain identifier. In step 2625, the electronic device 101 allocates the first application to the domain corresponding to the domain identifier. For example, when the domain corresponding to the domain identifier exists, the electronic device 101 may allocate the first application to the corresponding domain. Alternatively, when the domain corresponding to the domain identifier does not exist, the electronic device 101 may first generate the domain and allocate the first application to the generated domain.

When the authentication fails, the electronic device 101 may allocate the first application to the general area or the sandbox. In this case, the electronic device 101 may not allocate the first application to the domain.

Although the security server 2601 and the application market 2602 are illustrated as different entities in the embodiment of FIG. 26, the security server 2601 and the application market 2602 may be implemented as one entity.

Figure 27:
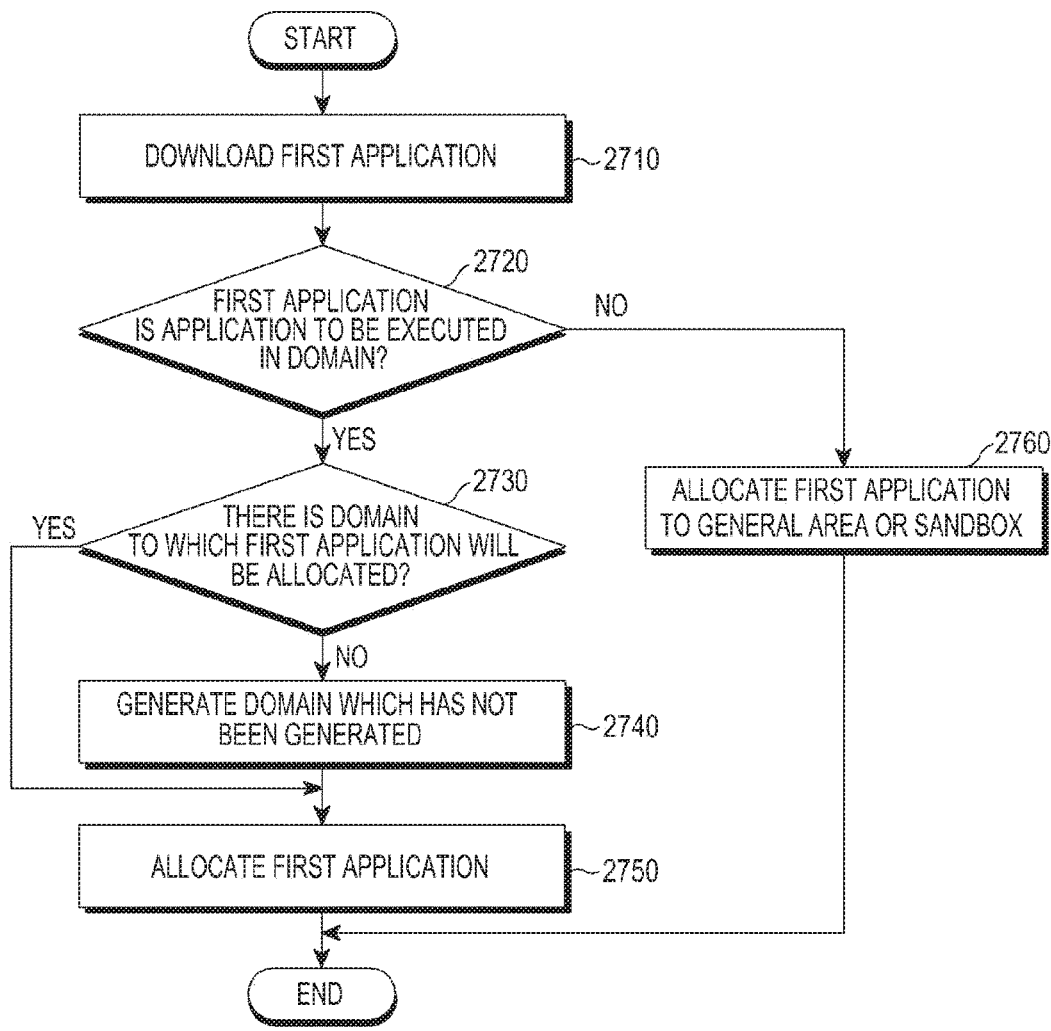
FIG. 27 is a flowchart illustrating a control method of an electronic device according to an embodiment of the present disclosure.

FIG. 27 is a flowchart illustrating a control method of an electronic device according to an embodiment of the present disclosure.

Referring to FIG. 27, the electronic device 101 downloads a first application in step 2710.

In step 2720, the electronic device 101 determines whether the first application is an application to be executed in a domain. The electronic device 101 may determine whether the first application is the application to be executed in the domain by using metadata included in the first application.

When it is determined that the first application is the application to be executed in the domain, the electronic device 101 determines whether the domain in which the first application will be installed and to which the first application will be allocated exists in step 2730. As described above, the electronic device 101 may acquire the domain identifier from the security server or the application market, and allocate the first application to the domain corresponding to the acquired domain identifier with reference to the metadata. Accordingly, the electronic device 101 may determine whether the identified domain has been already configured in the electronic device 101.

Figure 28A:
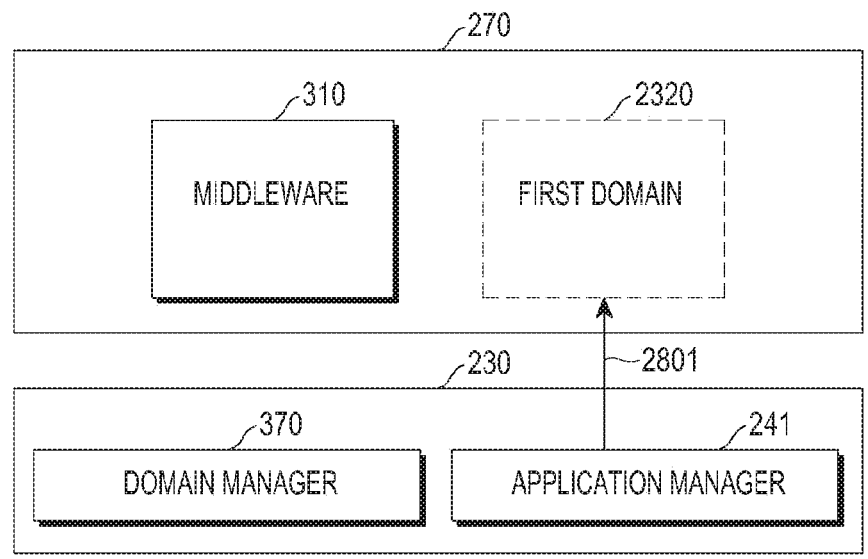
FIGS. 28A and 28B are block diagrams of a program module according to an embodiment of the present disclosure.

For example, as illustrated in FIG. 28A, it is assumed that the electronic device 101 acquires a first domain identifier corresponding to the first application. The electronic device 101 may determine whether the first domain 2320 has been already configured as indicated by reference numeral 2801. The application manager 241 defined in the electronic device 101 may determine whether the first domain 2320 is allocated to the application layer 270 as indicated by reference numeral 2801. In the embodiment of FIG. 28A, it is assumed that the first domain 2320 has not yet been generated.

Figure 28B:
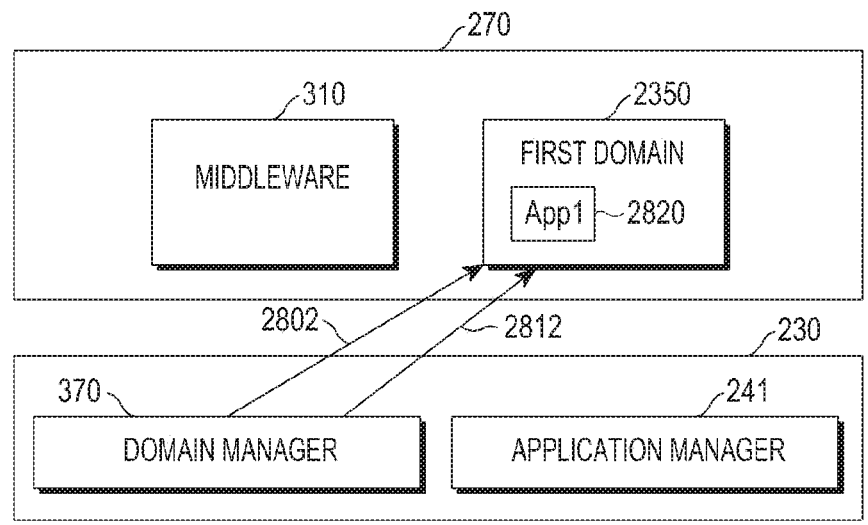

When the domain has not been generated, the electronic device 101 generates the domain, in step 2740. For example, as illustrated in FIG. 28B, the domain manager 370 defined in the electronic device 101 may generate the first domain 2350 as indicated by reference numeral 2802.

When the domain is generated, the electronic device 101 allocates the first application to the generated or existing domain in step 2750 as indicated by reference numeral 2812. As illustrated in FIG. 28B, the electronic device 101 allocates a first application 280 to the first domain 350 as indicated by reference numeral 2812.

When it is assumed that the first application is not the application to be executed in the domain, the electronic device 101 allocates the first application to an area other than the domain such as the general area or the sandbox in step 2760.

FIGS. 29A to 29G are conceptual diagrams illustrating a screen of the electronic device 101 according to an embodiment of the present disclosure.

Figure 29A:
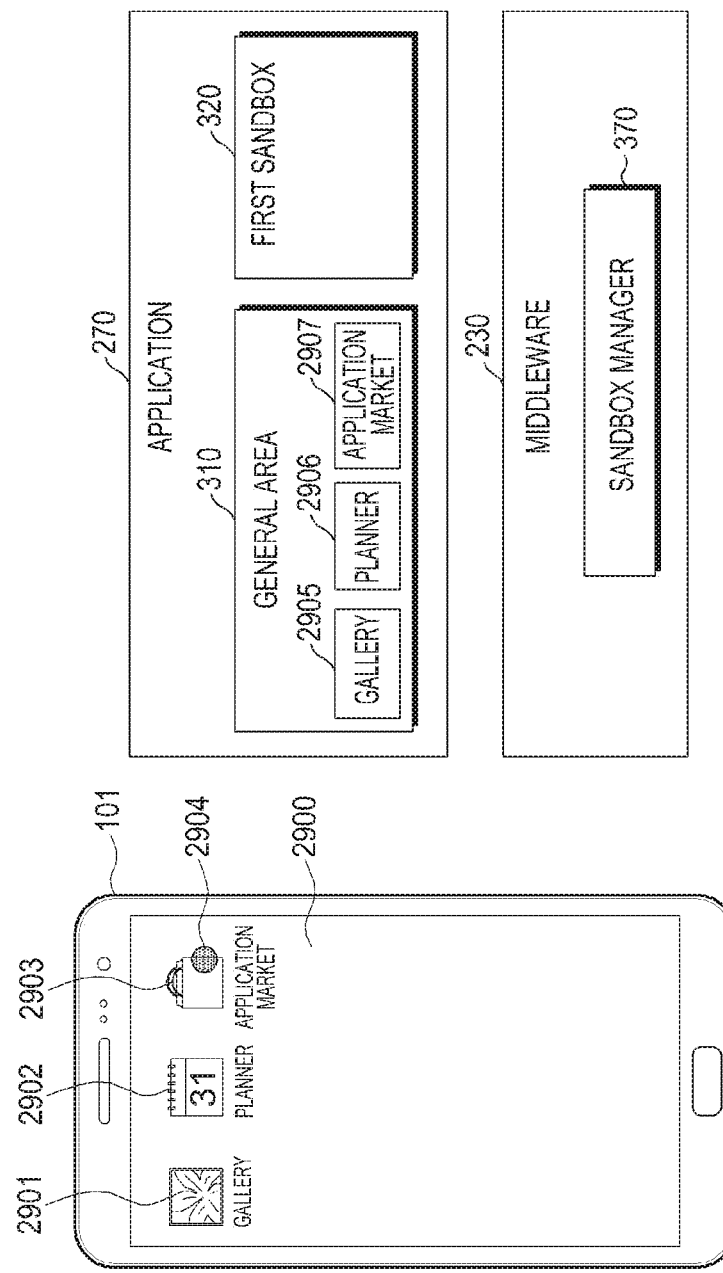
FIGS. 29A to 29G are conceptual diagrams illustrating a screen of an electronic device according to an embodiment of the present disclosure.

Referring to FIG. 29A, the electronic device 101 displays a menu screen 2900 in a first area. The menu screen 2900 is a screen for launching applications and may also be called a launch application execution screen. The first area may mean an area other than a first domain. The electronic device 101 may display one or more application execution icons 2901, 2902 and 2903. For example, the electronic device 101 displays an execution icon 2901 of a gallery application, an execution icon 2902 of a planner application, and an execution icon 2903 of an application market application. In this case, the electronic device 101 may pre-install a gallery application 2905, a planner application 2906, and an application market application 2907 in the general area 310. The electronic device 101 may receive an execution command according to execution icon 2903 of the execution application 2904 of the application market application. As described above, a second area may be the domain and the first area may be an area other than the domain. First and second environments may be areas distinguished by a user identifier and may be different from the first and second areas.

Figure 29B:
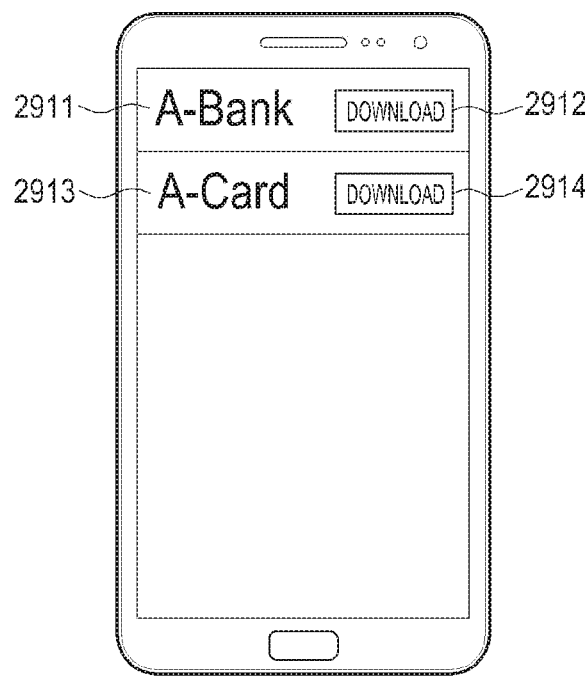
Figure 29C:
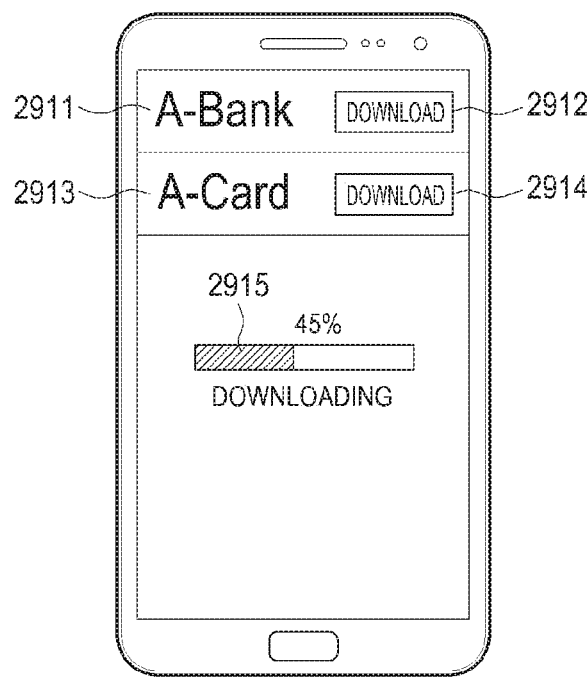

Referring to FIG. 29B, the electronic device 101 executes the application market application according to the received execution command. The electronic device 101 displays an execution screen of the application market application, and the execution screen includes applications 2911 and 2913 previously uploaded to the application market and download command objects 2912 and 2914. For example, it is assumed that the electronic device 101 downloads an "A-bank application 2911". The user designates the download command object 2912. The electronic device 101 downloads the "A-bank application" 2911 from the application market in response to the execution of the download command object 2912. FIG. 29C is a conceptual diagram illustrating an electronic device 101 that displays a download progress icon 2915 of the "A-bank application" 2911.

When the download is completed, the electronic device 101 may install the downloaded application 2931. The electronic device 101 allocates the application 2931 to the general area 310 or the first sandbox 320 as illustrated in FIG. 29D or 29E.

The electronic device 101 may determine whether the application 2931 is an application to be executed in the domain. For example, the electronic device 101 may determine whether the application 2931 is the application to be executed in the domain by identifying metadata of the application 2931. The domain may be named a second area and may be distinguished from the first area. That is, the electronic device 101 may determine whether the application 2931 is the application to be executed in the second area.

Figure 29D:
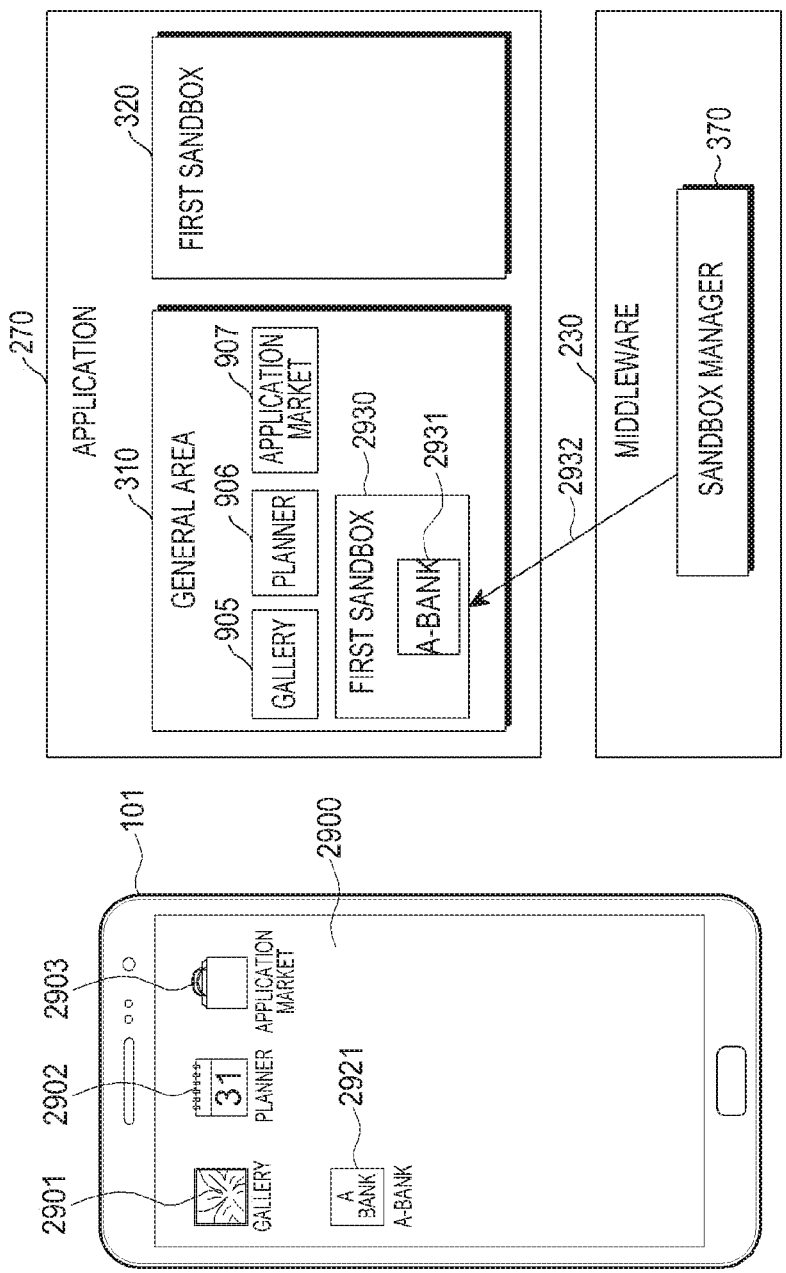
Figure 29E:
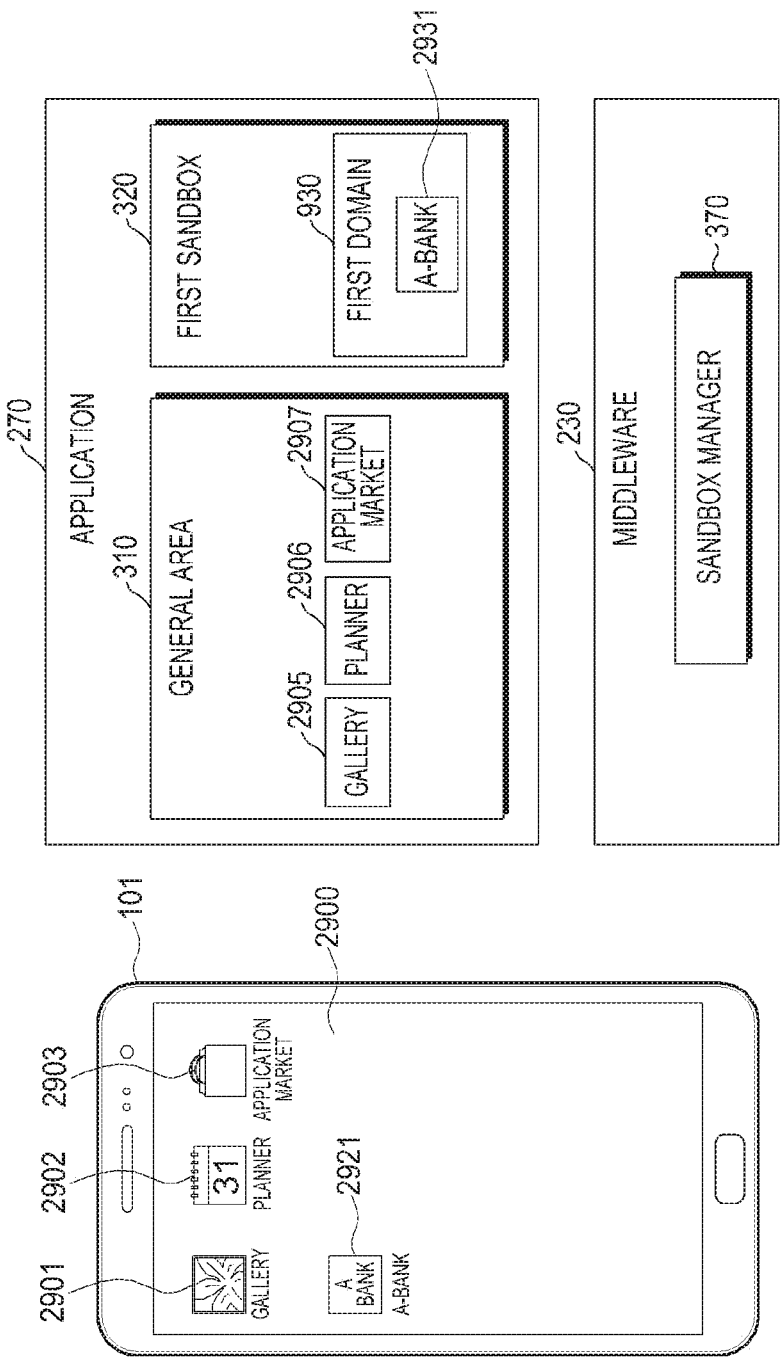

As illustrated in FIG. 29D, when it is determined that the application 2931 is the application to be executed in the domain, the electronic device 101 may allocate the application 2931 to a first domain 2930. The electronic device 101 generates the domain 2930 or allocates the application to the pre-generated domain 2930 as indicated by reference numeral 2932. Further, the electronic device 101 may not further display an execution icon 2921 of the installed application on the menu screen 2900. Thereafter, when the execution screen 2921 is designated, the electronic device 101 may execute the "A-bank application" in the domain, that is, the second area. For example, the electronic device 101 may separate the "A-bank application" from other applications which are not allocated to the second area through a method of adding a domain identifier to input/output data from the "A-bank application".

Figure 29F:
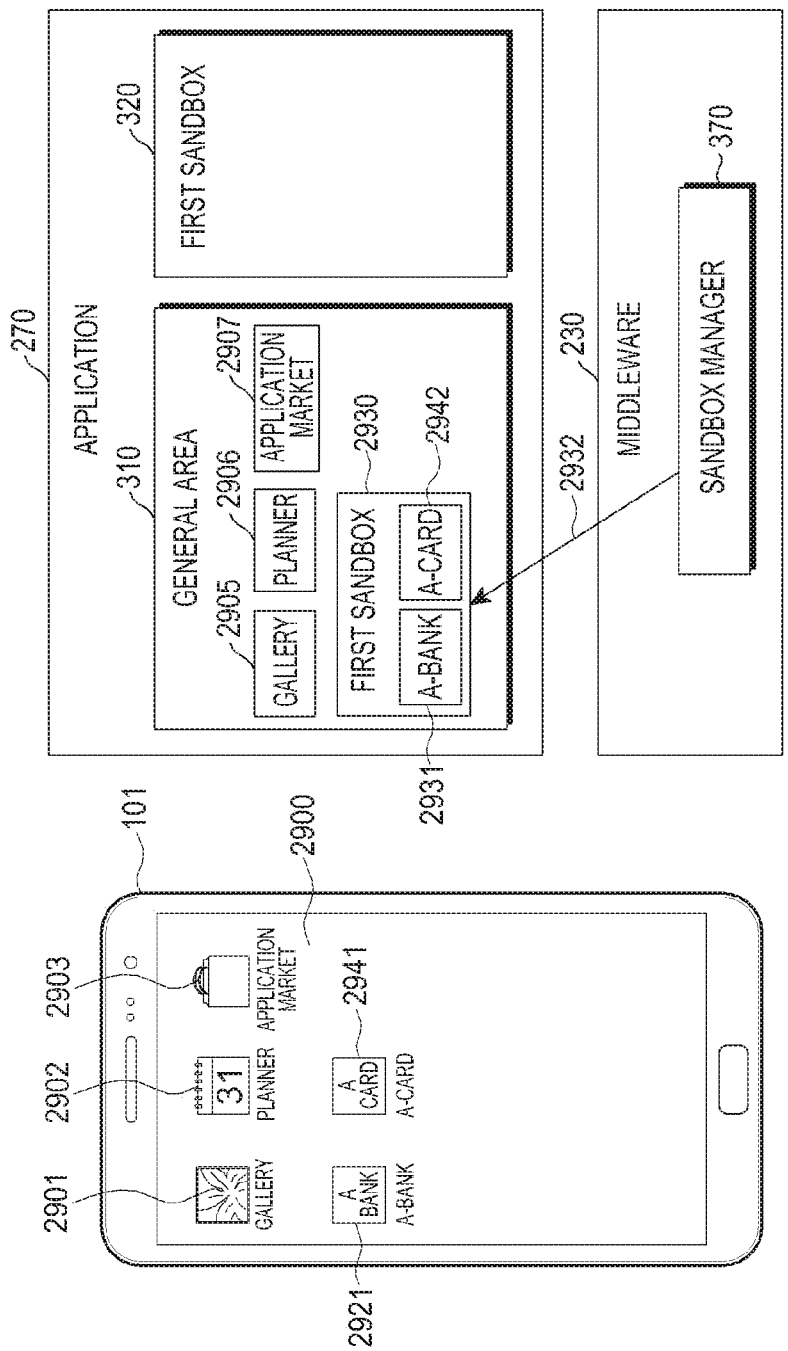
Figure 29G:
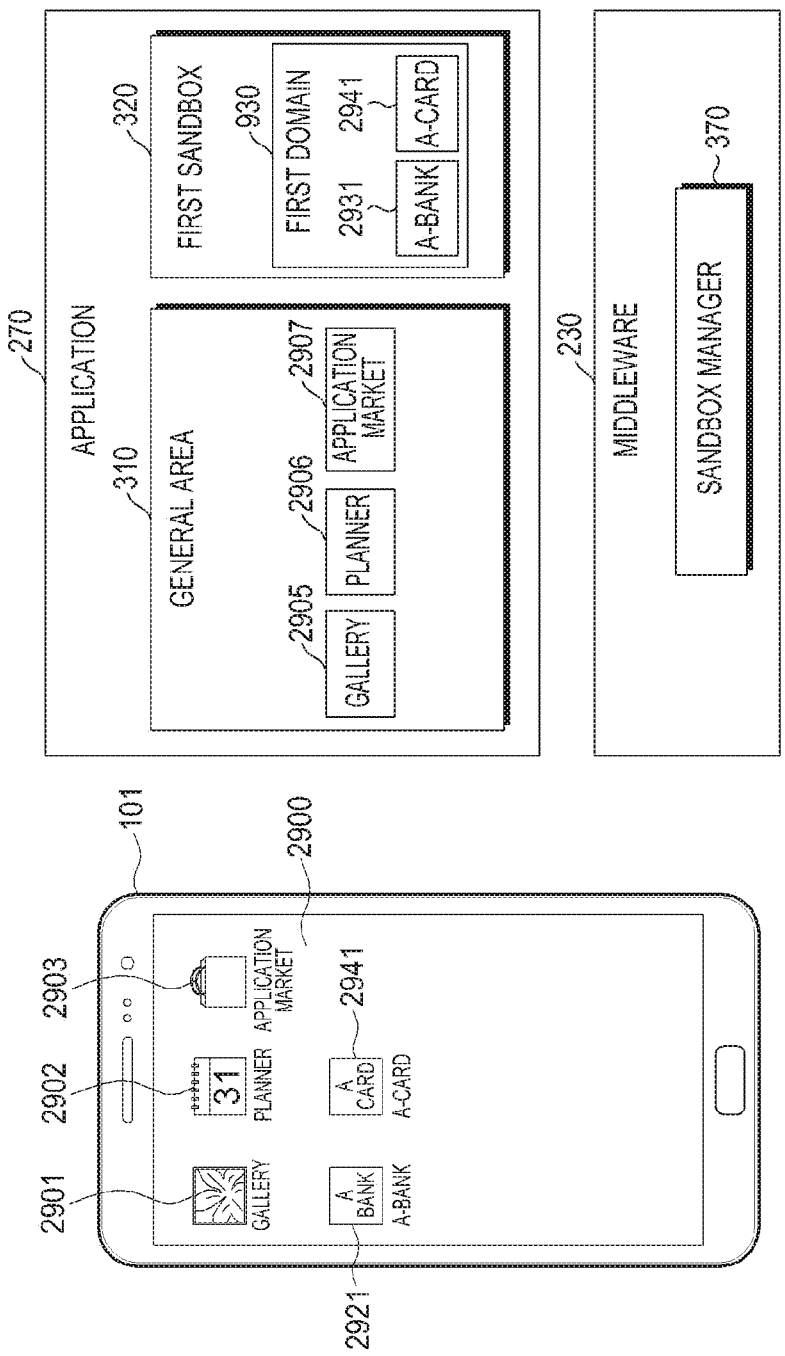

The electronic device 101 may also download a second application related to the first application. For example, as illustrated in FIGS. 29F and 29G, the electronic device 101 may also download an "A-card application" related to the "A-bank application". The electronic device 101 may allocate the downloaded "A-card application" 2942 to the general area 310 or the first sandbox 320, and allocate the A-card application" 2942 to the first domain 2930.

The second application may be executed in the same domain in which the first application is executed. Accordingly, the electronic device 101 may allocate the "A-card application" 2942 to the first domain 2930. Further, the electronic device 101 may not further display an execution icon 2941 of the allocated application on the menu screen 2900. Thereafter, when the execution screen 2941 is designated, the electronic device 101 may execute the "A-card application" in the domain, that is, the second area. For example, the electronic device 101 may separate the "A-card application" from other applications, which are not allocated to the second area through a method of adding a domain identifier to input/output data from the "A-card application". The electronic device 101 may share the input/output data from the "A-card application" with the "A-bank application". The second application is related to the first application and may include an application developed by the same developer, which developed the first application, an application related to authentication or password required when the first application is executed, etc., but there is no limitation on the type of application. The second application is executed in the same domain in which the first application is executed and may be an application corresponding to the same domain identifier.

Figure 30:
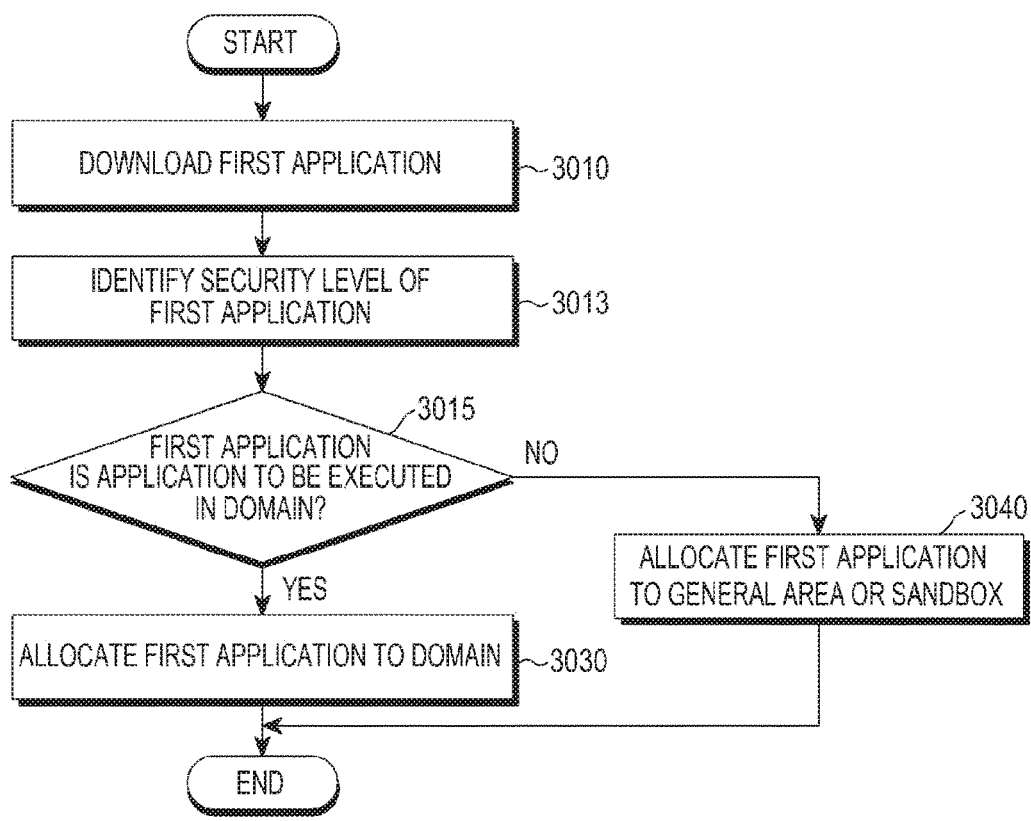
FIG. 30 is a flowchart illustrating a control method of an electronic device according to an embodiment of the present disclosure.

FIG. 30 is a flowchart illustrating a control method of an electronic device according to an embodiment of the present disclosure.

Referring to FIG. 30, the electronic device 101 downloads the first application in step 3010. The electronic device 101 receives a security level of the first application. For example, the electronic device 101 may receive a first application package including the security level from an application market. The security level may be included in metadata of the first application. Alternatively, the electronic device 101 may receive the security level separately from the first application.

The electronic device 101 identifies the security level of the first application in step 3013. For example, the electronic device 101 may identify the security level within the application package, the metadata, or the separately received security level.

In step 3015, the electronic device 101 determines whether the downloaded first application is an application to be allocated to the domain and/or executed in the domain. For example, the electronic device 101 may determine whether the first application is the application to be allocated to or executed in the domain based on the identified security level. According to various embodiments of the present disclosure, the electronic device 101 may pre-store correlation information between the security level and the domain. For example, the electronic device 101 may pre-store correlation information such as the correlation information in Table 4.

TABLE 4

| Security level | Domain identifier | Allocation area |
| --- | --- | --- |
| 0 | abc | General area |
| 1 | def | First sandbox |
| 2 | ghi | Second sandbox |

When it is determined that the first application is the application to be allocated to the security area, the electronic device 101 installs the first application in the domain corresponding to the security level and allocates the first application to the domain corresponding to the security level in step 3030. For example, the electronic device 101 may allocate the first application to the domain within the general area when the security level is 0, allocate the first application to the domain within the first sandbox when the security level is 1, and allocate the first application to the domain within the second sandbox when the security level is 2.

When it is determined that the first application is not the application to be executed in the domain, the electronic device 101 allocates the first application to the general area or the sandbox in step 3040. In this case, the electronic device 101 allocates the first application to the general area or the sandbox but not to a particular domain. Although the security level is expressed by discrete values of 0, 1, and 2 in Table 2, it is only an example and it is easily understood by those skilled in the art that there is no limitation on a security level form.

For example, it is assumed that the electronic device 101 downloads the first application and the second application. In this case, the electronic device 101 may identify that the security level of the first application is 1 and the security level of the second application is 2. The electronic device 101 may determine the allocation area of the first application as the first domain based on the correlation information between the security level and the domain identifier shown in Table 2. The electronic device 101 determines the allocation area of the second application as the second domain based on the correlation information between the security level and the domain identifier shown in Table 2.

In this case, the electronic device 101 generates the domain identifier according to each domain, or transmits an authentication request to the security server and receives the domain identifier in response to the authentication request as described above.

Figure 31:
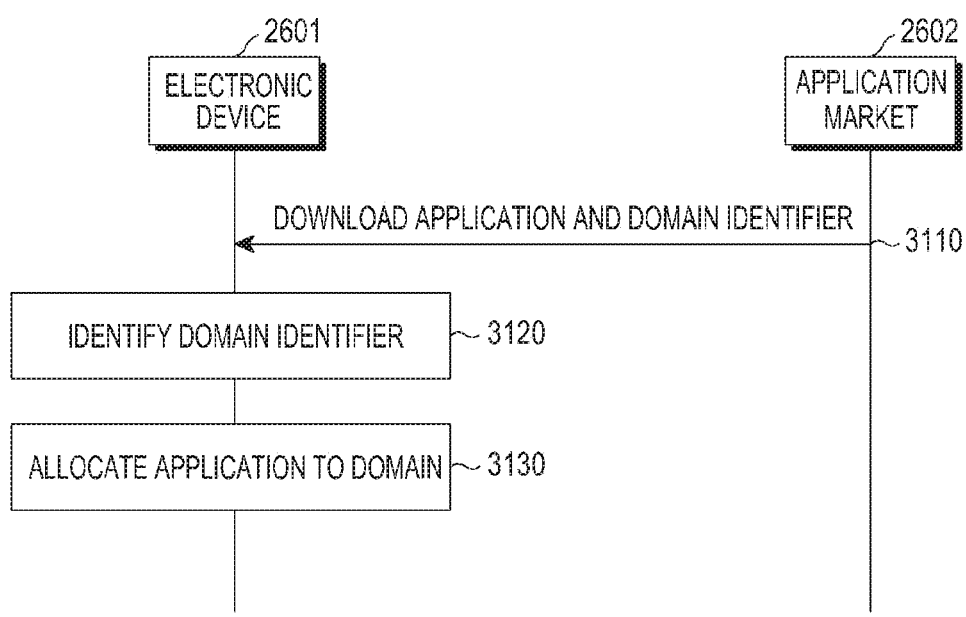
FIG. 31 is a flow diagram illustrating a control method of an electronic device according to an embodiment of the present disclosure.

FIG. 31 is a flow diagram illustrating a control method of an electronic device according to an embodiment of the present disclosure.

Referring to FIG. 31, the electronic device 101 downloads an application and a domain identifier from the application market 2602 in step 3110. The electronic device 101 downloads the domain identifier from the application market 2602 rather than from the additional security server 2601.

In step 3120, the electronic device 101 identifies the received domain identifier.

In step 3130, the electronic device 101 allocates the application to the domain corresponding to the domain identifier. When the domain corresponding to the domain identifier does not exist, the electronic device 101 may generate the domain and allocate the application to the generated domain. The electronic device 101 may allocate the application to the previously generated domain.

As described above, the electronic device 101 according to various embodiments of the present disclosure may receive the domain when the application is downloaded and allocate the application to the domain corresponding to the received domain identifier.

Figure 32:
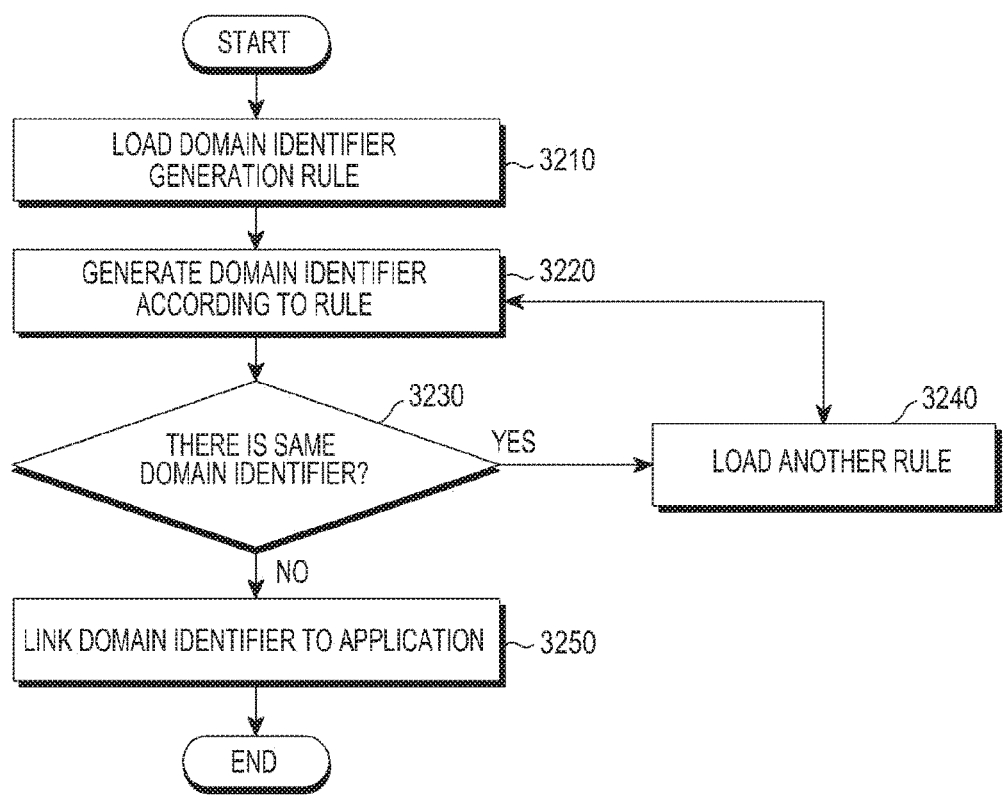
FIG. 32 is a flowchart illustrating a method of generating a domain identifier according to an embodiment of the present disclosure.

FIG. 32 is a flowchart illustrating a method of generating a domain identifier according to an embodiment of the present disclosure. The security server 2601 or the application market 2602 may generate a domain identifier. Alternatively, the electronic device 101 may generate the domain identifier.

In step 3210, the electronic device 101 loads a domain identifier generation rule. Since the domain identifier should be uniquely managed by the entire security server or system, at least one of the security server 2601, the application market 2602, and the electronic device 101 may use the domain identifier generation rule to generate a unique domain identifier according to each application.

In step 3220, at least one of the security server 2601, the application market 2602, and the electronic device 101 generates the unique domain identifier according to various methods such as a method based on an order of hourly requests, a method of generating a particular random number and the like. At least one of the security server 2601, the application market 2602, and the electronic device 101 generates the domain identifier in response to a request, or generates in advance and stores the domain identifier and provides the stored domain identifier when requested. When a domain identifier generation policy is included in the application, at least one of the security server 2601, the application market 2602, and the electronic device 101 may generate the domain identifier according to the domain identifier generation policy.

In step 3230, at least one of the security server 2601, the application market 2602, and the electronic device 101 determines whether the same domain identifier exists in step 3230. For example, at least one of the security server 2601, the application market 2602, and the electronic device 101 may determine whether there is a domain identifier which is the same as the generated domain identifier in the managed domain identifiers.

When it is determined that the same domain identifier exists, at least one of the security server 2601, the application market 2602, and the electronic device 101 loads another rule and generates the domain identifier again in step 3240.

When it is determined that the same domain identifier does not exist, that is, when the domain identifier is not duplicated, at least one of the security server 2601, the application market 2602, and the electronic device 101 stores the domain identifier in step 3250 such that the domain identifier is linked to the application. When the domain identifier is duplicated, at least one of the security server 2601, the application market 2602, and the electronic device 101 provides the generated domain identifier in step 3240.

Figure 33:
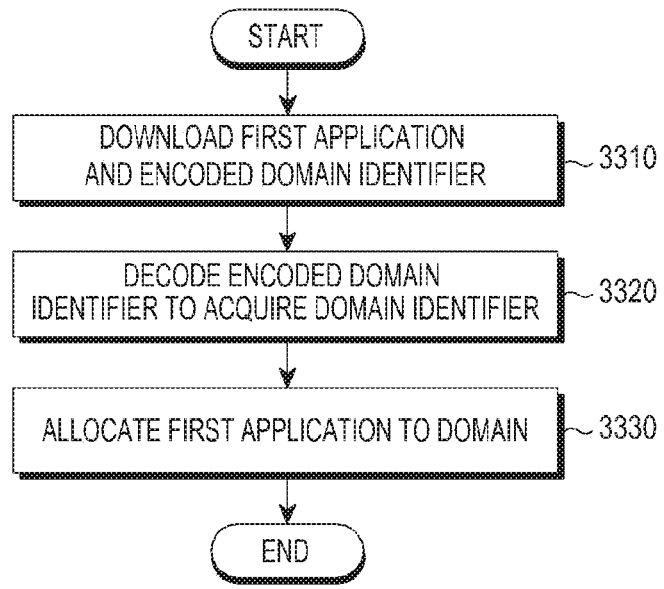
FIG. 33 is a flowchart illustrating a method of generating a domain identifier according to an embodiment of the present disclosure.

FIG. 33 is a flowchart illustrating a method of generating a domain identifier according to an embodiment of the present disclosure.

The electronic device 101 downloads a first application and an encoded domain identifier in step 3310. For example, the electronic device 101 receives the encoded domain identifier while downloading the first application from the application market 2602. The domain identifier may require high security and accordingly, may be transmitted in the encoded state when downloaded. Alternatively, the security server 2601 may transmit the domain identifier encoded after an authentication in response to an authentication request from the electronic device 101.

In step 3320, the electronic device 101 decodes the received encoded domain identifier to acquire the domain identifier. The electronic device 101 may store an encoding/decoding algorithm and decode the received encoded domain identifier.

In step 3330, the electronic device 101 allocates the first application to the domain corresponding to the domain identifier while installing the first application.

Figure 34:
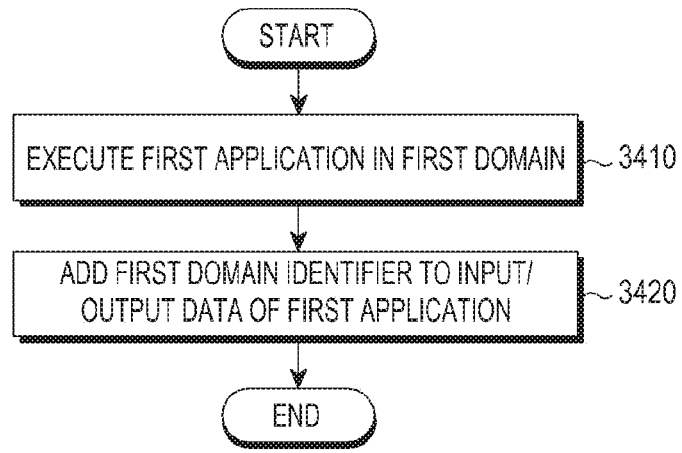
FIG. 34 is a flowchart illustrating a method of executing an application in a domain according to an embodiment of the present disclosure.

FIG. 34 is a flowchart illustrating a method of executing an application in a domain according to an embodiment of the present disclosure.

The first electronic device 101 executes a first application in a first domain in step 3410. As described above, the electronic device 101 installs and allocates the first application to the first domain and when an application execution command is received, executes the first application in the first domain.

In step 3420, the electronic device 101 adds a first domain identifier to input/output data of the first application. For example, as described above, the electronic device 101 adds a suffix of "_t" to the context of the input/output data, so as to indicate the application allocated to the particular domain. Further, the electronic device 101 may share the input/output data to which the first domain identifier is added with the application allocated to the first domain and may not share the input/output data with applications other than the application allocated to the first domain. The order in which step 3420 is performed after step 3410 is only an example and the electronic device 101 according to various embodiments of the present disclosure may add the first domain identifier to the input/output data of the first application and then execute the application.

According to an embodiment of the present disclosure, the electronic device 101 may not share data and resources of the first application to be executed in the first domain with applications allocated to areas which are not the first domain, and may share the data and resources with the application allocated to the first domain.

Figure 35:
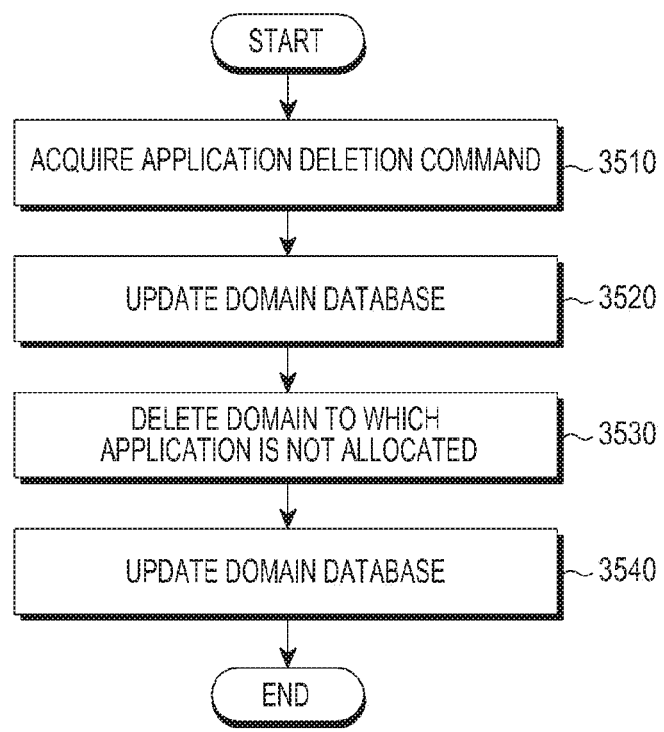
FIG. 35 is a flowchart illustrating a process of deleting an application according to an embodiment of the present disclosure.
Figure 36A:
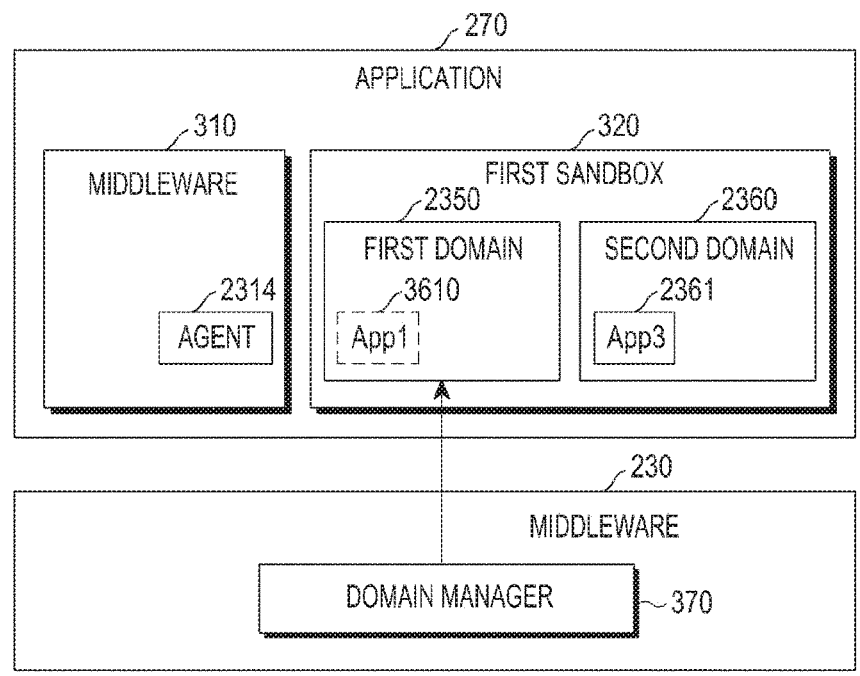
FIGS. 36A and 36B are block diagrams of a program module according to an embodiment of the present disclosure.
Figure 36B:
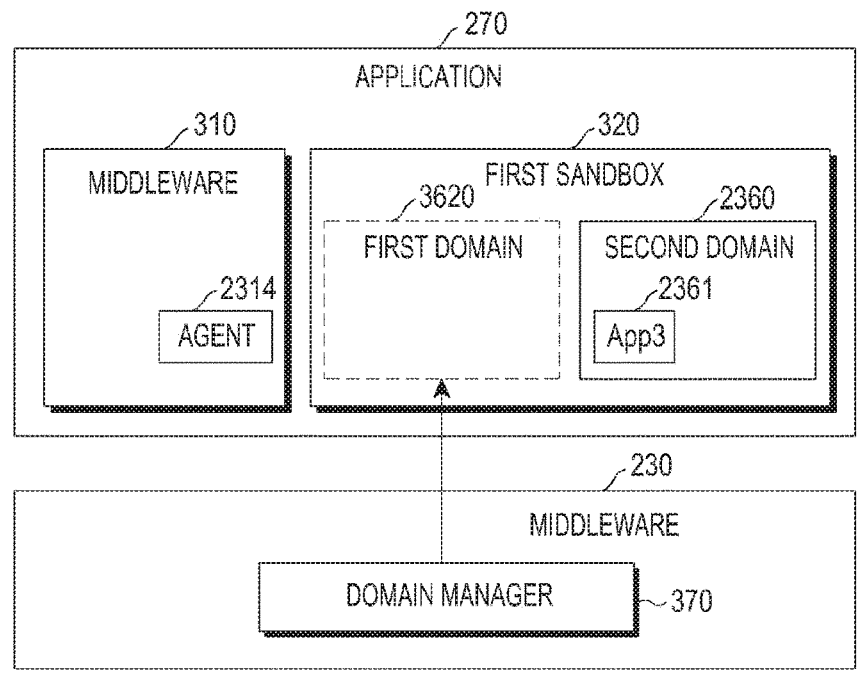

FIG. 35 is a flowchart illustrating a process of deleting an application according to an embodiment of the present disclosure. FIGS. 36A and 36B are block diagrams illustrating a program module according to an embodiment of the present disclosure.

Referring to FIG. 35, the electronic device 101 acquires an application deletion command in step 3510. For example, the electronic device 101 deletes a first application 3610, which has been allocated to the first domain 2350 as illustrated in FIG. 36A.

In step 3520, the electronic device 101 updates a domain database. For example, the electronic device 101 may manage the database such as in Table 5 below.

TABLE 5

| Domain identifier | Domain name | First application | Second application |
|---|---|---|---|
| dTdfTQ3N | 0114535 | 0123847 | — |
| TdwEB2E4 | 0065678 | 0034728 | 0048573 |
| d34DGeTd | 0127495 | 0062874 | 0032929 |

The domain identifier may be a domain identifier acquired by the electronic device 101. Further, the electronic device 101 may generate and manage a domain name according to the acquired domain identifier. The electronic device 101 may manage an application allocated to the domain corresponding to the domain name. For example, the electronic device 101 may manage allocation of the first application to the first domain having a domain name of "0114535".

The electronic device 101 may update the domain database according to the deletion of the first application, and the updated domain database is shown in Table 6 below.

TABLE 6

| Domain Identifier | Domain Name | First Application | Second Application |
|---|---|---|---|
| dTdfTQ3N | 0114535 | — | — |
| TdwEB2E | 0065678 | — | 0048573 |
| d34DGeTd | 0127495 | — | 0032929 |

In step 3530, the electronic device 101 deletes the domain to which the application is not allocated. For example, as illustrated in FIG. 36B, the domain manager 370 may delete the first domain 3620.

In step 3540, the electronic device 101 updates a domain database. For example, the updated domain database may be shown in Table 7 below.

TABLE 7

| Domain Identifier | Domain Name | First Application | Second Application |
|---|---|---|---|
| TdwEB2E4 | 0065678 | — | 0048573 |
| d34DGeTd | 0127495 | — | 0032929 |

As described above, the application may not be allocated to the domain having the domain name of "0114535" and the electronic device 101 may delete the domain having the domain name of "0114535".

Figure 37:
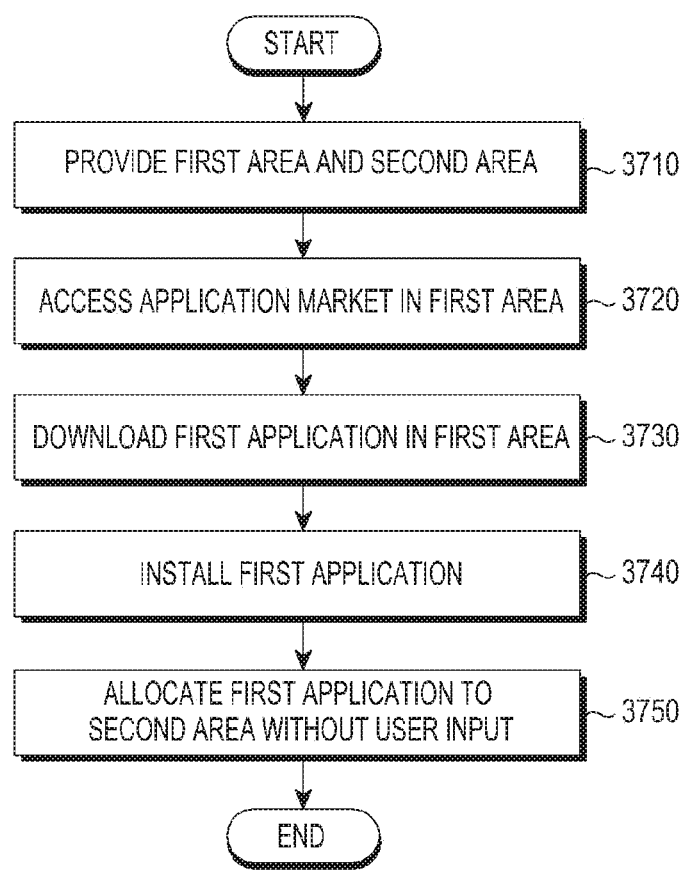
FIG. 37 is a flowchart illustrating a control method of an electronic device according to an embodiment of the present disclosure.

FIG. 37 is a flowchart illustrating a control method of the electronic device 101 according to an embodiment of the present disclosure.

Referring to FIG. 37, in step 3710, the electronic device 101 provides a first area in which at least one application program may operate and a second area having an operation environment which is at least partially different from the first area. For example, the second area may be the domain and the first area may be an area other than the domain, that is, an area distinguished from the domain.

In step 3720, the electronic device 101 may access an application market provided by an external server through a communication module, at least partially in response to a first input of the user in the first area.

In step 3730, the electronic device 101 downloads the selected first application from the application market at least partially in response to a second input of the user in the first area.

The electronic device 101 installs the downloaded first application in the electronic device in step 3740.

In step 3750, the electronic device 101 allocates the downloaded first application to the second area without any input from the user.

The electronic device 101 may transmit an authentication request for the first application to the security server and receive a domain identifier from the security server in response to the authentication request.

The electronic device 101 may allocate the first application to the second area corresponding to the received domain identifier. The authentication request may include at least one of a security key for the authentication and an encoded value by the security key.

The electronic device 101 may receive the domain identifier related to the first application from the application market together with the first application. The electronic device 101 may allocate the first application to the second area corresponding to the received domain identifier.

The electronic device 101 may store correlation information between the received domain identifier and the domain identifier for management.

The electronic device 101 may determine whether there is a domain corresponding to the received domain identifier.

When the second area corresponds to the received domain identifier, the electronic device 101 may allocate the first application to the second area. When there is no domain corresponding to the received domain identifier, the electronic device 101 may generate the second area corresponding to the received domain identifier and allocate the first application to the generated second area.

The electronic device 101 may execute a command for the first application in association with the second area.

The electronic device 101 may allocate the first application to the general area or the sandbox.

When the first application is deleted, the electronic device 101 may determine whether there is an application related to the second area corresponding to the first application, and determine whether to maintain the second area according to a result of the determination.

The electronic device 101 may identify metadata indicating whether the first application is allocated to the second area and allocate the first application to the second area according to a result of the identification.

The electronic device 101 may download a second application related to the first application.

The electronic device 101 may allocate the second application to the second area.

Figure 38:
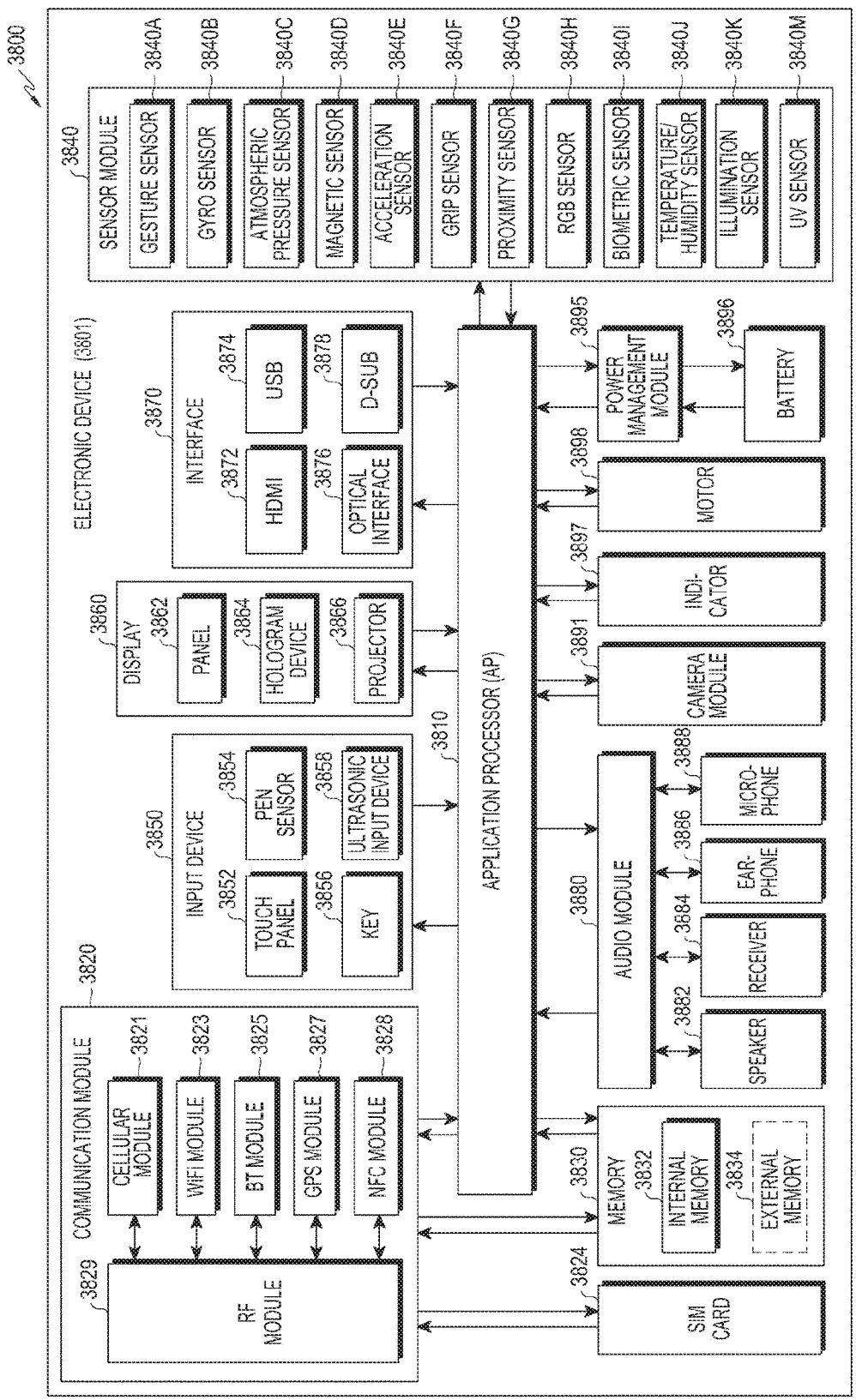
FIG. 38 is a block diagram illustrating an electronic device according to an embodiment of the present disclosure.

FIG. 38 is a block diagram 3800 of an electronic device 3801 according to an embodiment of the present disclosure. The electronic device 3801 includes all or some of the electronic device 101 illustrated in FIG. 1. The electronic device 3801 includes at least one AP 3810, a communication module 3820, a Subscriber Identification Module (SIM) card 3824, a memory 3830, a sensor module 3840, an input device 3850, a display 3860, an interface 3870, an audio module 3880, a camera module 3891, a power management module 3895, a battery 3896, an indicator 3897, and a motor 3898.

The AP 3810 may control a plurality of hardware or software components connected to the AP 3810 by executing an operating system or an application program and perform a variety of data processing and calculations. The AP 3810 may be embodied as, for example, a System on Chip (SoC). According to an embodiment of the present disclosure, the AP 3810 may further include a Graphical Processing Unit (GPU) and/or an image signal processor. The AP 3810 may also include at least some (for example, a cellular module 3821) of the components illustrated in FIG. 1. The AP 3810 may load instructions or data, received from at least one other component (for example, a non-volatile memory), into volatile memory to process the loaded instructions or data, and may store various types of data in a non-volatile memory.

The communication module 3820 may have a configuration equal or similar to the communication interface 380 of FIG. 1. The communication module 3820 may include, for example, a cellular module 3821, a Wi-Fi module 3823, a BT module 3825, a GPS module 3827, an NFC module 3828, and a Radio Frequency (RF) module 3829.

The cellular module 3821 may provide a voice call, video call, text message services, or Internet access services through, for example, a communication network. According to an embodiment of the present disclosure, the cellular module 3821 may distinguish between and authenticate electronic devices 3801 within a communication network using a subscriber identification module (for example, the SIM card 3824). According to an embodiment of the present disclosure, the cellular module 3821 may perform at least some of the functions which may be provided by the AP 3810. According to an embodiment of the present disclosure, the cellular module 3821 may include a Communication Processor (CP).

The Wi-Fi module 3823, the BT module 3825, the GPS module 3827, and the NFC module 3828 may include, for example, a processor for processing data transmitted/received through the corresponding module. According to an embodiment of the present disclosure, at least two or more of the cellular module 3821, the Wi-Fi module 3823, the BT module 3825, the GPS module 3827, and the NFC module 3828 may be included in one Integrated Chip (IC) or IC package.

The RF module 3829 may transmit/receive a communication signal (for example, an RF signal). The RF module 3829 may include, for example, a transceiver, a Power Amp Module (PAM), a frequency filter, a Low Noise Amplifier (LNA) or an antenna. According to another embodiment of the present disclosure, at least one of the cellular module 3821, the Wi-Fi module 3823, the BT module 3825, the GPS module 3827, and the NFC module 3828 may transmit/receive an RF signal through a separate RF module.

The SIM card 3824 may include a card including a subscriber identification module and/or an embedded SIM, and contain unique identification information (for example, an Integrated Circuit Card Identifier (ICCID)) or subscriber information (for example, an International Mobile Subscriber Identity (IMSI)).

The memory 3830 (for example, a memory 130) may include, for example, an internal memory 3832 or an external memory 3834. The internal memory 3832 may include at least one of a volatile memory (for example, a Dynamic Random Access Memory (DRAM), a Static RAM (SRAM), a Synchronous Dynamic RAM (SDRAM), a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard drive, or a Solid State Drive (SSD).

The external memory 3834 may further include a flash drive, for example, a Compact Flash (CF), a Secure Digital (SD), a Micro Secure Digital (Micro-SD), a Mini Secure Digital (Mini-SD), an extreme Digital (xD), a memory stick, and the like. The external memory 3834 may be functionally and/or physically connected to the electronic device 3801 through various interfaces.

The sensor module 3840 may measure, for example, a physical quantity or detect an operation state of the electronic device 3801, and may convert the measured or detected information to an electrical signal. The sensor module 3840 includes at least one of a gesture sensor 3840A, a gyro sensor 3840B, an atmospheric pressure sensor 3840C, a magnetic sensor 3840D, an acceleration sensor 3840E, a grip sensor 3840F, a proximity sensor 3840G, a color sensor 3840H (for example, red, green, and blue (RGB) sensor), a biometric sensor 3840I, a temperature/humidity sensor 3840J, an illumination sensor 3840K, and an Ultra Violet (UV) sensor 3840M. Additionally or alternatively, the sensor module 3840 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 3840 may further include a control circuit for controlling at least one sensor included therein. In an embodiment of the present disclosure, the electronic device 3801 may further include a processor configured to control the sensor module 3840 as a part of or separately from the AP 3810, and may control the sensor module 3840 while the AP 3810 is in a sleep state.

The input device 3850 may include, for example, a touch panel 3852, a (digital) pen sensor 3854, a key 3856, or an ultrasonic input device 3858. The touch panel 3852 may use at least one of a capacitive type, a resistive type, an infrared type, and an ultrasonic type. The touch panel 3852 may further include a control circuit. The touch panel 3852 may further include a tactile layer, and provide a tactile reaction to a user input.

The (digital) pen sensor 3854 may include, for example, a recognition sheet which is a part of the touch panel or a separate recognition sheet. The key 3856 may include, for example, a physical button, an optical key or a keypad. The ultrasonic input unit 3858 may input data through an input means that generates an ultrasonic signal, and the electronic device 3801 may identify data by detecting a sound wave with a microphone (for example, a microphone 3888).

The display 3860 (for example, the display 160) may include a panel 3862, a hologram device 3864 or a projector 3866. The panel 3862 may include a component equal or similar to the display 160 of FIG. 1. The panel 3862 may be embodied to be flexible, transparent, or wearable. The panel 3862 may also be configured to be integrated with the touch panel 3852 as a single module. The hologram device 3864 may show a stereoscopic image in the air by using interference of light. The projector 3866 may project light onto a screen to display an image. For example, the screen may be located inside or outside the electronic device 3801. According to an embodiment of the present disclosure, the display 3860 may further include a control circuit for controlling the panel 3862, the hologram device 3864, or the projector 3866.

The interface 3870 may include, for example, a High-Definition Multimedia Interface (HDMI) 3872, a Universal Serial Bus (USB) 3874, an optical interface 3876, or a D-subminiature (D-sub) 3878. The interface 3870 may be included in the communication interface 380 illustrated in FIG. 1. Additionally or alternatively, the interface 3870 may include, for example, a Mobile High-definition Link (MHL) interface, a Secure Digital (SD) card/Multi-Media Card (MMC) interface, or an Infrared Data Association (IrDA) standard interface.

The audio module 3880 may bilaterally convert a sound and an electrical signal. At least some components of the audio module 3880 may be included in, for example, the input/output interface 140 illustrated in FIG. 1. The audio module 3880 may process sound information input or output through a speaker 3882, a receiver 3884, earphones 3886, the microphone 3888 and the like.

The camera module 3891 is a device which may photograph a still image and a moving image. According to an embodiment of the present disclosure, the camera module 291 may include one or more image sensors (for example, a front sensor or a back sensor), a lens, an Image Signal Processor (ISP) or a flash (for example, LED or xenon lamp).

The power management module 3895 may manage, for example, power of the electronic device 3801. According to an embodiment, the power management module 3895 may include a Power Management Integrated Circuit (PMIC), a charger Integrated Circuit (IC), or a battery gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, etc.) for wireless charging may be further included. The battery gauge 3896 may measure, for example, the remaining amount of battery, a charging voltage and current, or temperature. The battery 3896 may include, for example, a rechargeable battery and/or a solar battery.

The indicator 3897 may indicate particular status of the electronic device 3801 or a part thereof (for example, the AP 3810), for example, a booting status, a message status, a charging status, etc. The motor 3898 may convert an electrical signal into mechanical vibrations, and may generate a vibration or haptic effect. Although not illustrated, the electronic device 3801 may include a processing device (for example, a GPU) for supporting mobile TV. The processing device for supporting mobile TV may process media data according to a standard of Digital Multimedia Broadcasting (DMB), Digital Video Broadcasting (DVB), media flow and the like.

Each of the components of the electronic device according to an embodiment of the present disclosure may be implemented by one or more components and the name of the corresponding component may vary depending on the type of electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which is known or are to be developed hereinafter.

At least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium having commands stored therein is provided. The commands are configured to allow one or more processors to perform one or more operations when being executed by the one or more processor. The one or more operations may include providing a first area in which at least one application program can operate and a second area having an operation environment which is at least partially different from the first area, accessing an application market provided by an external service through the communication module at least partially in response to a first input of a user in the first area, downloading a selected first application from the application market at least partially in response to a second input of the user in the first area, installing the downloaded first application in the electronic device, and allocating the downloaded first application to the second area without any input of the user.

Various embodiments disclosed herein are provided merely to describe technical details of the present disclosure and to help the understanding of the present disclosure, and are not intended to limit the scope of the present disclosure. It should be construed that all modifications and changes or modified and changed forms based on the technical idea of the present disclosure fall within the scope of the present disclosure. Therefore, the scope of the present disclosure should not be defined as being limited to the embodiments, but should be defined by the appended claims and their equivalents thereof.

What is claimed is:

1. An electronic device comprising:
a communication module;
a processor; and
a memory that stores instructions to instruct the processor to:
install a first application operating only in a first environment,
install a second application selectively operating in at least one of the first environment and a second environment,
grant access to first data of the first application, the first data being generated while the second application operates in the first environment,
deny access to second data of the first application, the second data being different than the first data and being generated while the second application operates in the second environment,
grant access to third data of the second application, the third data being different than the first data and the second data and being generated while the first application operates in the first environment, and
allocate the second application to at least the second environment without a user's input when the second application is installed.

2. The electronic device of claim 1, wherein the second application includes metadata indicating whether the second application is associated with the second environment.

3. The electronic device of claim 2, wherein the processor generates the second environment based on the metadata.

4. The electronic device of claim 2, wherein the metadata includes at least one of data, a security level of the second application, and authentication related data for security.

5. The electronic device of claim 4, wherein the processor determines whether to allocate the second application to the second environment according to the security level.

6. The electronic device of claim 1, wherein the communication module transmits an authentication request for the second application to a security server, and receives an authentication result from the security server in response to the authentication request.

7. The electronic device of claim 6, wherein the processor determines whether to allocate the second application to the second environment based on the authentication result, and allocates the second application to the second environment according to the determination of the allocation.

8. The electronic device of claim 6, wherein the authentication request includes at least one of a security key and a value encoded by the security key.

9. The electronic device of claim 1, wherein the processor controls the displaying of icons for executing applications allocated to the first environment and the second environment on a single screen.

10. The electronic device of claim 1, wherein the second environment corresponds with a user identifier.

11. A method of controlling an electronic device, the method comprising;
installing a first application operating only in a first environment;
installing a second application selectively operating in the first environment or a second environment;
granting access to first data of the first application, the first data being generated while the second application operates in the first environment;
denying access to second data of the first application, the second data being different than the first data and being generated while the second application operates in the second environment;
granting access to third data of the second application, the third data being different than the first data and the second data and being generated while the first application operates in the first environment; and
allocating the second application to at least the second environment without a user's input when the second application is installed.

12. The method of claim 11, wherein the second application includes metadata indicating whether the second application is associated with the second environment.

13. The method of claim 12, further comprising generating the second environment based on the metadata.

14. The method of claim 12, wherein the metadata includes at least one of data, a security level of the first application, and authentication related data for security.

15. The method of claim 14, further comprising determining whether to allocate the second application to the second environment according to the security level.

* * * * *